United States Patent [19]

Ariyama et al.

[11] Patent Number: 5,357,329
[45] Date of Patent: Oct. 18, 1994

[54] IMAGE FORMING APPARATUS HAVING TWO IMAGE FORMING UNITS

[75] Inventors: Takayuki Ariyama, Atsugi; Kiyoshi Emori, Toyokawa; Koji Shakushi, Toyohashi; Hiroya Sugawa, Toyokawa; Masamichi Kishi, Okazaki, all of Japan

[73] Assignee: Minolta Camera Kabushiki Kaisha, Osaka, Japan

[21] Appl. No.: 928,113

[22] Filed: Aug. 11, 1992

[30] Foreign Application Priority Data

| Aug. 26, 1991 | [JP] | Japan | 3-213732 |
| Aug. 26, 1991 | [JP] | Japan | 3-213741 |
| Aug. 26, 1991 | [JP] | Japan | 3-213758 |
| Aug. 26, 1991 | [JP] | Japan | 3-213766 |

[51] Int. Cl.⁵ .......................................... G03G 21/00
[52] U.S. Cl. .................... 355/309; 271/291; 355/200; 355/369
[58] Field of Search ............... 355/326, 327, 318–322, 355/200, 308–309; 346/160; 271/291, 902

[56] References Cited

U.S. PATENT DOCUMENTS

| 4,239,370 | 12/1980 | Kurita | 355/326 X |
| 4,587,536 | 5/1986 | Saito et al. | 346/160 |
| 4,984,024 | 1/1991 | Ohkaji et al. | 355/273 |
| 5,049,922 | 9/1991 | Kuzuya et al. | 355/32 |
| 5,115,281 | 5/1992 | Ohtsuka et al. | 355/319 |

FOREIGN PATENT DOCUMENTS 59-160158 9/1984 Japan.

*Primary Examiner*—A. T. Grimley
*Assistant Examiner*—T. A. Dang
*Attorney, Agent, or Firm*—Burns, Doane, Swecker & Mathis

[57] ABSTRACT

An image forming apparatus which includes an electrophotographic copying machine operable to form an image on a recording paper and a laser printer operable to form an image on a recording paper independently of the copying machine. The copying machine includes a paper feeder from which the recording papers are selectively supplied to an electrophotographic image forming station in the copying machine and to a paper supply unit in the laser printer. The image forming apparatus also includes a paper recirculating unit operable at a specific timing to replenish the recording paper, supplied from the paper feeder, onto the paper supply unit in the laser printer.

24 Claims, 45 Drawing Sheets

IMAGE FORMING APPARATUS HAVING TWO IMAGE FORMING UNITS

BACKGROUND OF THE INVENTION

1. Field of the Invention

The present invention relates to an image forming apparatus comprising a copying machine and a sheet feeder for supplying recording sheets to the copying machine.

2. Description of Related Art

Laser printers have been recognized quiet to operate and capable of giving a beautiful print. However, the conventional laser printers are too expensive and most of the laser printers now popular use are of a type compact in size and low in operating speed. This type of laser printer is equipped with one or two sheet feed units and, when an image is desired to be formed on a recording sheet other than recording sheets accommodated in such sheet feed unit or units, a complicated procedure is required in such a way as to change the sheet feed unit or the recording sheets.

On the other hand, the image forming apparatus utilizing a combination of a high speed copying machine and a sheet feeder of a design capable of accommodating different sizes of recording sheets is now popularized and, if this image forming apparatus is combined with the compact laser printer and if arrangement is made to permit the compact laser printer to make use of the recording sheets accommodated in the sheet feeder, the convenience and the versatility of the compact laser printer should be enhanced.

SUMMARY OF THE INVENTION

The present invention has therefore been made to provide an improved image forming apparatus of a type comprising a copying machine and a sheet feeder including a plurality of sheet supply units for supplying recording sheets to the copying machine, which apparatus is provided with a printer and a sheet recirculating unit operable to stack a batch of recording sheets supplied from the sheet feeder and then to supply the recording sheets onto the printer.

Another important object of the present invention is to provide an improved image forming apparatus of the type referred to above, wherein the sheet recirculating unit is selectively operable in one of a first stack mode, in which a predetermined amount of recording sheets is stacked, and a second stack mode in which a predetermined number of recording sheets is stacked only when specified.

A further object of the present invention is to provide an improved image forming apparatus of the type referred to above, wherein arrangement has been made to inhibit a supply of the recording sheets from the copying machine to the sheet recirculating unit.

A still further object of the present invention is to provide an improved image forming apparatus of the type referred to above, wherein arrangement has been made to permit the user of the image forming apparatus to select one of a machine priority mode, in which a priority is given to a sheet supply to the copying machine rather than to a sheet supply to the sheet recirculating unit, and an interruption processing mode in which one of the sheet supplies is carried out by interrupting the other of the sheet supplies.

A still further object of the present invention is to provide an improved image forming apparatus of the type referred to above, wherein means is provided for replenishing recording sheets from the sheet feeder to the sheet recirculating unit when the recording sheets in the sheet recirculating unit have been supplied onto the printer.

According to the present invention, the sheet recirculating unit in the printer may comprise a sheet supply unit having a cassette receiving mouth into which one of fixed and variable design cassettes each accommodating therein a stack of recording sheets is selectively and removably inserted. The fixed design cassette is of a type wherein the stack of recording sheets of uniform size is accommodated while the variable design cassette is of a type capable of accommodating varying sizes of recording sheets in a stacked fashion. Where the sheet supply unit of the sheet recirculating unit is operable with any one of the fixed and variable design cassettes, a display means may be provided to provide a visual indication by which the user can ascertain which one of the fixed and variable design cassettes is in use.

According to a preferred embodiment of the present invention, when the first stack mode is changed over to the second stack mode, and vice versa, the system may have an inhibiting mode in which the change in mode is inhibited when the recording sheets remain in the sheet recirculating unit, or an enabling mode in which the change in mode is permitted only when the recording sheet accommodated in the sheet recirculating unit are of uniform size. Arrangement may also be made that, when a mode change instruction is made to switch the first stack mode over to the second stack mode, the recording sheets in the sheet recirculating unit can be discharged and the initial mode can resume after the whole number of the recording sheets *have been discharged. Again, arrangement may be made that, when the fixed and variable design cassettes are loaded in the sheet recirculating unit one at a time, the first stack mode and the second stack mode can be automatically selected, respectively. In this example, when the first stack mode is selected, the recording sheets can be supplied to the sheet recirculating unit in a number corresponding to the number of recording sheets consumed from the sheet recirculating unit, but when the second stack mode is selected, the recording sheets can be stacked only when specified. Furthermore, when the variable design cassette is loaded in the sheet recirculating unit and the second stack mode is then selected, the size of the recording sheets to be accommodated can be changed as requested.

According to another preferred embodiment of the present invention, the user of the image forming apparatus can select one of the machine priority mode and the interruption processing mode and, therefore, any possible delay in supply of recording sheets to the sheet recirculating unit will not occur even though the copying machine is given priority.

BRIEF DESCRIPTION OF THE DRAWINGS

This and other objects and features of the present invention will become clear from the following description taken in conjunction with a preferred embodiment thereof with reference to the accompanying drawings, in which like parts are designated by like reference numerals and in which.

DETAILED DESCRIPTION OF THE PREFERRED EMBODIMENTS

Figure 1:
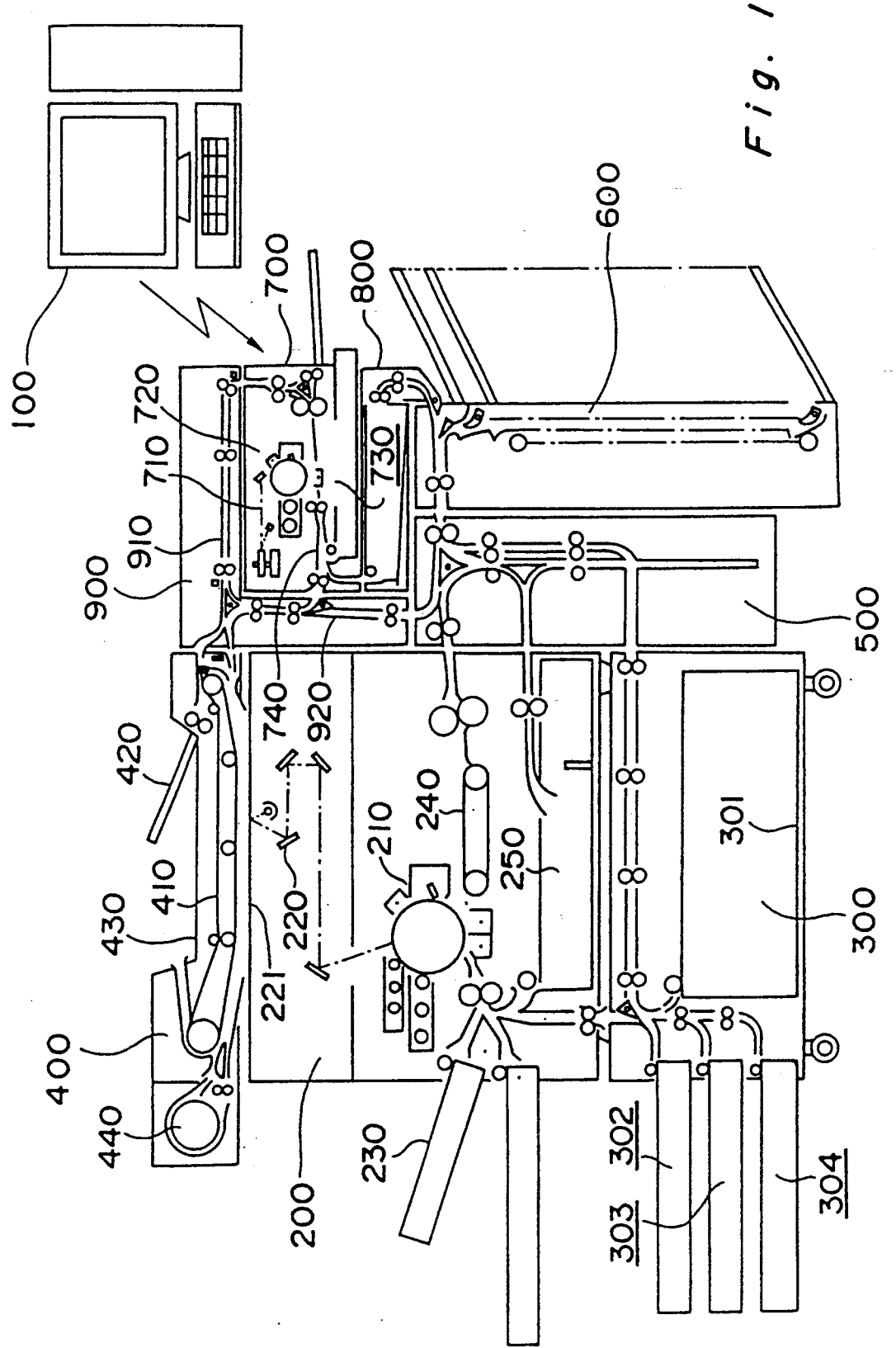
FIG. 1 is a schematic side sectional view of an image forming apparatus embodying the present invention.

I) Structure of Image Forming Apparatus (FIG. 1)

FIG. 1 illustrates, in a schematic side view, a general structure of the image forming apparatus embodying the present invention. As shown therein, the image forming apparatus comprises a host computer 100, a copying machine (PPC) 200, a paper feeder (Paper feeding option) 300, an automatic document feeder (ADF) 400, a paper inverter 500, a paper discharging device (Paper discharge option) 600, a laser printer (LBP) 700, a paper recirculating unit (Paper recirculating option) 800, and a document delivery unit 900.

(a) Host Computer 100

The host computer 100 may be employed in the form of a personal computer, a word processor or a desk-top publishing equipment.

(b) Copying Machine 200

The copying machine 200 is of a high speed model capable of producing a few decades of copies per minute and comprises a well-known photoreceptor unit 210, an optical system 220, a paper feed unit 230, a copy delivery unit 240 and a duplexing unit 250.

(c) Paper Feeder 300

The paper feeder 300 includes a plurality of, for example, four, paper supply units 301, 302, 303 and 304 for accommodating respective stacks of papers of different sizes.

(d) Automatic Document Feeder 400

The automatic document feeder 400 is hingedly mounted on the copying machine 200 for pivotal movement between open and close positions and is adapted to overlay a transparent document platen 221 on the top of the copying machine 200. This automatic document feeder 400 includes a document transport unit 410, a document tray 420, a document recovery tray 430 and a document inverting unit 440.

(e) Paper Inverter 500

The paper inverter 500 is interposed between the copying machine 200, the paper feeder 300, the paper discharging device 600, and the document delivery unit 900 and is operable under a control of any one of the host computer 100 and the copying machine 200 to perform a switching of paper feed passages and also to invert a paper delivered onto the paper inverter 500.

(f) Paper Discharging Device 600

The paper discharging device 600 is a multi-bin sorter designed to discharge papers having images copied thereon by the laser printer 700, which concurrently serves as a paper delivery device for transporting a paper from the paper inverter 500 towards the paper recirculating unit 800. It is to be noted that, for this paper discharging device 600, a tray equipped with a finisher or a tray equipped with a stamper may be employed.

(g) Laser Printer 700

The laser printer 700 includes a laser optical system 710 and also includes a photoreceptor unit 720, a paper feeder 730 and a paper transport system 740 as is the case with the copying machine 200.

(h) Paper Recirculating Unit 800

The paper recirculating unit 800 is operable to temporarily stack papers successively supplied by the paper feeder 300 and then supply them onto the printer 700, the details of which will be described later.

(i) Document Delivery Unit 900

The document delivery unit 900 is operable to deliver the paper, discharged from the printer 700, onto the automatic document feeder 400 or tile paper inverter 500 or back to the paper transport system 740 of the printer 700 and includes a horizontal transport unit 910 and a vertical transport unit 920.

(j) Copier Operating Panel 260

Figure 2:
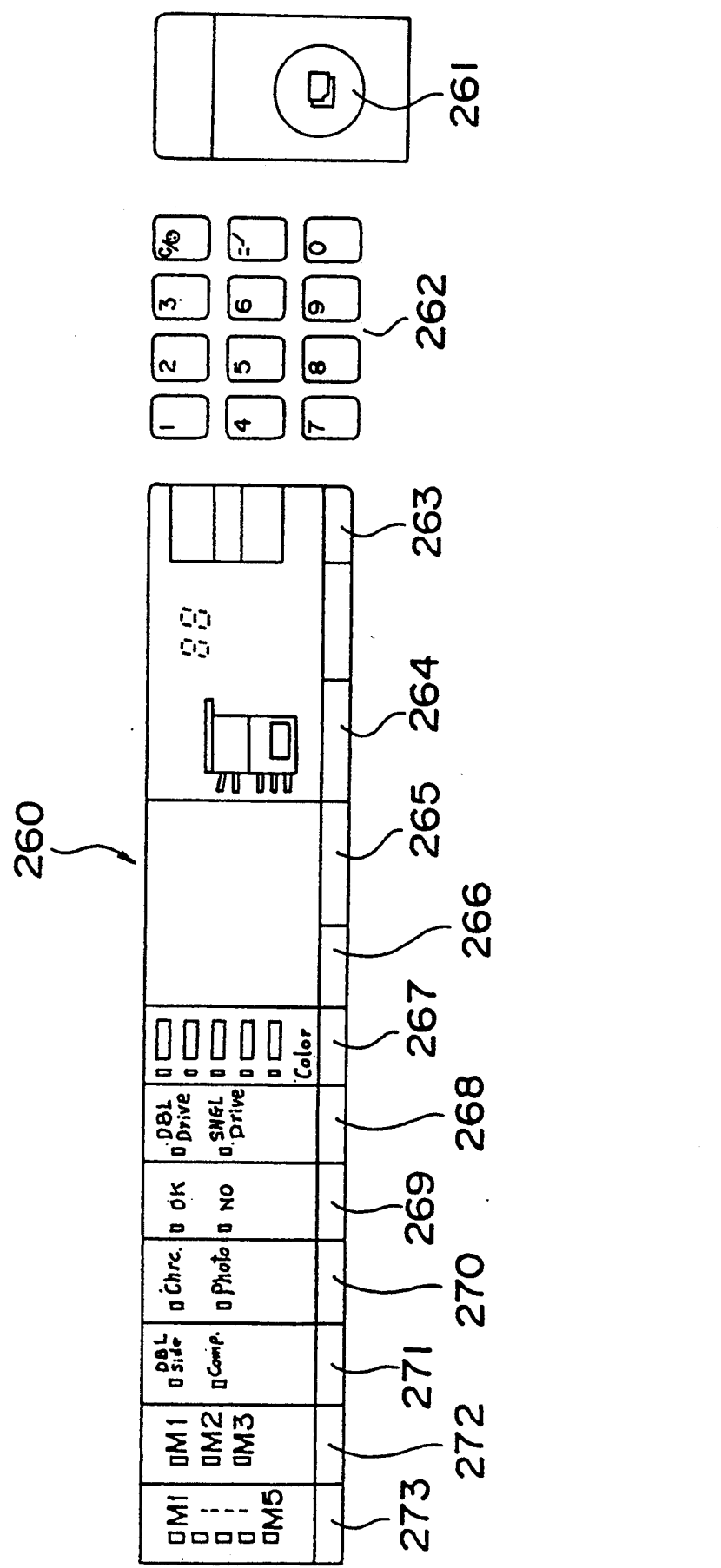
FIG. 2 is a schematic plan view, on an enlarged scale, of a copier operating panel.

As shown in FIG. 2, a copier operating panel 260 provided in the copying machine 200 includes a copy START key 261, a set of numerical input keys 262, a density adjustment key 263, a paper selecting key 264, a magnification selecting key 265, a zoom setting key 266, a color selecting key 267, a mode selecting key 268 for selecting one of double and single drive modes as will be described later, an interrupting key 269 associated with an interruption process, an image quality input key 270, a copy mode selecting key 271 for selecting one of a double-sided copying mode and a composite copying mode, a supply mode selecting key 272 for setting the number of papers desired to be supplied to the paper recirculating unit 800, and a supply timing selecting key 273 for switching a timing at which the paper is to be supplied to the paper recirculating unit 800.

(k) Printer Operating Panel 750

Figure 3:
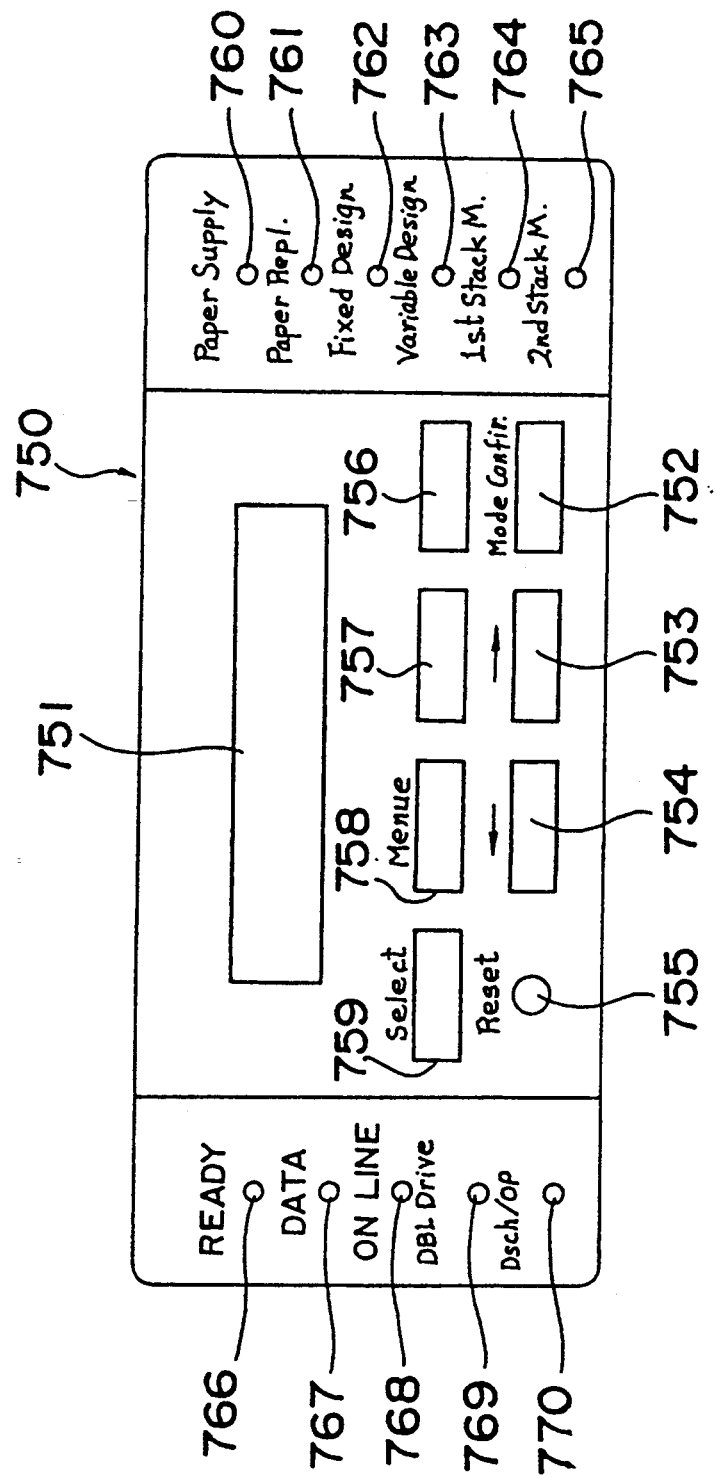
FIG. 3 is a schematic plan view, on an enlarged scale, of a printer operating panel.

Referring to FIG. 3, the printer 700 has a printer operating panel 750 which includes a display window 751, a mode confirmation key 752, a plurality of keys 753 to 759, and a plurality of lamps 760 to 770 for indicating the mode selected by a select key 759 and contents of instructions of the host computer 100.

II) System Construction

Figure 4:
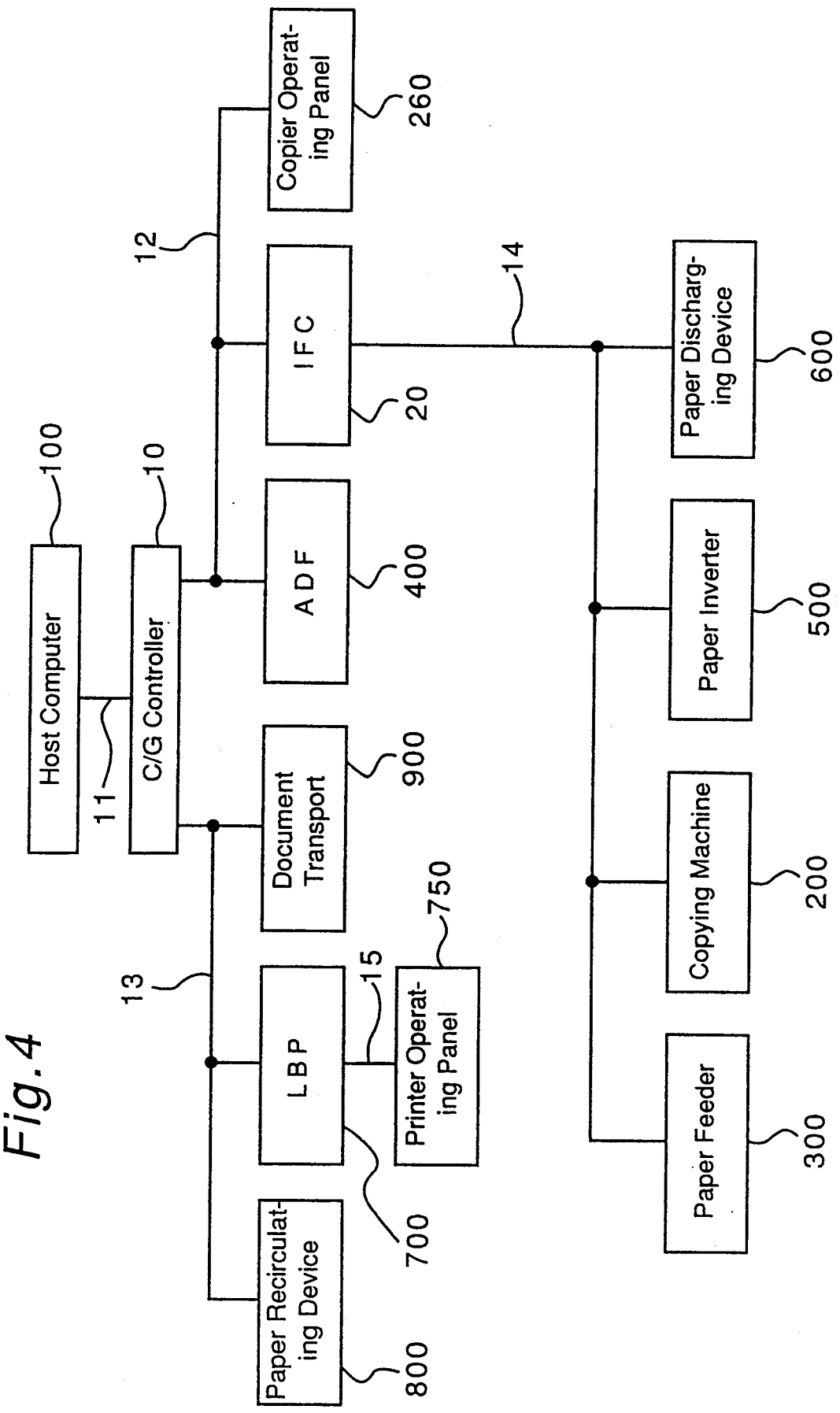
FIG. 4 is a circuit block diagram showing a control system employed in the image forming apparatus.

The above described component parts altogether forming the image forming apparatus and are operatively linked and associated according to a system diagram shown in FIG. 4. Specifically, the host computer 100 is connected with a C/G controller 10 through a host interface 11. This controller 10 is in turn connected through a communication line 12 with the automatic document feeder (ADF) 400, an interface controller (IFC) 20 and the copier operating panel 260. The interface controller 20 is in turn connected through a communication line 14 with the copying machine 200, the paper feeder 300, the paper inverter 500 and the paper discharging device 600. The controller 10 is also connected through a video interface 13 with the printer 700, the paper recirculating unit 800 and the document delivery unit 900, said printer 700 being in turn connected with the printer operating panel 750 through a usual input/output interface 15.

III) Image Forming Modes

The image forming apparatus embodying the present invention is operable in one of a single drive mode, in which the copier 200 and the printer 700 are separately driven to form an image, and a double drive mode in which the copier 200 and the printer 700 are concurrently driven to form an image.

(1) Single Drive Mode

This single drive mode is divided into two modes; a single drive copy mode performed solely by the copying machine 200 and a single drive print mode performed solely by the printer 700.

(1-a) Single Drive Copy Mode by Copying Machine

This is a mode in which an image of the document placed on the document platen 221 is copied on a paper, supplied from the paper feed unit 230 or one of the paper supply units 301 to 304 in the copying machine 200, and the resultant copy, that is, the paper having the image copied thereon, is discharged to the paper discharging device 6090. This copy mode includes a one-side copy mode in which an image is copied on only one side of a paper, a double-side copy mode in which two images are copied on respective opposite sides of a paper, and a composite copy mode in which at least two images are copied on one side of a paper one over the other.

(1-b) Single Drive Copy Mode by Printer

This is a mode in which, based on instructions given by the host computer 100, the printer 700 is driven and an image is formed on a paper supplied from the paper feeder 730 of the printer 700 or the paper recirculating unit 800 and is then discharged onto the paper discharging device 600. As is the case with the single drive copy mode by the copying machine 200, this copy mode includes a one-side copy mode in which an image is copied on only one side of a paper, a double-side copy mode in which two images are copied on respective opposite sides of a paper, and a composite copy mode in which at least two images are copied on one side of a paper one over the other (2) Double Drive Mode During this double drive mode, a document is prepared by the printer 700 according to instructions given by the host computer 100 and is then transported onto the document platen 221 of the copying machine 200 by means of the document delivery unit 900 and the automatic document feeder 400 so that an image of the document can be copied by the copying machine 200.

IV) Image Forming Process

Figure 5:
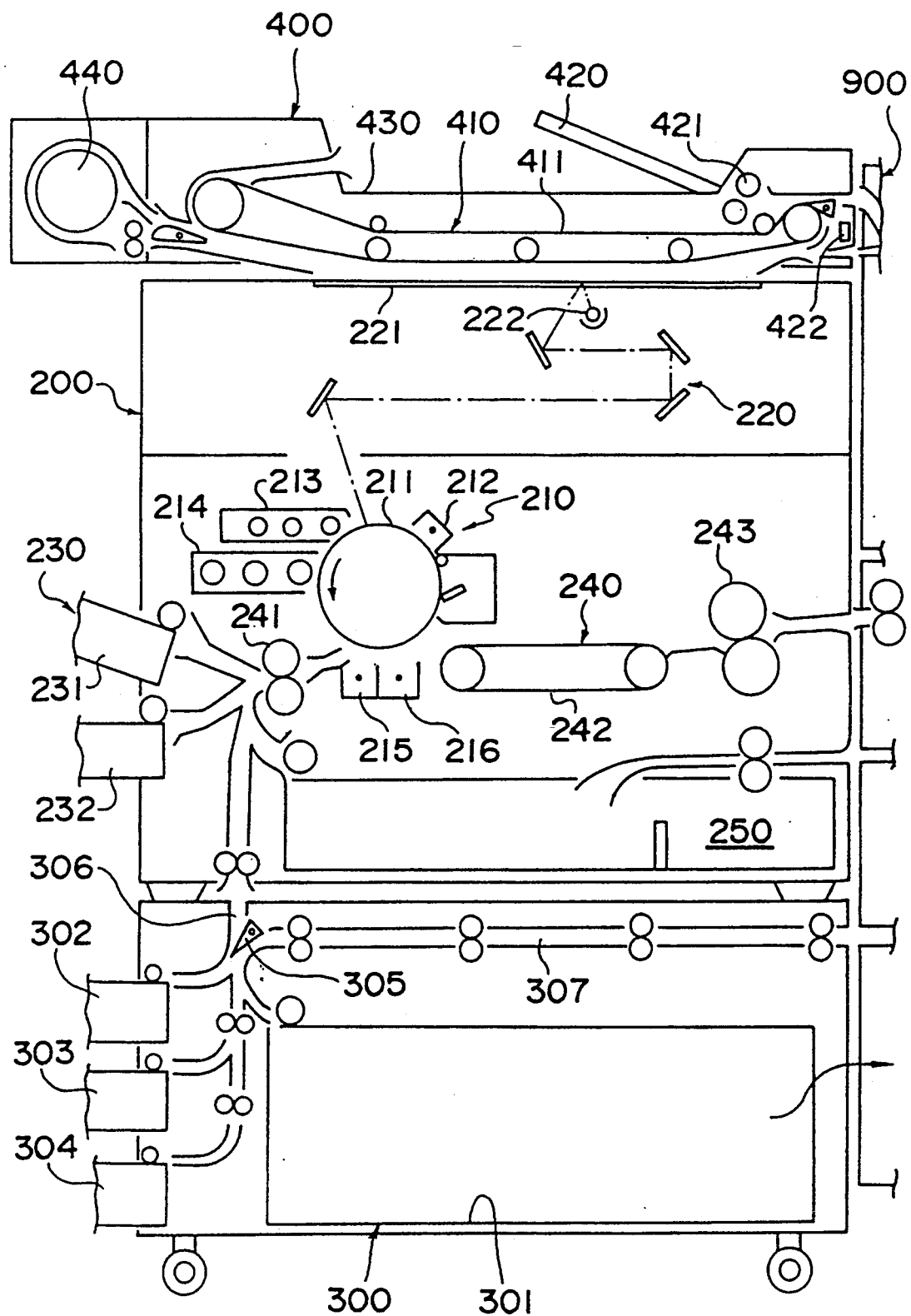
FIG. 5 is a schematic side sectional view of the copying machine, a sheet feeder and an automatic document transport device in the image forming apparatus.
Figure 6:
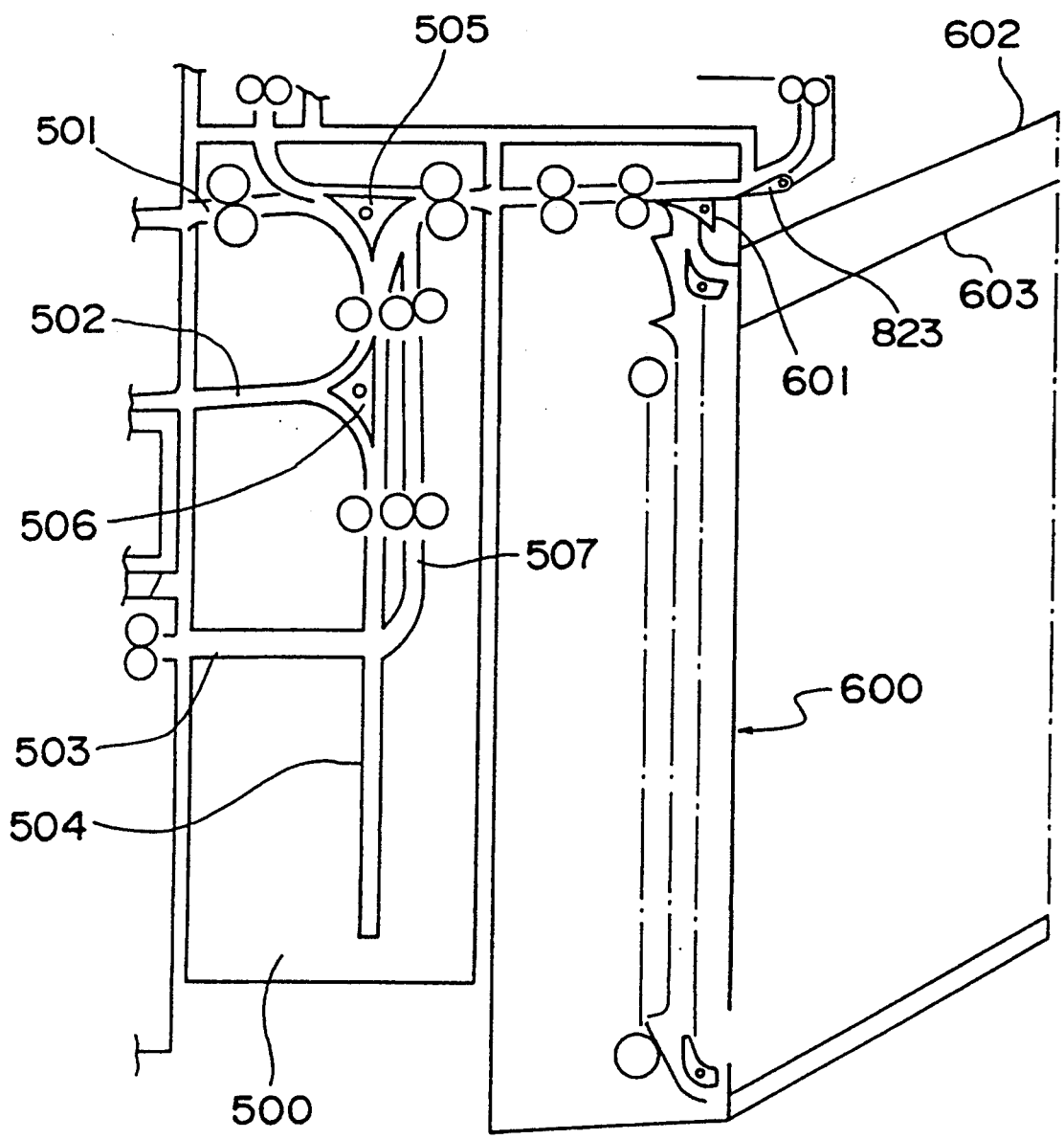
FIG. 6 is a schematic side sectional view of a sheet inverter and a sheet discharge unit employed in the image forming apparatus.
Figure 7:
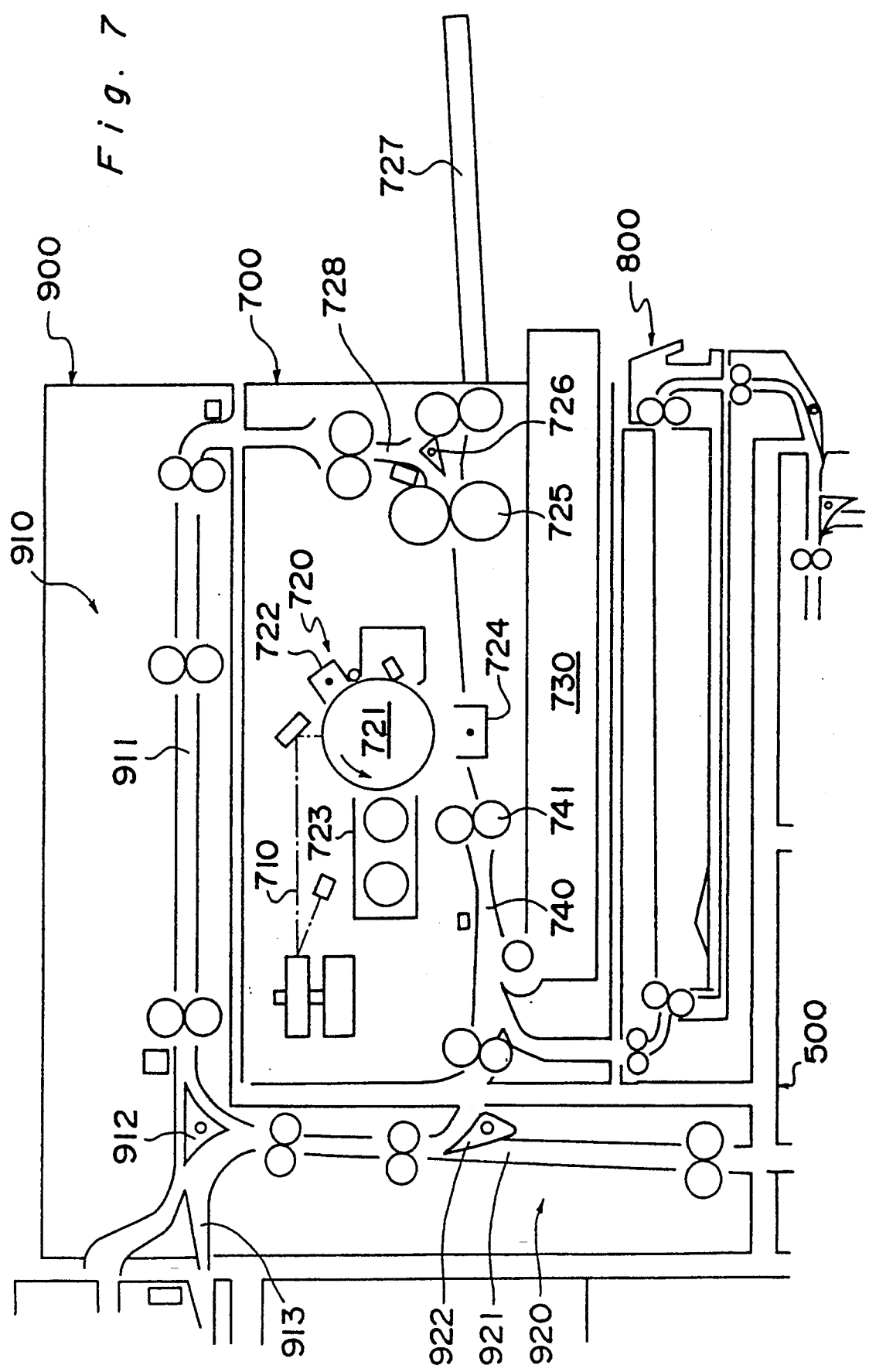
FIG. 7 is a schematic side sectional view of a laser printer, the document transport device and a sheet recirculating unit employed in the image forming apparatus.

The image forming process performed under any one of the foregoing modes will now be described with reference to FIGS. 5, 6 and 7.

(a) Single Drive Copy Mode by Copying Machine

In this copy mode performed by the copying machine 200, a keying operation effected to the operating panel 260 of the copying machine 200 results in a selection of one of one of the one-side, double-side, and composite copy modes, one of the sheet cassettes and the sheet feed unit, the color desired to develop and the like and the number of copies desired to be made. A document to be copied is placed at an appropriate location on the document platen 221 by opening the automatic document feeder 400. When the copying operation is completed, the document is removed by moving the automatic document feeder 400 to the open position.

When an automatic document feed is required, a document is initially placed on the document tray 420. When the copy START key 261 is subsequently depressed, the automatic document feed mode is automatically assumed allowing the documents to be fed one by one automatically towards a copying position above the document platen by means of the drive of document feed rolls 421 and an endless conveyor belt 411 and, after the copying the documents are successively discharged onto the document recovery tray 430. Where respective images born on opposite sides of a documents are desired to be copied on associated sides of a paper, the document after the copying of an image on one side of the paper is transported to the document inverting unit 440 for turning the document upside down and is then transported towards the document platen 221 with the other side of the document facing downwards. After the image on the other side of the document has been copied, the document is then discharged onto the document recovery tray 430.

In the copying machine 200, a photoreceptor drum 211 is rotated in a counterclockwise direction and an outer peripheral surface of the drum 211 is electrostatically charged by an electrostatic charger 212. An exposure lamp 222 of a scanning optical system 220 illuminates the document while scanning-it so that imagewise rays of light reflected from the document can be projected onto an electrostatically charged area of the photoreceptor drum 211 to form an electrostatic latent image corresponding to the image on the document. This electrostatic latent image is subsequently developed by a first developing unit 213 or a second developing unit 214 into a visible toner image. On the other hand, a recording paper is supplied from one of cassettes 231 and 232 of the paper feed unit 230 or one of the paper supply units 301 to 304 of the paper feeder 300 and is then, after having been synchronized by a timing roller 241 with an arrival of the visible toner image at a transfer station, fed towards the transfer station at which the visible toner image is transferred onto the recording paper by the effect of an electrostatic discharge effected by a transfer charger 215. The recording paper bearing the visible toner image is then separated from the photoreceptor drum 211 by a separating charger 216 and is further transported by a transport device 242 towards a fixing device 243 to permanently fix the toner image on the recording paper. The recording paper having passed through the fixing device 243 is thereafter discharged onto an upper passage 501 of the paper inverter 500. Depending on which one of the single side copy mode, the double side copy mode and the composite copy mode is selected, the recording paper so discharged to the paper inverter 500 is transported to one of different transport passages.

More specifically, where the single side copy mode is selected, the recording paper is guided in a horizontal direction by a switching lever 505 and subsequently discharged to the paper discharging device 600. In the paper discharging device 600, where a sorting process is selected, the recording paper is accommodated into a bin 603 by a switching lever 601, but where no sorting process is selected, the recording paper is transported in the horizontal direction by the switching lever 601 so that it can be discharged into the uppermost bin 602 by a switching lever 823 of the paper recirculating unit 800.

On the other hand, should the double side copy mode is selected, the recording paper having the toner image fixed on one side thereof is guided downwardly into an inverting passage 504 by the switching lever 505 and is subsequently switched backwards immediately after a trailing end of the recording paper has passed a second switching lever 506. Thereafter, the copying paper is guided into an intermediate passage 502 by the switching lever 506 and is further transported to the copying machine 200 so as to be accommodated within the duplexing unit 250. The recording paper accommodated within the duplexing unit 250 is subsequently transported again to the transfer station and is, after another visible toner image formed on the photoreceptor drum 211 has been transferred onto the opposite side of the recording paper, passed through the fixing unit 243 onto the upper passage 501 of the paper inverter 500 and, thereafter, discharged into the bins 602 and 603 of the paper discharging device 600 having been guided by the switching lever 505.

In the event that the composite copy mode is selected, the recording paper having the toner image formed on a first side thereof is, after having been guided into the inverting passage 504 by the switching lever 505, guided into the intermediate passage 502 by the second switching lever 506. In other words, the recording paper is, without being turned upside down, transported to the duplexing unit 250. Then, the recording paper is transported to the transfer station at which another visible toner image is transferred onto the first side thereof in overlapping relation with the initially copied image and is subsequently discharged to the paper discharging device 600 through the paper inverter 500.

In the case of the execution of any one of the foregoing double side copy mode and the foregoing composite copy mode, the switching of one of the developing units, which has been used during an initial cycle of copying operation, over to the other of the developing units during the next succeeding cycle of copying operation can result in formation of images on the respective sides of the recording paper in different colors or in the same color.

(b) Single Drive Print Mode by Printer

During the execution of the single drive print mode by the printer 700, one of the paper supply units and the destination to which resultant copies are discharged are determined by the host computer 100. Also, an image data is outputted from the host computer 100 to the controller 10. This image data is developed in a bit map and is outputted to the laser optical system 710.

In the printer 700, the photoreceptor drum 721 while being rotated in a counterclockwise direction, has its outer peripheral surface electrostatically charged by an electrostatic charger 722 and an imagewise laser beam emitted from the laser optical system 710 is projected onto an electrostatically charged area of the photoreceptor drum 721 to form an electrostatic latent image which is subsequently developed by an developing ;unit 723 into a visible toner image.

A recording paper is supplied from the paper feeder 730 or the paper recirculating unit 800 and is, after having been synchronized by a timing roller 741 with an arrival of the visible toner image at a transfer station, transported to the transfer station at which, based on a discharge effected by a transfer charger 724, the visible toner image is transferred onto the recording paper. The recording paper having the toner image transferred thereto is conveyed through a fixing unit 725 to permanently fix the toner image thereon and is then guided by a switching lever 726 into a tray 725 or into a passage 728 leading to the document delivery unit 900.

The recording paper having been transported to the document delivery unit 900 moves in a passage 911 in a horizontal unit 910 and is, after having been guided by a first switching lever 912 into a passage 921 in a vertical unit 920, guided further downwardly by a second switching lever 922 and then into the paper inverter 500. The recording paper supplied into the paper inverter 500 is, after having been guided by the switching lever 505 into the paper discharging device 600, subsequently discharged to a predetermined one of the bins by means of a switching lever 601.

A double side printing and a composite printing with the use of the laser printer 70 are also possible. By way of example, when the double side print mode is selected, the recording paper supplied to the paper inverter 500 is guided downwardly by the switching lever 505 in the inverting passage 504, then transported upwardly again immediately after a trailing end of the recording paper has passed the switching lever 506, and finally guided by the switching lever 505 into the paper discharging device 600. In this way, the recording paper is inverted upside down in the inverting passage 504. Thereafter, the recording paper is transported to the paper recirculating unit 800 having been guided by switching levers 601 and 823 and is then stored temporarily. The recording paper temporarily stored in the paper recirculating unit 800 is again transported to the transfer station in the laser printer 700 and is, after another visible toner image formed on the photoreceptor drum 721 has been transferred onto a second side of the recording paper, transported by a switching lever 726 into a recovery tray 727 or into a passage 728. The recording paper guided into a passage 722 is discharged to one of the bins of the paper discharging device 600 through the document delivery unit 900 and the paper inverter 500.

On the other hand, when the composite print mode is selected, the recording paper discharged from the laser printer 700 is, during its transport through the vertical unit 920 of the document delivery unit 900, guided by a switching lever 922 into the paper transport system 740 in the printer 700 and is, after another toner image has been transferred at the transfer station onto the same side of the recording paper where the toner image has previously been transferred, discharged to the tray 727 or the paper discharging device 600.

(c) Double Drive Mode

During the double drive mode, a document image is formed according to the image information, generated from the host computer 100, on a recording paper supplied from one of the paper feeder 730 and the paper recirculating unit 800 in the printer and is, after having been discharged into a passage 911 in the document delivery unit 900, guided by the switching pawl 912 into the automatic document feeder 400 through a passage 913. The recording paper bearing the document image and supplied to the automatic document feeder 400 is used as a document and is transported onto the document platen 221 by means of the endless conveyor belt 411 for making copies of the document image.

In the copying machine 200, the photoreceptor drum 210, the optical system 220 and the paper feed unit 230 are driven in respective timings so that the document image of the document can be copied on a recording paper supplied from one of the paper feed unit 230 and the paper feeder 300. The recording paper bearing the document image is subsequently discharged to the paper discharging device 600 through the paper inverter 500. On the other hand, the document resting on the document platen 221 is discharged to the document recovery tray 430.

In the event that the double side copy mode under the double drive mode is selected, a first document bearing a first image to be copied on a first side of a recording paper is formed by the printer 700 and is subsequently set on the document platen 221 in a manner similar to that described above. Then, the copying machine 200 makes a copy of the first image of the first document on the first side of the recording paper. The copying paper having the first image of the first document copied thereon is accommodated in the duplexing unit 250 after having been turned upside down in the paper inverter 500.

Thereafter, a second document bearing a second image to be copied on a second side, opposite to the first side, of the same recording paper is formed by the printer 700 and is then set on the document platen 221. The copying machine 200 then makes a copy of the second image of the second document on the second side of the recording paper which has been accommodated in the duplexing unit 250. The recording paper having the first and second images copied on the first and second sided thereof, respectively, in the manner described above is discharged to the paper discharging device 600 through the paper inverter 500 and then into the bind 602 and 603. On the other hand, the documents are discharged to the document recovery tray 430. Where the document has images printed on respective sides thereof, the document after the image on one side thereof has been copied is transported to the document inverting unit 440 and is, after having been turned upside down in this document inverting unit 440, again transported to the document platen 211 and is, after another image on the second side of the document has been copied, discharged to the document recovery tray 430.

In the event that the composite print mode under the double drive mode is selected, two document images formed by the printer 700 are successively transported to the document platen 221 in a manner similar to that described in connection with the double side print mode. On the other hand, the recording paper having its first side formed with the image is, once discharged from the copying machine 200, returned to the duplexing unit 250 without being turned upside down by the paper inverter 500, and is henceforth transported again to the document platen 221 so that another image can be formed on the first side of the recording paper.

V) Paper Recirculating Unit 800 (FIGS. 8 to 13)

Referring particularly to FIGS. 8 to 13, the paper recirculating unit 800 includes a paper feed unit 810 and paper cassettes 830 and 840. The paper feed unit 810 has a pocket 811 defined therein so as to open in a right-hand direction as viewed therein for accommodating a selected one of the paper cassettes 830 and 840 and delimited by ceiling and floor portions and an upright wall portion opposite to the opening leading into the pocket 811. As shown therein, the paper feed unit 810 also includes a paper feed roller pair 812 and a pickup roller assembly 813, both arranged at an upper corner region between the ceiling portion and the upright wall portion, a connector 814 at the upright wall portion, a paper lifting member 815 at the floor portion, a paper detecting device 816 at the ceiling portion, and a paper guide 822 defined in an area of the floor portion adjacent the opening leading into the pocket 811 for guiding a recording paper, transported from paper discharging device 600, to the cassette. The paper detecting device 816 is constituted by a pivotally supported actuator 817 and three sensors 818, 819 and 820. The paper guide 822 includes a switching lever 828, disposed adjacent an inlet leading to the paper guide 822, and a paper sensor 824 disposed at a generally intermediate portion thereof, and the recording paper discharged from the paper discharging device 600 can be selectively fed into one of the bin 602 and the paper guide 822 by a switching operation of the switching lever 823.

The pocket 811 is adapted to accommodate therein one of the paper cassettes 830 and 840 which may be selected at the will of the user. The cassette 830 is of a fixed design for accommodating a stack of recording papers of one particular size whereas the cassette 840 is of a variable design adapted to accommodate a varying size of recording papers. It is to be noted that a term "cassette size" hereinafter used is to be understood as meaning the size of recording papers that can be accommodated in the cassette and, in the case of the variable design 840, the cassette size can be adjusted by repositioning rear and side regulator plates.

Figure 9:
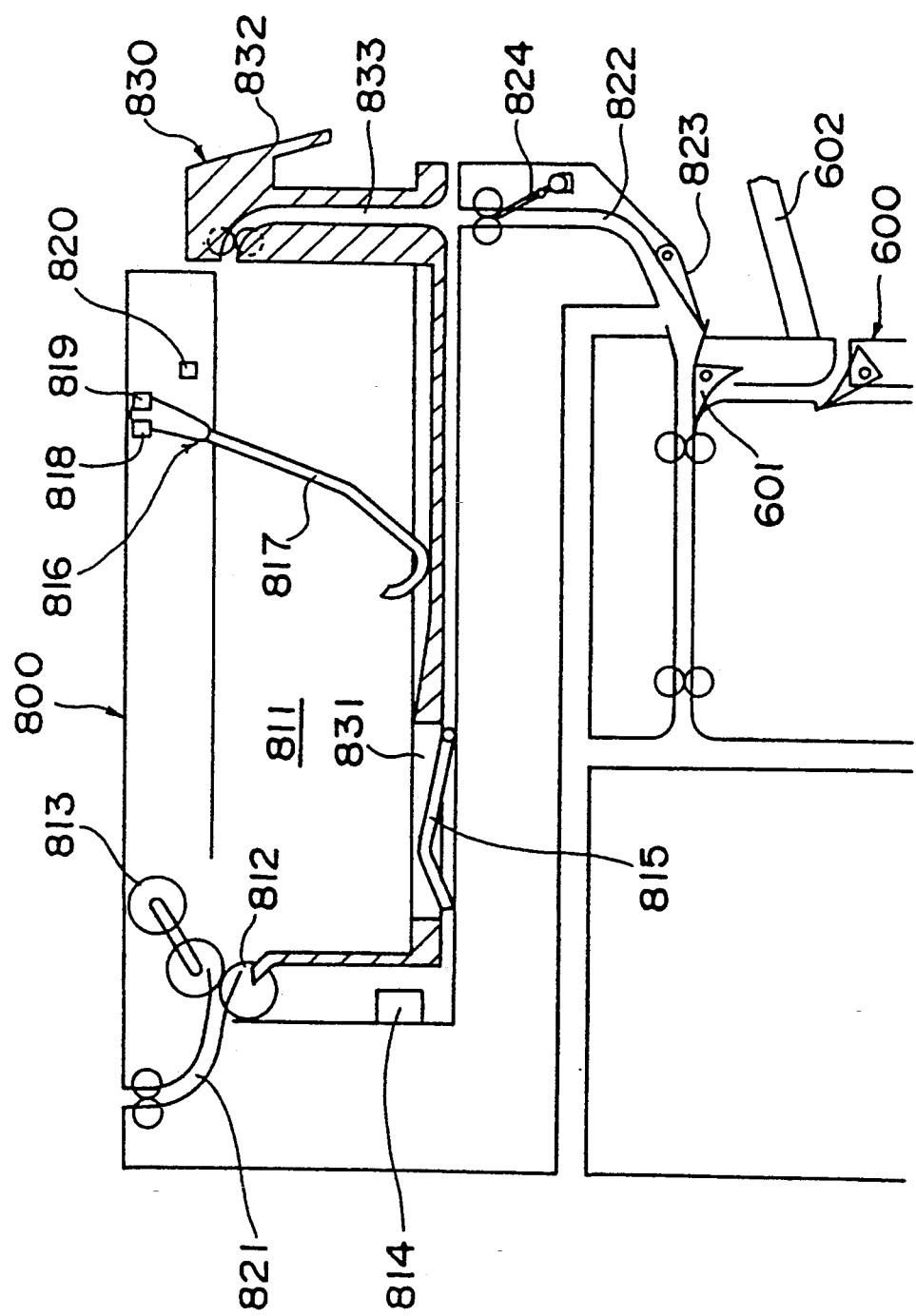
FIG. 9 is a schematic sectional view of the sheet recirculating unit with a fixed design cassette being loaded therein.
Figure 10:
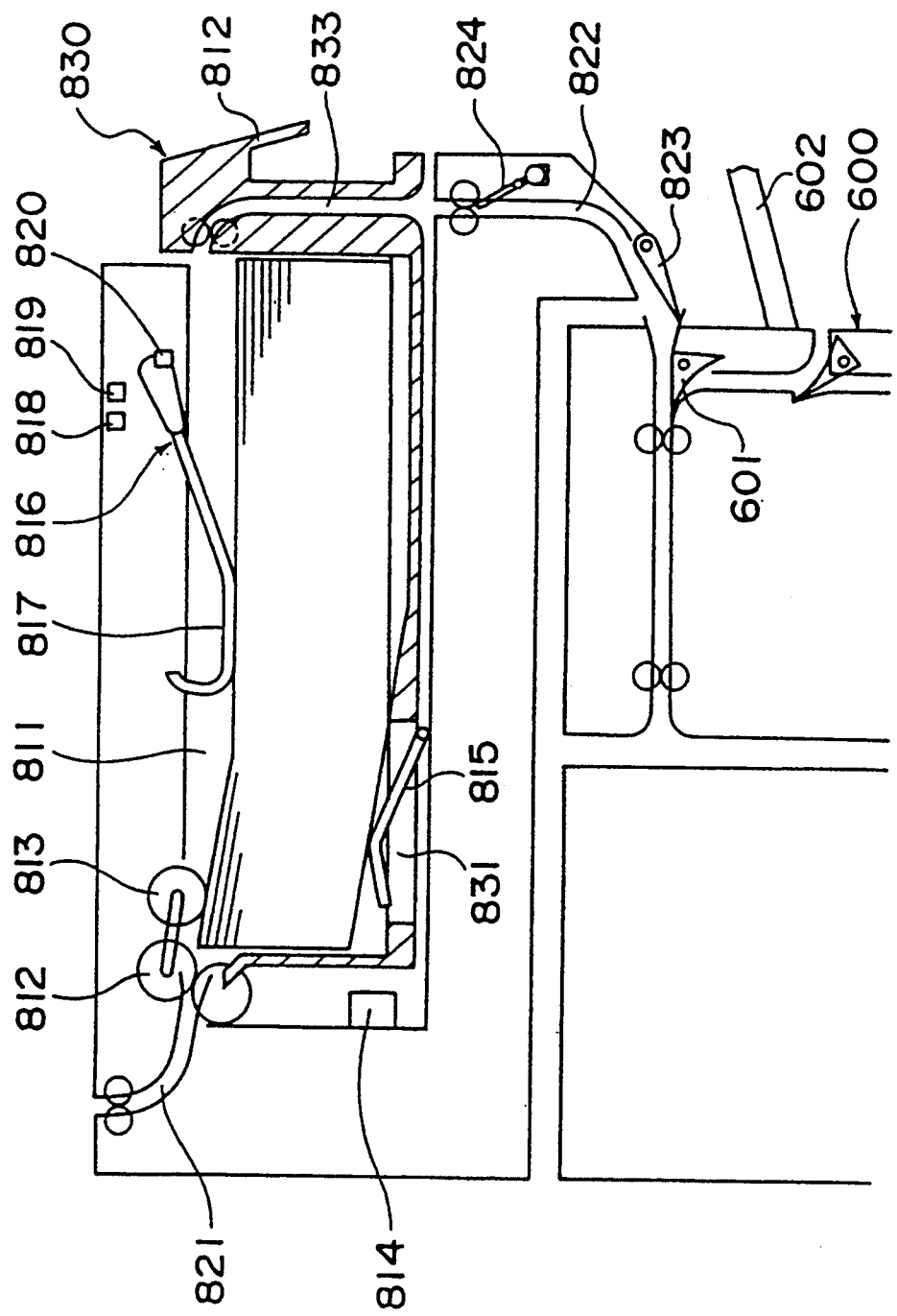
FIG. 10 is a schematic sectional view of the sheet recirculating unit with a stack of recording sheets accommodated in the fixed design cassette.

The fixed design cassette 830 is, as best shown in FIG. 9, provided with an opening 831 defined in a bottom thereof in alignment with the paper lifting member 815, and a paper guide 833 defined in a handle portion 832 and adapted to align with the paper guide 822 when the cassette 830 is in the pocket 811 as shown therein.

Figure 11:
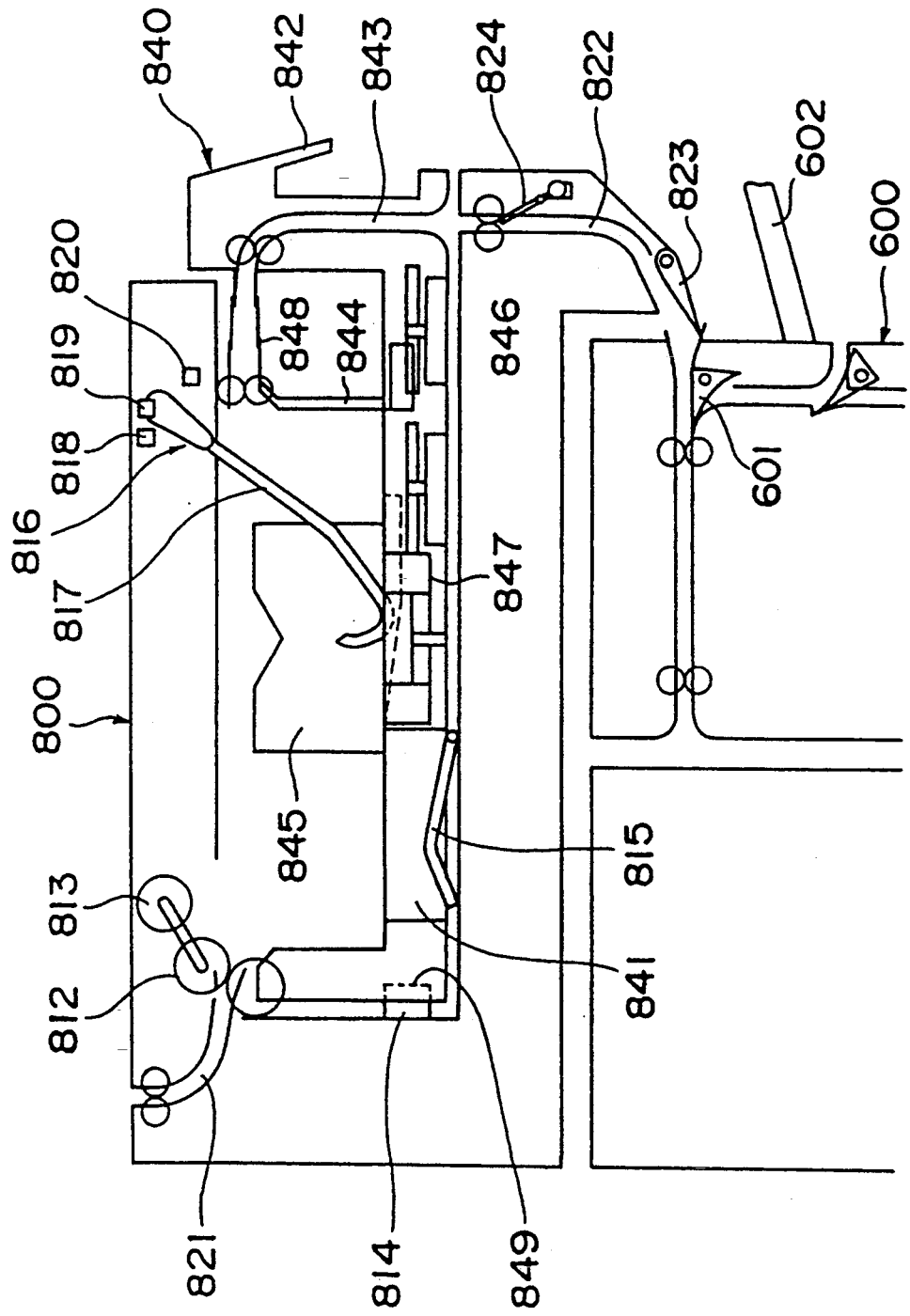
FIG. 11 is a schematic sectional view of the sheet recirculating unit with a variable design cassette loaded therein.
Figure 12:
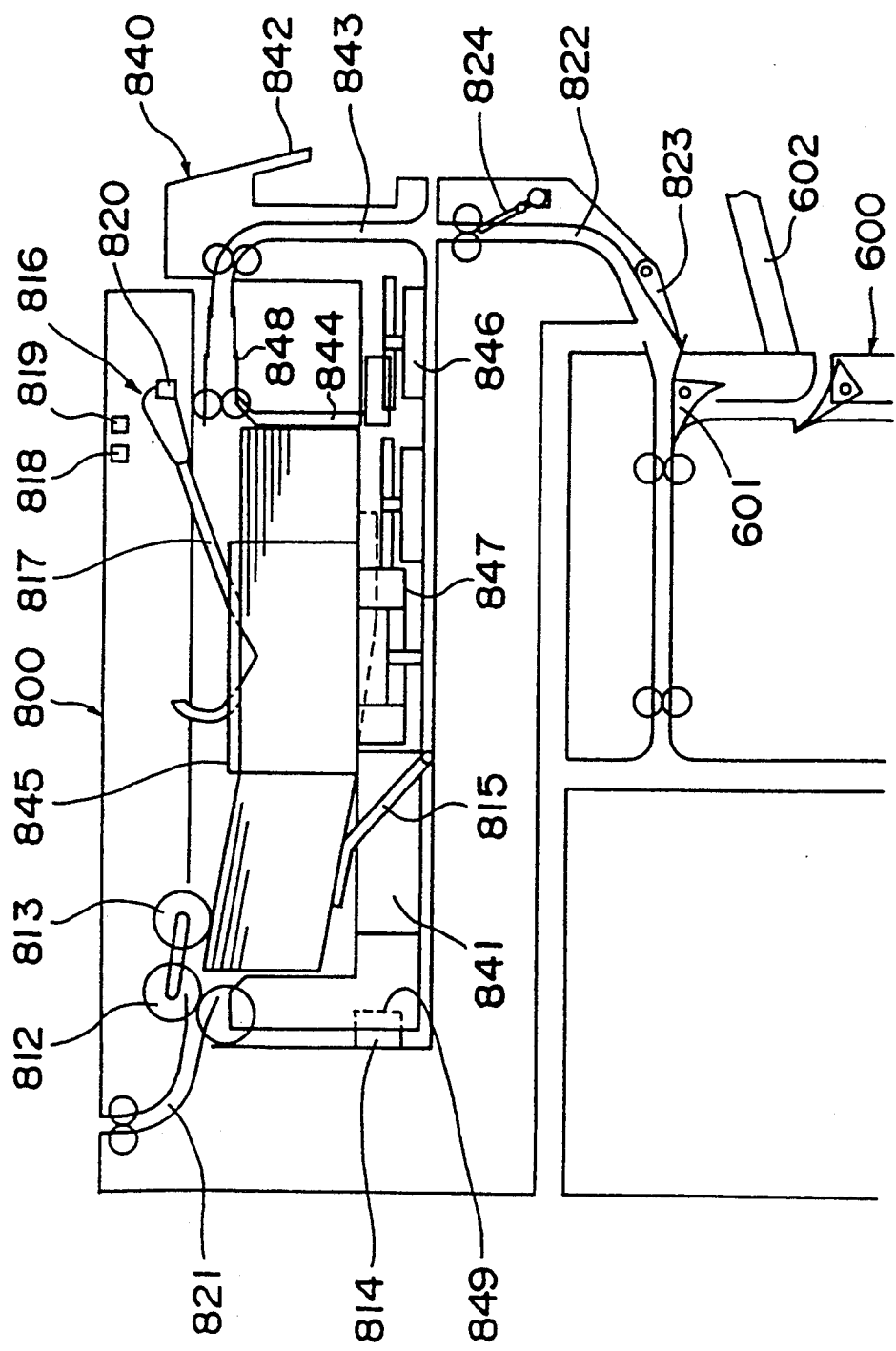
FIG. 12 is a schematic sectional view of the sheet recirculating unit with a stack of recording sheets accommodated in the variable design cassette.
Figure 13:
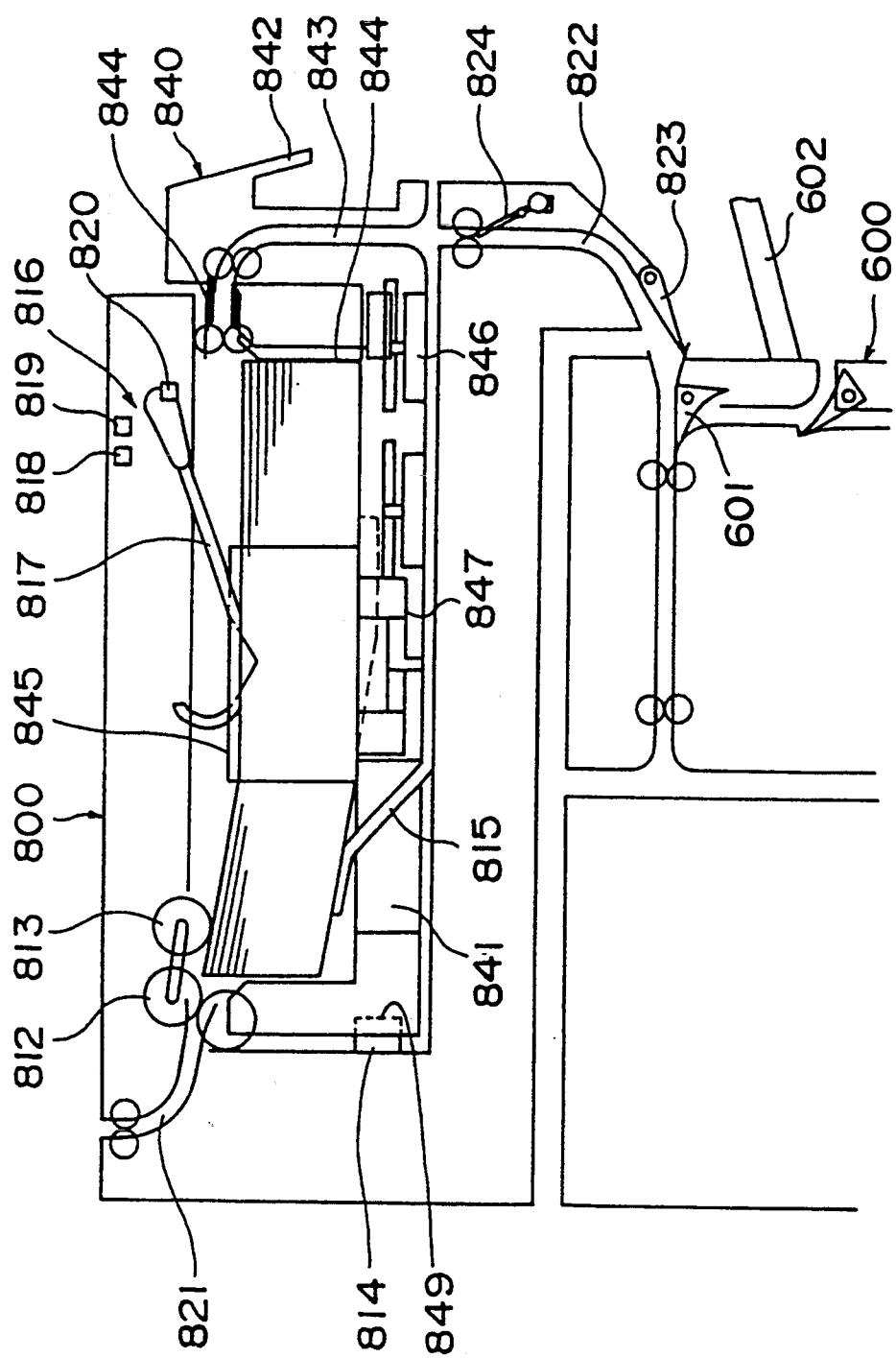
FIG. 13 is a schematic sectional view of the sheet recirculating unit with a stack of recording sheets accommodated in the variable design cassette.

On the other hand, the variable design cassette 840 is, as best shown in FIG. 11, provided, in addition to the opening 841 and the paper guide 843, with a rear regulator plate 844 for regulating trailing ends of a stack of recording papers accommodated within the cassette 840 and a pair of side regulator plates 845 (only one of which is shown) for regulating opposite side edges of the stack of recording papers accommodated within the cassette 840. The rear regulator plate 844 is movable in a longitudinal direction of the recording papers, that is, in a direction close towards and away from the handle portion 842 of the associated cassette 840 by means of a moving mechanism 846 including a drive motor and a rack-and-pinion arrangement whereas the side regulator plates 845 are movable in a direction perpendicular to the direction of movement of the rear regulator plate 844 by means of a similar moving device 847. Provided at an upper portion of the rear regulator plate 844 is a telescopic guide 848 communicated with the paper guide 843 and, accordingly, even though the rear regulator plate 844 is moved, the recording paper can be reconveyed into the cassette from the paper guide 843 in the handle portion 842. A connector 849 used to provide an indication of which one of the variable design cassette 840 and the fixed design cassette 830 is accommodated within the pocket 811 is provided at a front end wall of the respective cassette.

Figure 8:
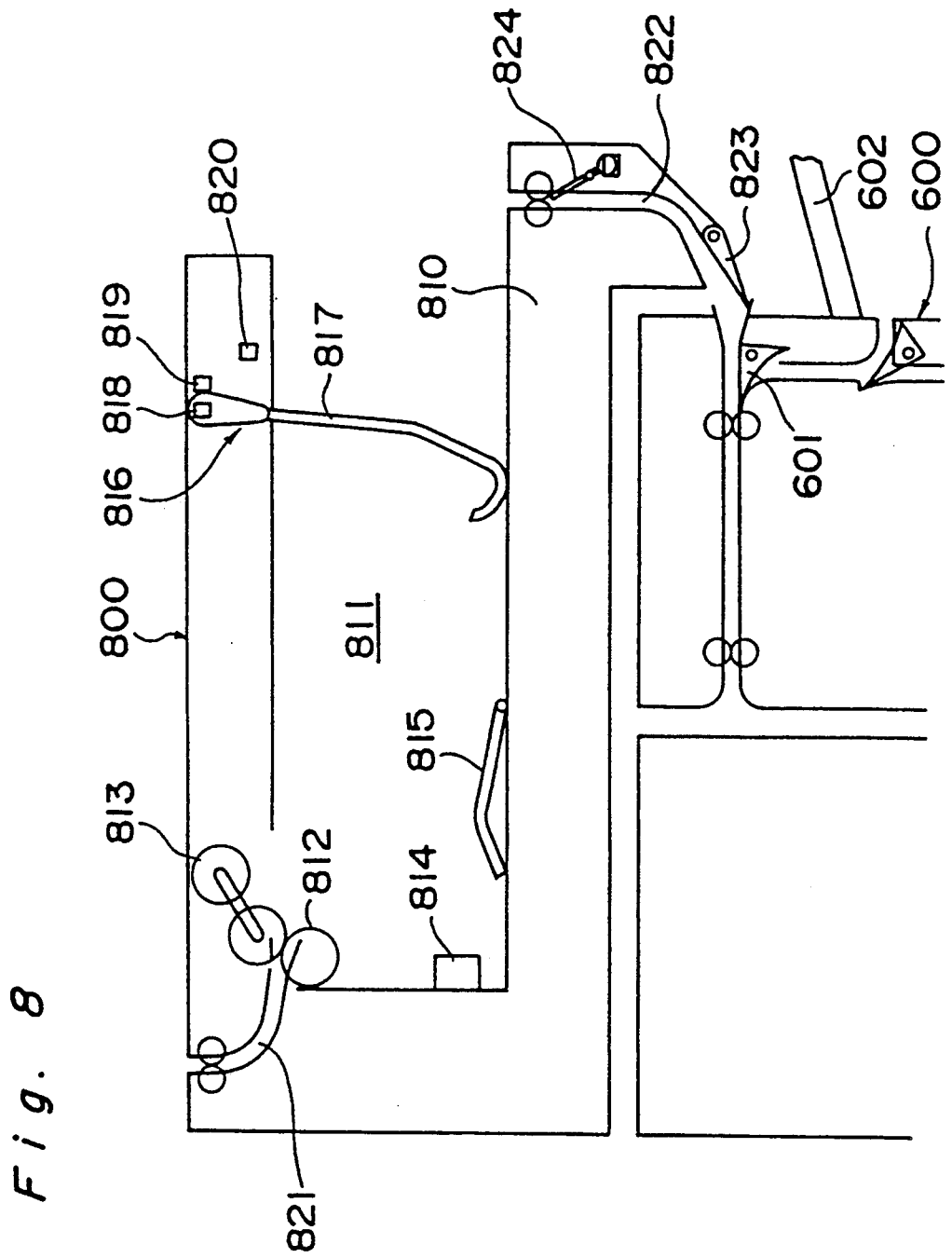
FIG. 8 is a schematic sectional view of the sheet recirculating unit.

In the construction described above, in the event that no cassette is loaded, as best shown in FIG. 8, a free end of the actuator 817 is held in contact with the bottom of the pocket 811 with the first sensor 818 consequently switched on as a result of a detection of the actuator 817 while the second and third sensors 819 and 200 are kept off. When the fixed design cassette 83 is subsequently loaded into the pocket 811 as shown in FIG. 9, the paper guide 833 is coupled with the paper guide 822 in the paper feed unit 810 and, at the same time, the paper lifting member 815 protrude into the cassette through the opening 831. The actuator 817 of the paper detecting device 816 is at this time held in contact with the bottom of the cassette and, consequently, the first sensor 818 is kept on, the second sensor 819 is switched on and the third sensor 820 is kept off. In dependence on respective signals outputted from these three sensors 818 to 820, the loading of the cassette into the pocket 811 is detected and, at the same time, since a signal inputted from the connector 814 does not change, the cassette actually loaded into the pocket 811 can be recognized as the fixed design cassette 830 while the lamp 762 in the printer operating panel 750 is consequently lit to provide a visual indication that the fixed design cassette 830 has been loaded.

In the event that the variable design cassette 840 is loaded into the pocket 811 as shown in FIG. 11, the paper lifting member 815 protrude into the cassette 840 through the opening 840 and the second sensor 819 is switched on as a result of a detection of the actuator 817 while the first and third sensors 818 and 820 are switched off. By a combination of the respective signals outputted from the first to third sensors 818 to 820, the loading of the cassette into the paper feed unit 810 is detected. Also, the connector 849 is coupled with the connector 814 and, as a result thereof, the signal inputted through the connector 849 changes, thereby allowing the host computer 100 to recognize that the cassette actually loaded is the variable design cassette 840 with the consequence that the lamp 783 in the printer operating panel 750 is lit to provide a visual indication that the variable design cassette 830 has been loaded.

(a) Mode of Use of Paper Recirculating Unit

The mode in which the paper recirculating unit 800 is used includes a first stack mode, in which a predetermined number of recording papers are stacked in one of the cassettes 830 and 840, and a second stack mode in which a stack of recording papers is placed in one of the cassettes only when the necessity arises and any one of the cassettes 830 and 840 is allowed to be empty other than when the necessity arises. One of these two stack modes is designated by the host computer 100 and, once one of the stack modes is designated, a corresponding lamp 764 or 765 in the printer operating panel 750 is lit to provide a visual indication of an associated one of the first and second stack modes which has been actually selected.

(a-1) First Stack Mode

When the first stack mode is selected while the fixed design cassette 830 is loaded in the paper feed unit 810, a predetermined number of recording papers are supplied from the paper feeder 300. At this time, the recording papers discharged from the paper feeder 300 are guided into a lower passage 503 in the paper inverter 500 having passed through a horizontal passage 307. Also, the recording paper traverses the inverting passage 504 and is transported through an upwardly extending passage 507 towards the switching lever 505. The recording paper is then guided by the switching lever 505 towards the paper discharging device 600 and is thereafter guided by the switching levers 601 and 823 into the paper guide 822 and further into the cassette through the paper guide 833. The supply of the predetermined number of the recording papers into the cassette is visually indicated by the lamp 761 in the printer operating panel 750 which is then lit.

As the number of the recording papers within the cassette 830 increases, the free end of the actuator 817 in the paper detecting device 816 elevates. When the number of the recording papers within the cassette 830 attains the predetermined value, the first sensor 818 is switched off and only the second sensor 819 is kept on. When the number of the recording papers within the cassette 830 further increases, the second sensor 819 is also switched off. However, only when the number of the recording papers within the cassette 830 attains a maximum allowable limit, the third sensor 820 is switched on. By detecting respective states of the first to third sensors 818 to 820, the number of the recording papers accommodated within the cassette can be approximated and, by detecting a change of the first to third sensors 818 to 820 from the on state to the off state or from the off state to the on state, the number of the recording papers in the cassette can be substantially accurately detected. It is to be noted that the number of the recording papers supplied from the paper feeder 300 can be accurately counted relying on a signal outputted from a sensor 824.

One of the recording papers supplied into the cassette 830 in the manner described above is fed towards the printer 700 in response to a command from the host computer 100. More specifically, when a paper feed command is generated from the host computer 100, a lamp 780 in the printer operating panel 750 is lit to provide a visual indication that the recording paper is being transported. In the paper recirculating unit 800, the paper lifting member 815 lifts the recording papers within the cassette 830 with the pickup roller assembly 813 consequently contacting the uppermost sheet of the recording papers within the cassette 830. Then, based on a rotation of the pickup roller assembly 813, the uppermost recording paper is fed outwardly from the cassette 830 and into the passage 821. The recording paper entering the passage 821 is fed by the feed roller pair 812 towards the paper transport system 740 in the printer 700.

When the selected number of the recording papers have been supplied, the pickup roller assembly 813 departs from the recording paper and the paper lifting member 813 is lowered. Also, the number of the recording papers actually fed from the paper recirculating unit 800 is automatically counted and the number of recording papers equal to that consumed is replenished from the paper feeder 300.

Even in the case of the variable design cassette 84 loaded in the paper feed unit 810, paper supply and feed processes are carried out sequentially in a manner similar to those described above in connection with the use of the fixed design cassette 830. However, in the case of the variable design cassette 840, in the event that the cassette size does not coincide with the size of recording papers replenished, the moving devices 846 and 847 are driven to move the regulator plates 844 and 845 to respective positions appropriate to the size of the recording papers supplied. At the same time, the guide 848 telescopically moves in unison with the movement of the rear regulator plate 844.

(b) Second Stack Mode

Even when the second stack mode is selected, recording papers are supplied from the paper feeder 300. However, during this mode, a number of the recording papers necessary for making prints are supplied according to a command from the host computer 100 and, when the required prints have been made, the cassette 830 or 840 is kept empty. Also, the number of the recording papers supplied from the paper feeder 300 is accurately counted in a manner similar to that described in connection with the first stack mode.

VI) System Control Scheme

The details of control of the various component parts constituting the image forming apparatus of the present invention will be described.

Figure 14:
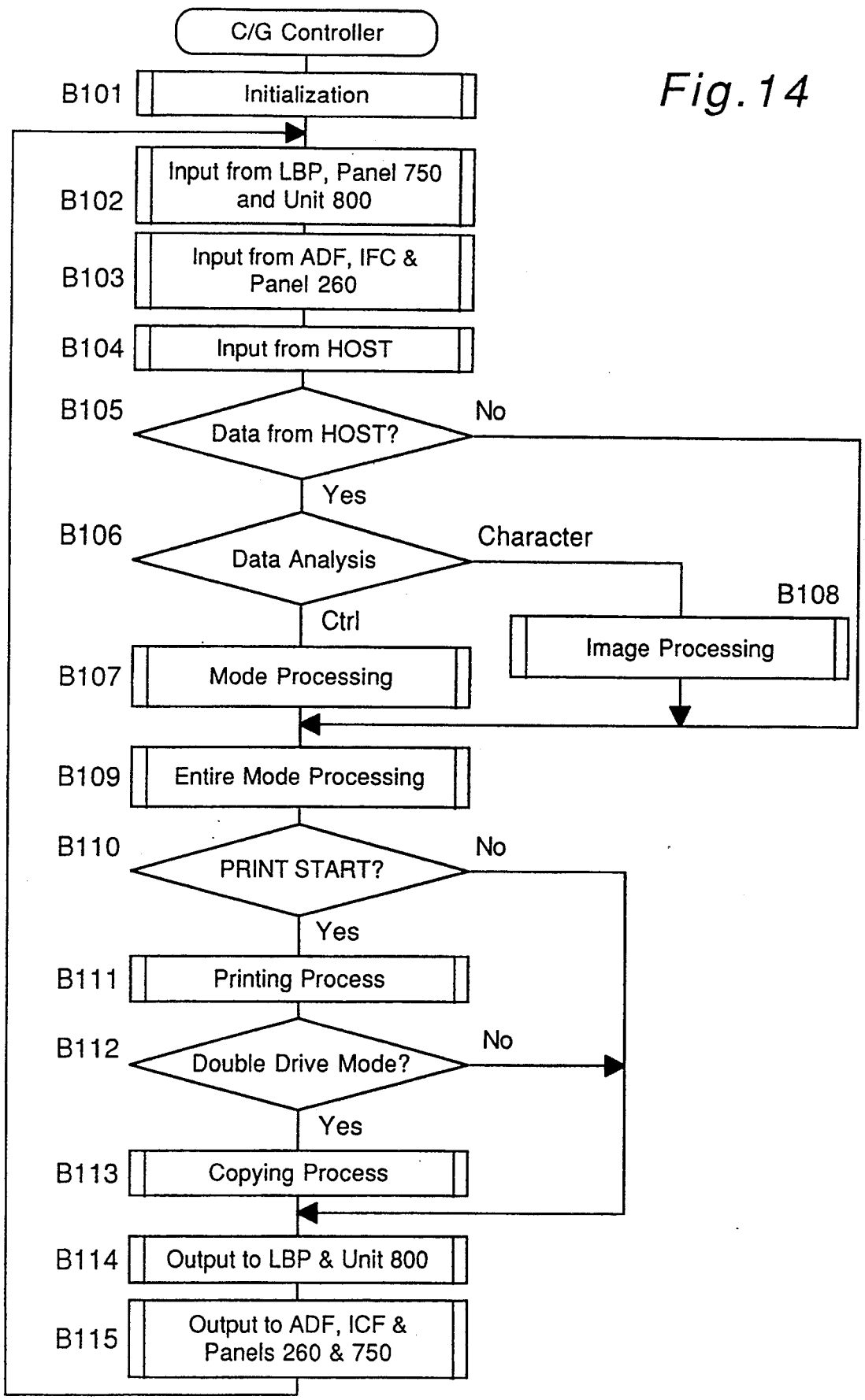
FIG. 14 is a flowchart showing the sequence of operation of a C/G controller employed in the image forming apparatus.

(a-1) C/G Controller (FIG. 14)

In the C/G controller identified by 10 in FIG. 4. an initialization takes place at step B101 when it is powered on. Subsequently, status data of the printer (LBP) 700, the printer operating panel 750 and the paper recirculating unit 800 are inputted at step B102 and data are inputted at step B103 from control processors such as the automatic document feeder (ADF) 400, the interface controller (IFC) 20 and the copier operating panel 280. By this flow, the controller 10 can ascertain the respective status of the printer 700, the paper recirculating unit 800 and the copying machine 200 and can also confirm if the copying machine 200 and the printer 700 are connected with the controller 10.

At step B104, a processing of data inputted from the host computer (HOST) 100 is carried out, followed by a decision at step B105 to determine if the data have been inputted from the host computer 100. If a result of decision at step B105 indicates the entry of the data, a data analysis is carried out at step B106. If the data analysis indicates that the data is a control data, a mode processing is carried out at step B107, but if the data analysis indicates that the data is a character data, an image processing is carried out at step B108, followed by a determination of contents of control of the image forming apparatus as a whole at step B109.

Thereafter, at step B110 a decision is made if a PRINT START signal for operating the printer 700 has been inputted and, if a result of decision at this step B110 indicates the entry of the PRINT START signal, a printing process of the printer 700 is executed at step B111. Then at step B112, a decision is made to determine if the double drive mode is selected and, if the double drive mode is selected, the double drive mode is executed together with a copying process performed by the copying machine 200 at step B113. Then data are outputted to the printer 700, the paper recirculating unit 800, the automatic document feeder 400, the interface controller 20 and the operating panels 260 and 750 at successive steps B114 and B115. On the other hand, if no double drive mode is selected even though the PRINT START signal for the printer 700 has been inputted, no copying process is performed by the copying machine 200. Upon termination of the above described program flow, the flow returns to step B102 allowing the C/G controller 10 to make a wait for the subsequent entry of inputs from the printer 700 and the paper recirculating unit 800.

Figure 15:
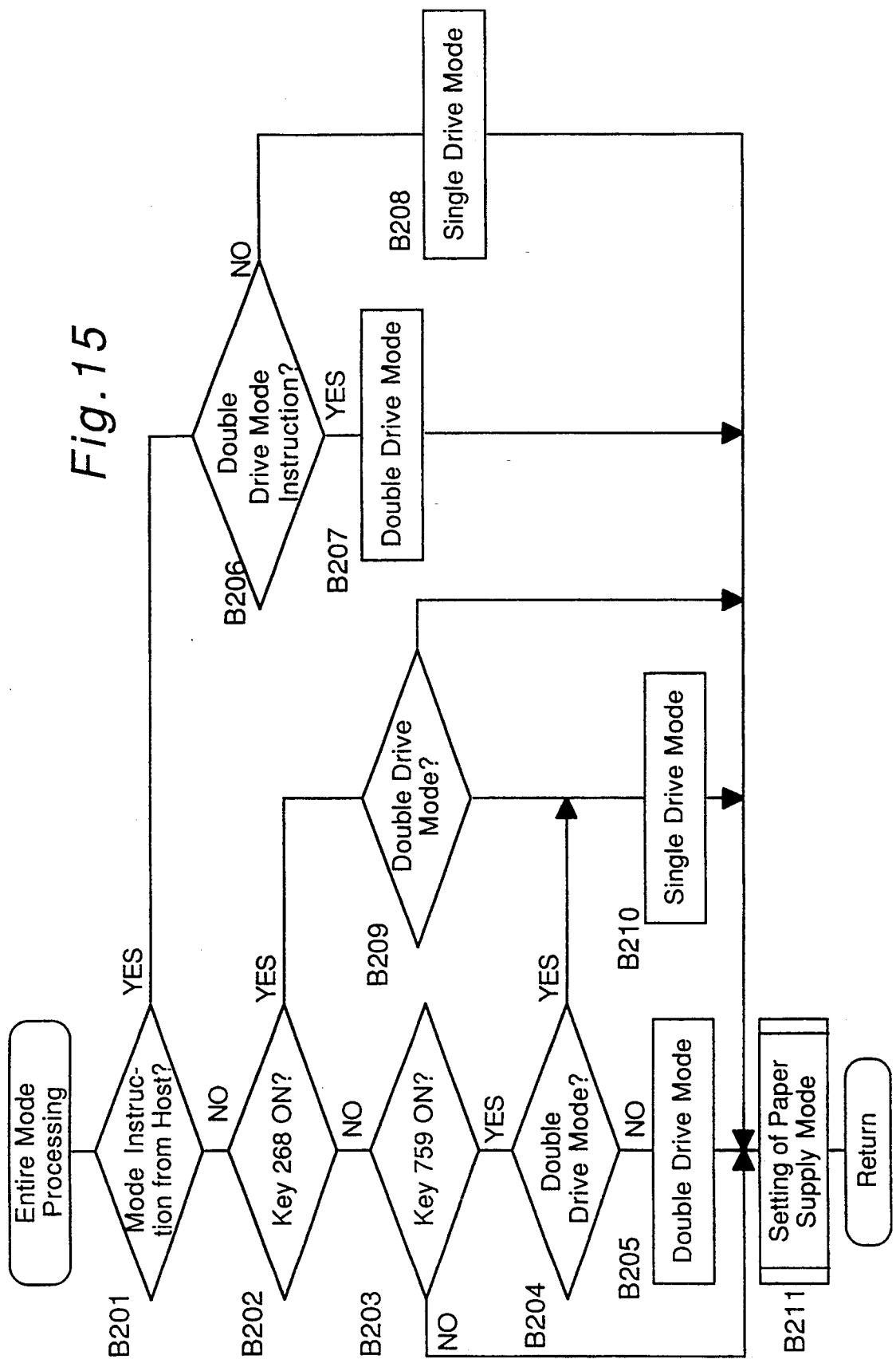
FIG. 15 is a flowchart showing an entire mode processing routine.

(a-2) Entire Mode Processing (FIG. 15)

Referring to FIG. 15, the entire mode processing performed at step B109 of FIG. 14 at step B109 starts with a decision at step B201 to determine if a particular one of the various modes are designated by the host computer 100. In other words, at step B201, the decision is made to determine which one of the double drive mode and the single drive mode is designated. In the absence of the designation of the particular mode made by the host computer 100, another decision is made at step B202 to determine if the mode selecting key 268 in the copier operating panel 260 is depressed and, if the mode selecting key 168 is found having not been depressed, a further decision is made at step B203 to determine if the select key 759 in the printer operating panel 750 is depressed. In this way, whether the selection of the double drive mode is executed or whether the selection of the single drive mode is executed can be ascertained. It is to be noted that the determination of which one of the double drive mode and the single drive mode is selected is carried out by giving a first priority to the signal from the host computer 100, a second priority to the signal from the copier operating panel 260 and a third priority to the signal from the printer operating panel 750.

Thus, if the particular mode is designated by the host computer 100, a decision is made at step B206 to determine which one of the double drive mode and the single drive mode has been designated by the host computer 100 and, depending on a result of decision made at step B206, the image forming apparatus as a whole is set in the double drive mode at step B207 or in the single drive mode at step B208.

On the other hand, if no mode designation is made by the host computer 100, and if the particular mode is designated by the copier operating panel 280, a decision is made at step B209 to determine if the image forming apparatus is set in the double drive mode. If a result of decision at step B209 indicates that the image forming apparatus is set in the double drive mode, the mode is switched over to the single drive mode at step B210, but if the result of decision at step B209 indicates that the image forming apparatus is not in the double drive mode, but in the single drive mode, the single drive mode is maintained. In other words, the mode selecting key 288 in the copier operating panel 280 merely serves to disable the double drive mode, not to switch the single drive mode, then assumed by the image forming apparatus, over to the double drive mode.

In the absence of the designation of the mode from the host computer 100, and in the event that the mode selecting key 759 in the printer operating panel 750 is depressed while the mode selecting key 288 in the copier operating panel 280 is not depressed, a decision is made at step B204 to determine if the image forming apparatus is set in the double drive mode. If a result of decision at step B204 indicates that the apparatus is set in the double drive mode, the mode is switched over to the single drive mode at step B210, but if it is set in the single drive mode, the mode is switched over to the double drive mode at step B205. After the foregoing flow, a paper feed mode setting process is executed at step B211 as will now be described.

Figure 16:
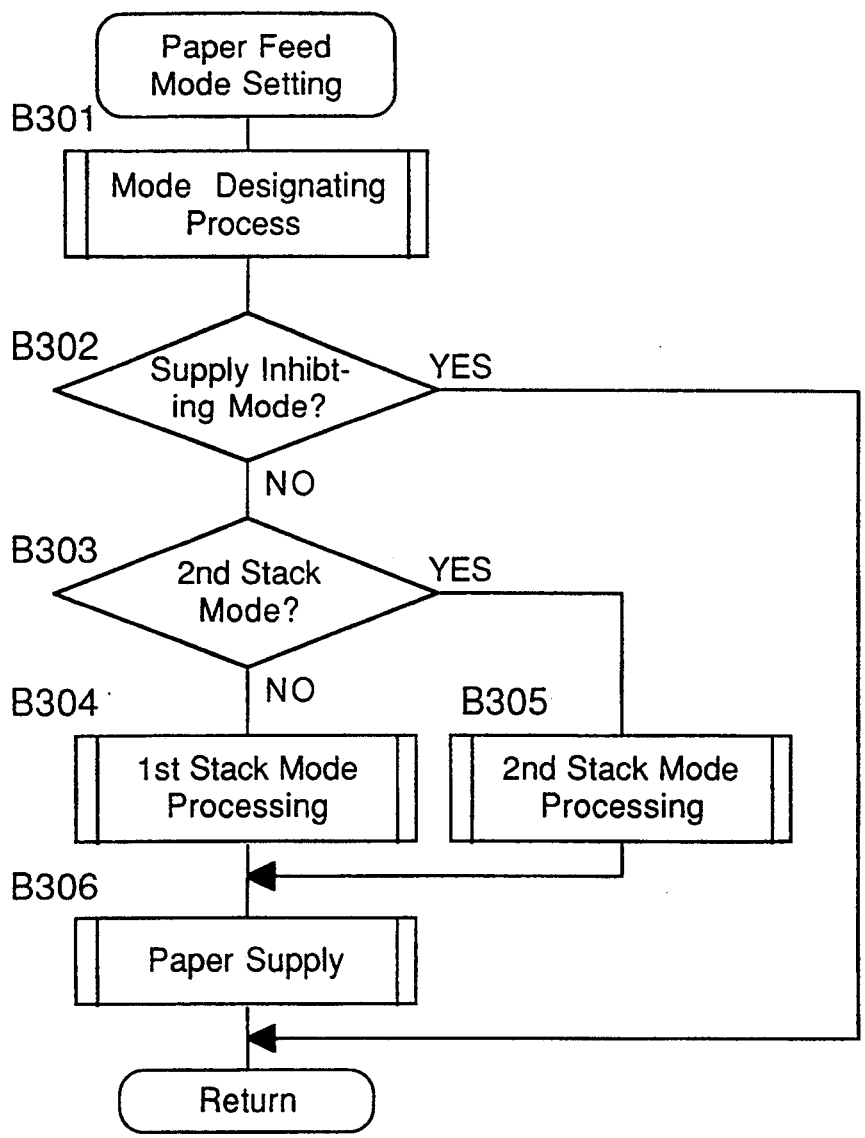
FIG. 16 is a flowchart showing a paper feed mode setting process.

(a-3) Paper Feed Mode Setting (FIG. 16)

The paper feed mode setting executed at step B211 of the entire mode processing of FIG. 15 starts with step B301 at which a mode designating process instructed from the host computer 100, the printer 700, the paper inverter (DUP) 500 and the paper recirculating unit 800 is executed. This mode designating process will be described later. At the next succeeding step B 302, a decision is made to determine if a paper supply from the paper feeder 300 to the paper recirculating unit 800 is inhibited. If the paper supply from the paper feeder 300 to the paper recirculating unit 800 is not inhibited, a decision is then made at step B303 to determine if the second stack mode is selected. Should a result of decision at step B303 indicate that the first stack mode is selected, a process under the first stack mode is executed at step B304, but should the result of decision at step B303 indicate that the second stack mode is selected, a process under the second stack mode is executed at step B305 to accomplish the supply of the recording papers from the paper feeder 300 to the paper recirculating unit 800.

Figure 17:
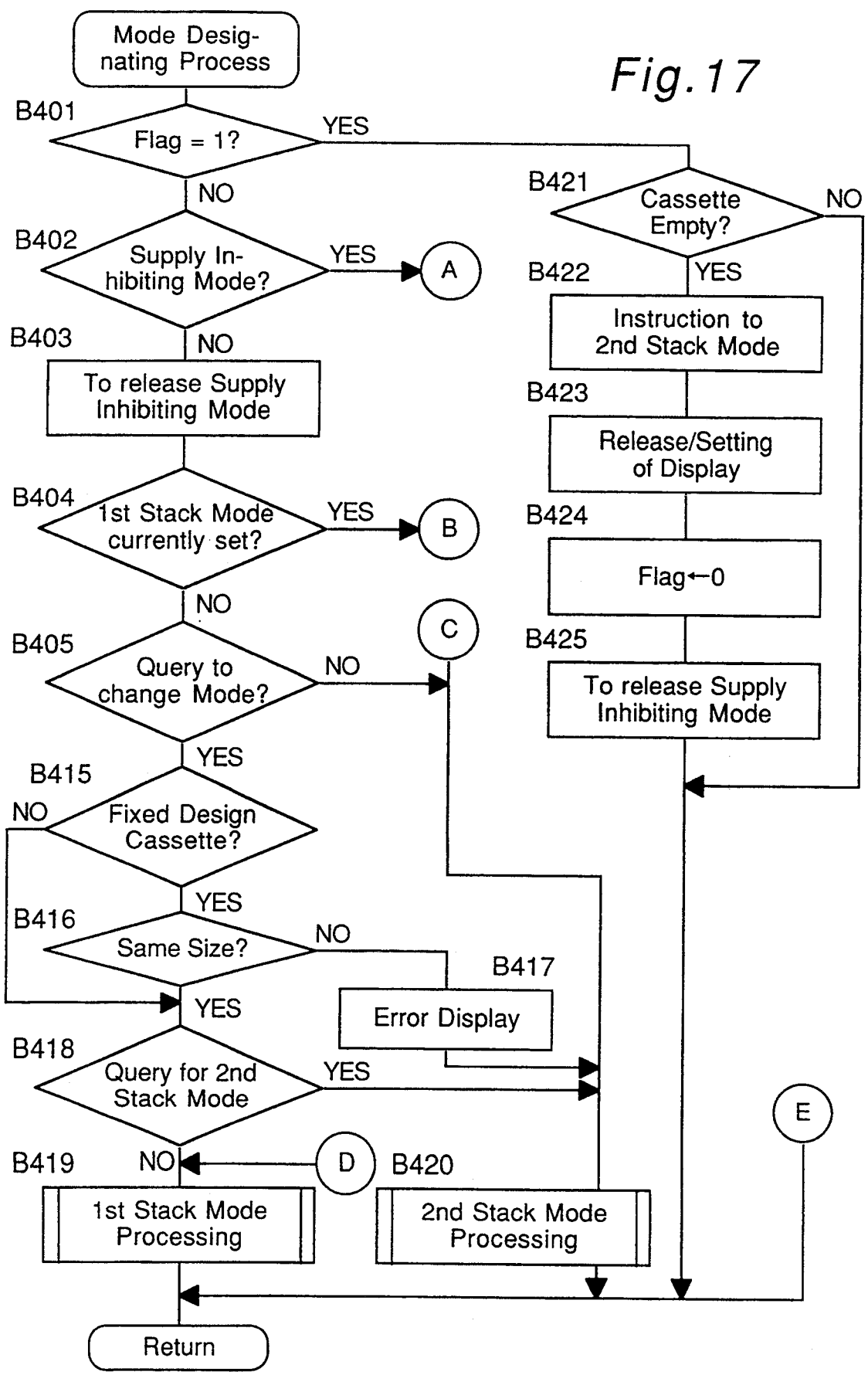
FIGS. 17 and 18 are flowcharts showing a portion of a mode designating process.
Figure 18:
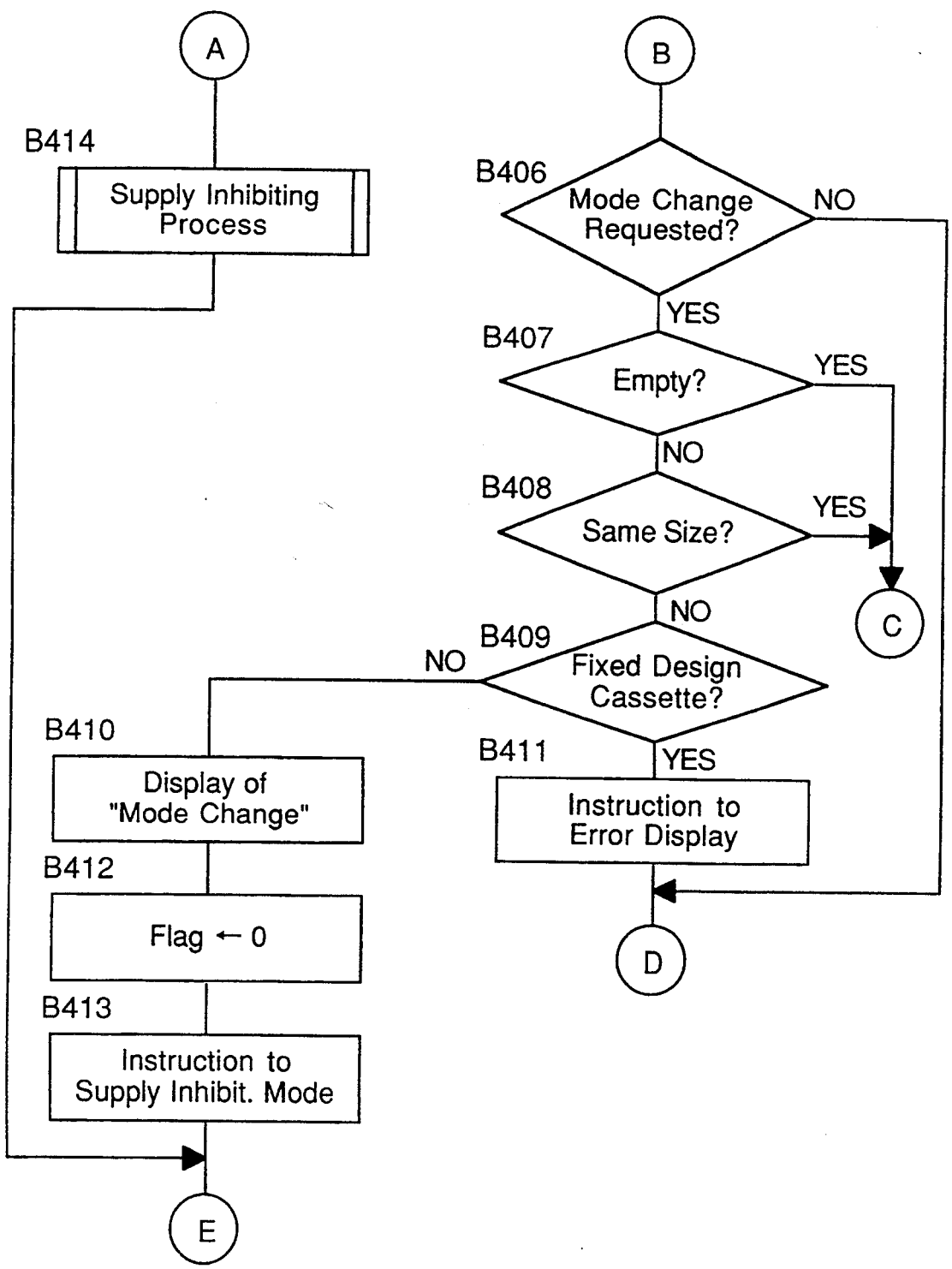

(a-4) Mode Designating Process (FIGS. 17 and 18)

The mode designating process shown at step B301 in FIG. 16 starts with a decision at step B401 to determine if a flag is set to "1". As will be described later, this flag is set to "1" when, in the event that a change from the first stack mode to the second stack mode is instructed while the variable design cassette 840 is loaded in the paper recirculating unit 800, all of the papers accommodated within the variable design cassette 840 are discharged and the mode of use of the paper recirculating unit 800 is to be changed to a condition in which the second stack mode is ready to be executed.

Where the flag is set to "1", the next succeeding decision is made at step B421 to determine if the cassette is empty with all papers having been discharged and, if some recording papers remain within the cassette, a wait is made until the cassette becomes empty with all papers discharged. When an empty condition of the cassette has been confirmed, the second stack mode is instructed at step B422 and, hence, at step B423, the lamp 764 in the printer operating panel 750 is lit to provide a visual indication that the second stack mode has been set. Thereafter, the flag is changed to "0" at step B424 and the supply of the recording papers from the paper feeder 800 to the paper recirculating unit 800 is enabled at step B425 while the supply inhibiting mode is released.

Where the flag is "0", a decision is made at step B402 to determine if the paper inverter (DUP) 500 has instructed the supply inhibiting mode and, if so instructed, the supply inhibiting process is executed at step B414. On the other hand, if this supply inhibiting mode is not instructed by the paper inverter 500, the supply inhibiting mode is released at step B403, followed by a decision at step B404 to determine if the first stack mode is currently set.

In the event that the first stack mode is not set, that is, the second stack mode is set, a decision is made at step B405 to determine if a query for a change between the single and double drive modes and between the first and second stack modes has been made by the host computer 100 and the copier operating panel 260 or the printer operating panel 750. In the absence of the query for the mode change, the second stack mode is instructed and is then maintained at step B420. On the other hand, in the presence of the query for the mode change, a decision is made at step B415 to determine if the cassette loaded on the paper recirculating unit 800 is the fixed design cassette.

Where the fixed design cassette 830 is loaded in the paper recirculating unit 800, a decision is made at step B416 to determine if the specified paper side is equal to the cassette size and, if it is not equal to the cassette size, an error indication is displayed on a display of the host computer 100 and the display unit 751 of the printer operating panel 750 while the second stack mode is instructed at successive steps B417 and B420, but if it is equal to the cassette size, a decision is made at step B418 to determine if a query for the second stack mode is made. On the other hand, where the variable design cassette 840 is loaded on the paper recirculating unit 800, a decision is immediately made at step B418 to determine if the query for the second stack mode is made. If the request for the second stack mode is made, the mode is changed to the second stack mode at step B420, but if no request for the second stack mode is made, the first stack mode is maintained at step B419. In other words, while the fixed design cassette 830 is loaded, the current mode, that is, the second stack mode is maintained if the specified size is not equal to the cassette size, but the mode is changed onto the first stack mode if the specified size is equal to the cassette size. In the case of the variable design cassette 840, the mode is changed onto the first stack mode regardless of the cassette size currently employed.

In the event that a result of decision at step B404 indicates that the first stack mode is currently set, a decision is made at step B406 to determine if any mode change request is made by the host computer 100, the copier operating panel 260 and the printer operating panel 750. In the absence of the mode change request, the first stack mode is continuously instructed at step B419. On the other hand, in the presence of the mode change request, a decision is made at successive steps B407 and B408 to determine if the cassette is empty and if the cassette size and the specified paper size are equal to each other. If the cassette is empty or if the specified paper size is equal to the cassette size, the mode is changed onto the second stack mode at step B420. More than that, if the cassette is not empty and the specified paper size is not equal to the cassette size, a decision is made at step B409 to determine if the cassette loaded is the fixed design cassette 880 and, since the fixed design cassette 830 cannot accommodate recording papers of a different size and, hence, it is not possible to change onto the second stack mode, instructions are made at step B411 to effect a display of an error indication, followed by a continuous instruction to maintain the first stack mode at step B419.

However, if the cassette loaded is the variable design cassette 840, and even if the cassette size currently set is not equal to the size of the newly specified recording papers, the recording papers accommodated in the cassette 840 are discharged and the recording papers of a different size can be accommodated by moving the regulator plates 844 and 845. Accordingly, so long as the variable design cassette 840 is loaded, a discharge process for discharging the currently accommodated recording papers and a move process for moving the regulator plates 844 and 845 are initiated and, at the same time, an indication that the mode is being changed is displayed on the display at step B410, followed by a setting of the flag to "1" at step B412 so that, up until the termination of such processes, the supply inhibiting mode is instructed at step B413 to inhibit the supply of recording papers from the paper feeder 300 to the paper recirculating unit 800.

Figure 19:
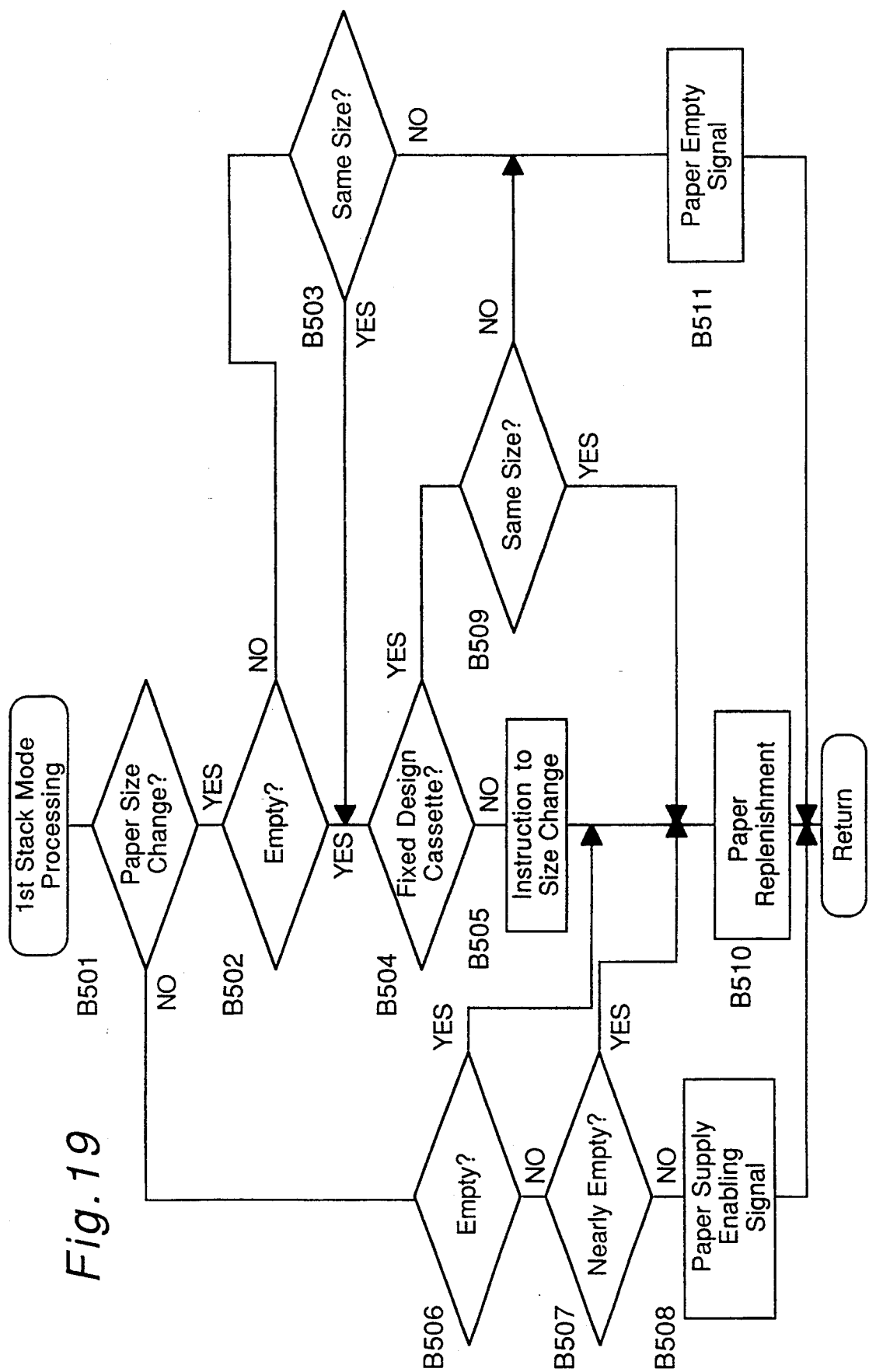
FIGS. 19 is a flowchart showing a first stack mode process.

(a-5) First Stack Mode Processing (FIG. 19)

The first stack mode process starts with a decision at step B501 to determine if a request to change from the currently set paper size to a different paper size has been made and, if the request has been made, another decision is made at step B502 to determine if the cassette is empty. If the cassette is found empty, a further decision is made at step B504 to determine if the cassette is the fixed design cassette 830. On the other hand if the cassette is found not empty, a decision is made at step B503 to determine if the remaining recording papers are of a size equal to the specified size and, if it is not of the size equal to the specified size, a paper empty signal is synthesized at step B511, but if it is of a size equal to the specified size, a decision is made at step B504 to determine if the loaded cassette is the fixed design cassette 830.

Provided that the fixed design cassette 830 is not being used, that is, the variable design cassette 840 is currently used, a size change required to move the regulator plates 844 and 845 is instructed at step B505, followed by an instruction to supply recording papers from the paper feeder 300 to the paper recirculating unit 800 at step B510. On the other hand, if the fixed design cassette is currently used, a decision is made at step B509 to determine if the cassette size is equal to the specified size, and if the cassette size is equal to the specified size, an instruction is made at step B510 to effect a supply of the recording papers from the paper feeder 300 to the paper recirculating unit 800, but if it is not equal to the specified size, a paper empty signal is synthesized at step B511.

In other words, in the event that the change of the specified size is instructed, and if the fixed design cassette 830 is currently used, the paper supply is instructed when the size instructed to change is equal to the cassette size of the fixed design cassette 830, but the paper empty signal is synthesized if it is not equal to the cassette size of the fixed design cassette 830. Similarly, in the event that the change of the specified size is instructed and if the variable design cassette 840 is currently used, the paper empty signal is synthesized only when some papers remain in the cassette and the paper size currently accommodated in the cassette is not equal to the size newly specified and, other than that, the paper supply is instructed.

When a result of decision at step B501 indicates that no instruction to change the size is not made, a decision is made at step B506 to determine if the cassette is empty and, if the cassette is empty or nearly empty, an instruction is made at step B510 to effect a supply of papers from the paper feeder 300 to the paper recirculating unit 800, but if a sufficient number of recording papers remains within the cassette, a supply enabling signal indicative of the capability of supplying the papers to the printer 700 is synthesized at step B508. It is to be noted that the term "nearly empty" referred to above and hereinafter is intended to means that a slight number of recording papers remains within the cassette.

Figure 20:
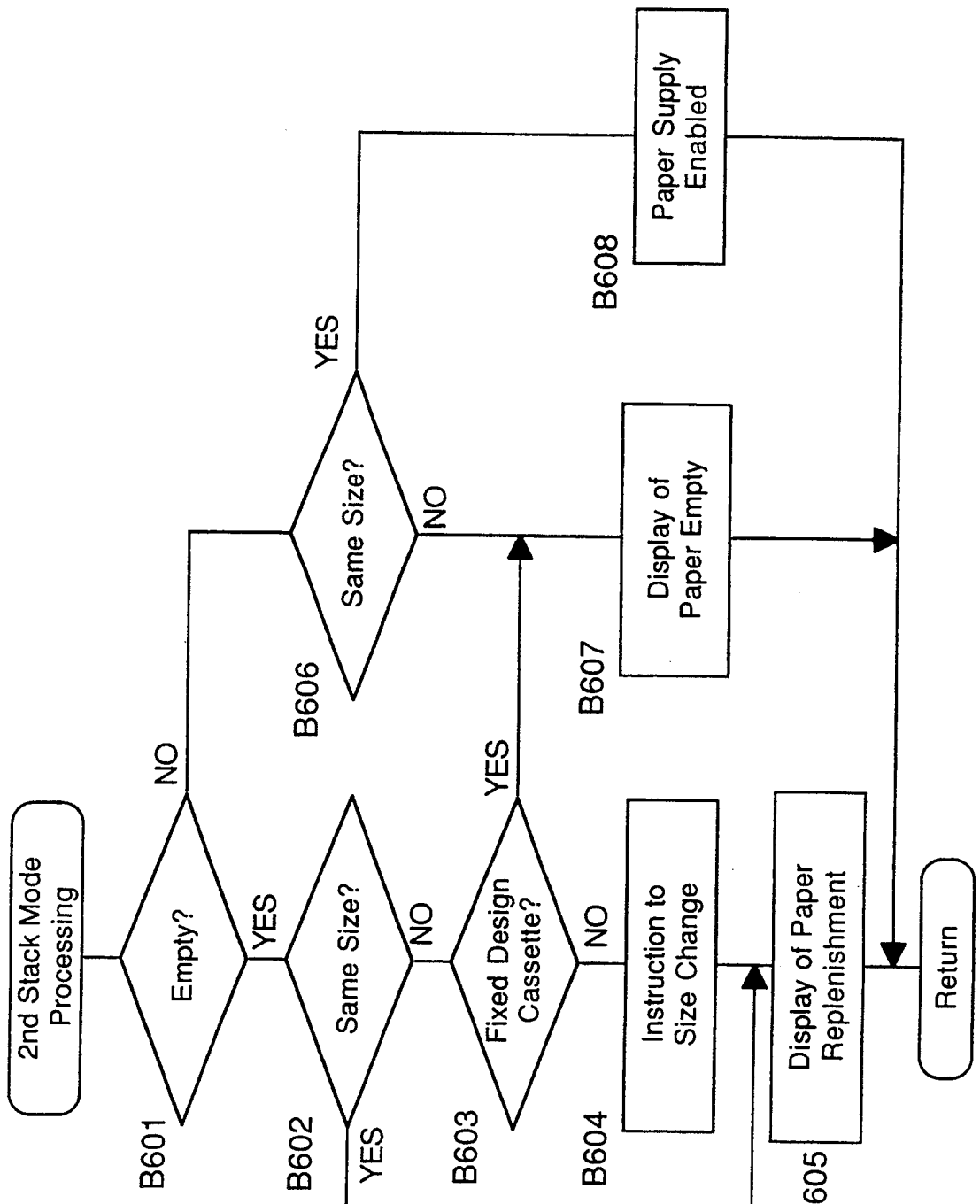
FIG. 20 is a flowchart showing a second stack mode process.

(a-6) Second Stack Mode Processing (FIG. 20)

The second stack mode process starts with a decision at step B601 to determine if the cassette is empty. If the cassette is not empty and accommodate a stack of recording papers, a decision is then made at step B606 to determine if the recording papers in the cassette is of a size equal to the specified size and, if it is the specified size, a paper supply from the paper recirculating unit 800 to the printer 700 is permitted at step B608, but if it is not the specified size, an paper empty indication is displayed at step B607 on the display.

In the case where the cassette is empty, a decision is made at step B602 to determine if the specified size is equal to the cassette size and, if it is equal to the cassette size, a paper supply from the paper feeder 300 to the paper recirculating unit 800 is displayed at step B605.

On the other hand, if it is not equal to the cassette size, a decision is made at step B603 to determine if the cassette loaded in the paper recirculating unit 800 is the fixed design cassette 830 and, if it is the fixed design cassette, the paper empty indication is displayed at step B607. On the other hand, if it is the variable design cassette 840, not the fixed design cassette 830, after the regulator plates 844 and 845 have been moved to change the cassette size over to the specified size at step B604, the paper supply indication is displayed at step B605. It is to be noted that the display of the paper supply indication is carried by means of lighting a lamp 761 on the printer operating panel 750.

Figure 21:
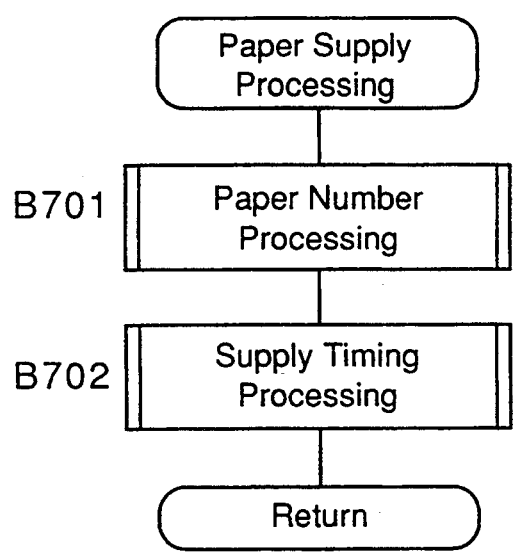
FIG. 21 is a flowchart showing a flowchart of a paper replenishment process.

(a-7) Paper Supply Processing (FIG. 21)

The paper supply process executed at step B306 of the flow of FIG. 16 consists of a paper number process and a paper supply timing process executed respectively at steps B701 and B702, which will now be described.

Figure 22:
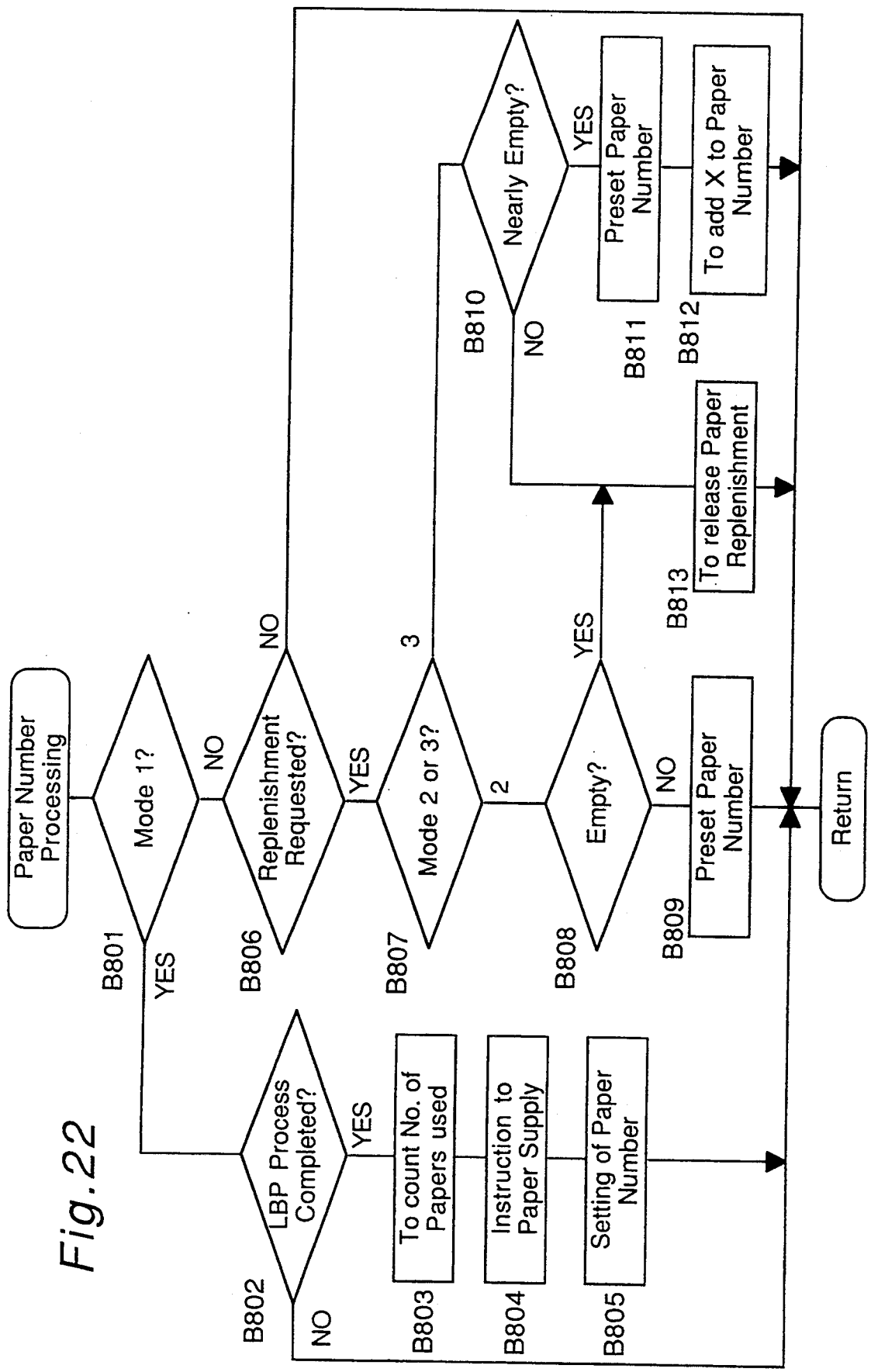
FIG. 22 is a flowchart showing a paper number processing.

(a-8) Paper Number Processing (FIG. 22)

The paper number process executed at step B701 of the flow of FIG. 21 is associated with a process for supplying the recording paper from the paper feeder 300 to the paper recirculating unit 800 and is performed according to a mode set by the supply number setting key 272 on the copier operating panel 260. There are three available modes that can be selected by the supply number setting key 272; a supply processing mode 1 during which the number of recording papers equal to the number of the recording papers consumed by the printer 700 are supplied after the completion of the image forming cycle, a supply processing mode 2 during which only recording papers in a preset number are supplied when the cassette is empty of papers, and a supply processing mode 3 during which a predetermined number of recording papers are supplied when the cassette is nearly empty.

This paper number processing starts with a decision at step B801 to determine if the supply processing mode 1 is selected. Since this supply processing mode 1 is a mode during which the recording papers equal in number to that of the recording papers consumed by the printer 700 are supplied, another decision is made at step B802 to determine if the printer (LBP) 700 has completed a cycle and, if the cycle of the printer 700 has terminated, the number of the recording papers consumed is counted at step B803, followed by an instruction to effect a supply at step B804 and then a setting of the number of recording papers to be supplied at step B805.

If the supply processing mode 1 is not selected, a decision is made at step B806 to determine if there exists an instruction to supply recording papers from the paper feeder 300 to the paper recirculating unit 800 and, if there is no instruction, a wait is made, but if there is the instruction, a decision is made at step B807 to determine which one of the supply processing modes 2 and 3 is selected. Should the supply processing mode 2 be selected, a decision is made at step B808 to determine if the cassette is empty and, if the cassette is empty, the preset number of recording papers is set at step B809, followed by a release at step B813 of the paper supply instruction if the cassette is not empty.

On the other hand, should the supply processing mode 3 be selected, a decision is made at step B810 to determine if the cassette is nearly empty. If the cassette is nearly empty, the number of the recording papers required to supply is set at step B811 and, then, the number X of recording papers supplied from the cassette in the paper recirculating unit 800 is added to the number of the recording papers supplied.

Figure 23:
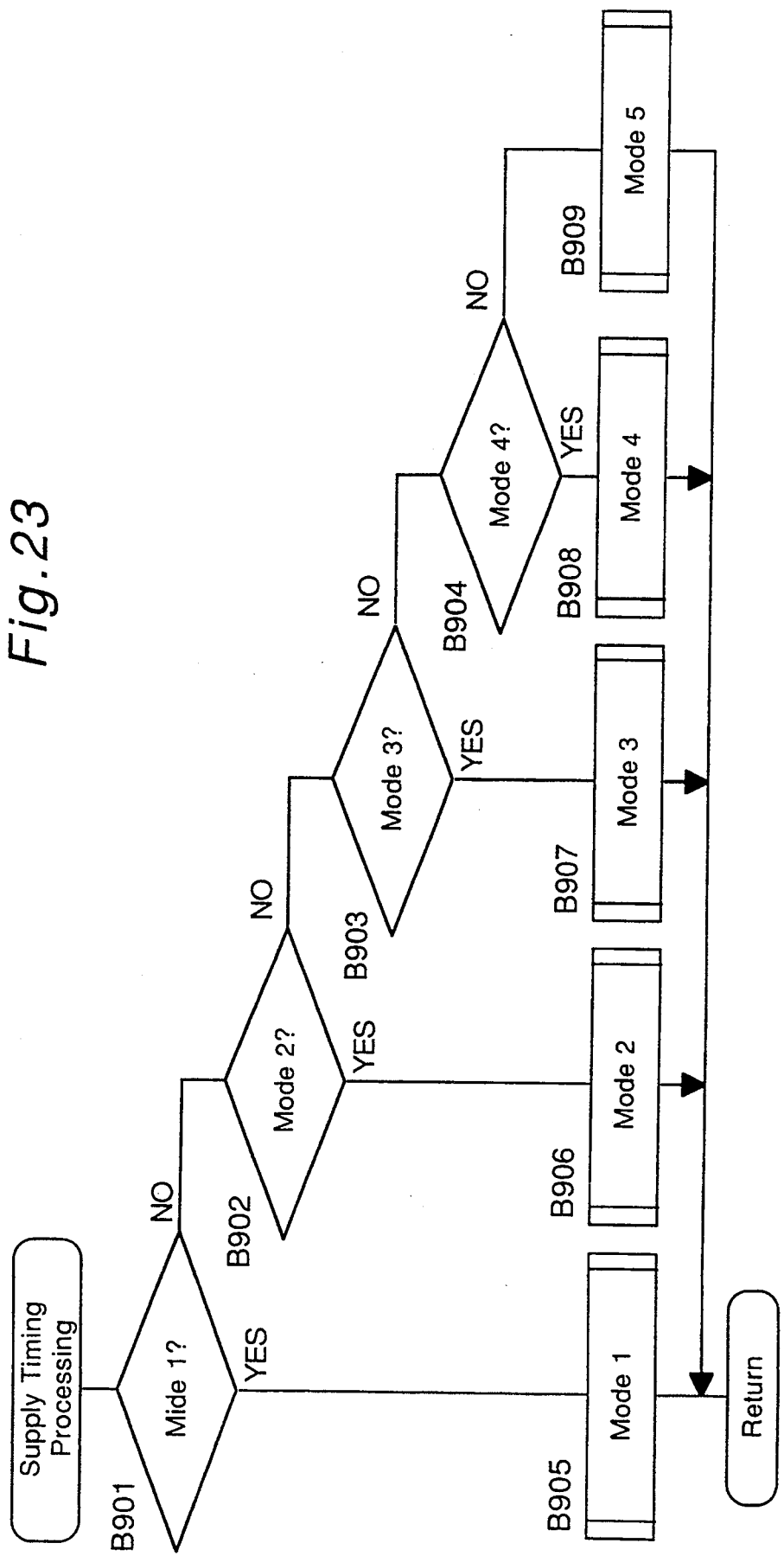
FIG. 23 is a flowchart showing a showing a supply timing processing.

(a-9) Supply Timing Processing (FIG. 23)

The supply timing process executed at step B701 of the flow of FIG. 21 is associated with a process of the timing of supply of recording papers from the paper feeder 300 to the paper recirculating unit 800 and is carried out according to a mode set by the supply timing selecting key 273 on the copier operating panel 260. There are five modes that can be selected by the supply timing selecting key 273. Accordingly, during the execution of this supply timing process, a decision is made at each step B901, B902, B903 and B904 to determine which one of the timings has been selected by the supply timing selecting key 273 and, then, an appropriate process corresponding to the selected mode is carried out at respective step B905, B906, B907, B908 and B909.

Figure 24:
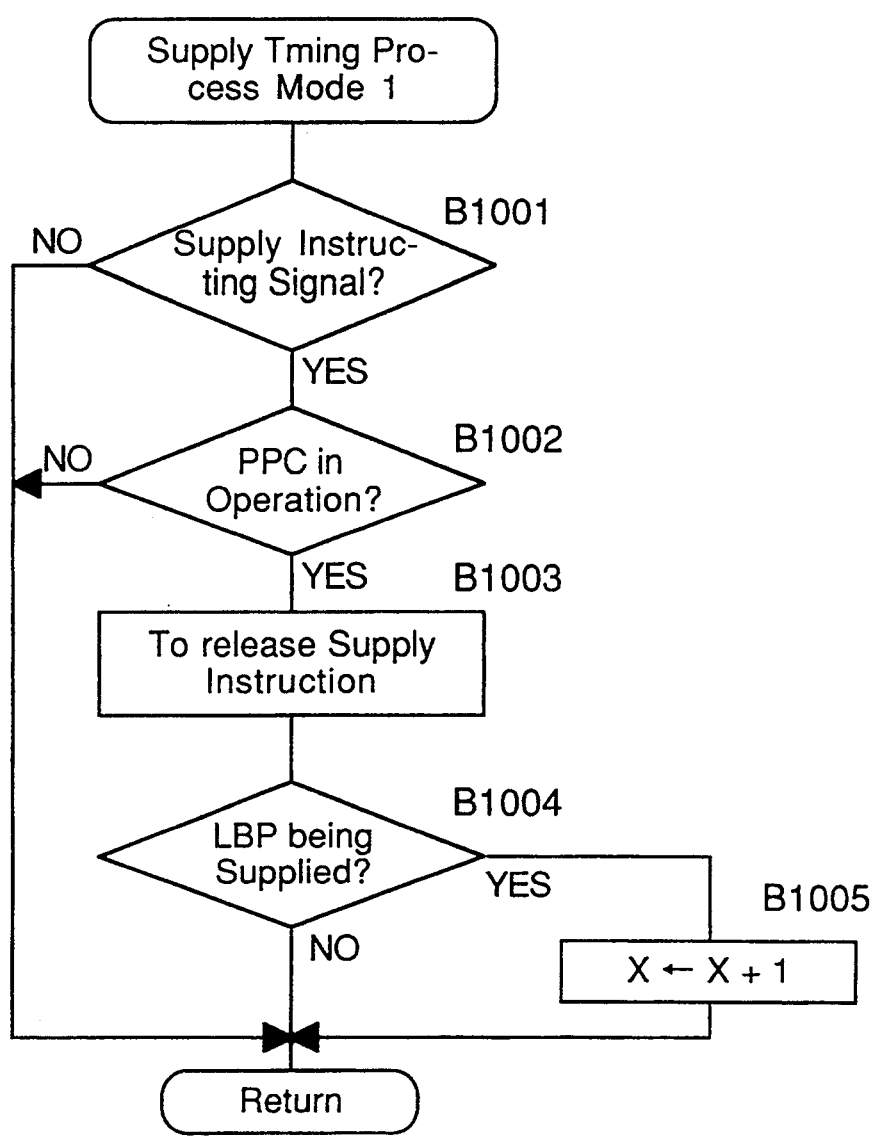
FIG. 24 is a flowchart showing the sequence of a mode 1 of the supply timing processing.

(a-10) Supply Timing Process Mode 1 (FIG. 24)

The supply timing processing mode 1 is a mode in which a priority is given to the process of the copying machine 200 and starts with a detection at step B1001 of a supply instructing signal. If the supply instructing signal has been detected as generated, a decision is made at step B1002 to determine if the copying machine 200 is being operated. If the copying machine 200 is being operated, the supply instruction to the paper recirculating unit 800 is released at step B1003. Also, a decision is made at step B1004 to determine if the process of paper supply from the paper recirculating unit 800 to the printer 700 is executed and, if the paper supply is executed, a value "1" is added at step B1005 to the number X of the recording papers supplied from the paper feeder 300 to the paper recirculating unit 800. In other words, the number of the recording papers consumed by the printer 700 during a period in which the supply of the recording papers from the paper feeder 300 to the paper recirculating unit 800 is interrupted is calculated and the recording papers of a number added with the calculated number are supplied after the completion of the process of the copying machine 200 to keep the number of the recording papers in the paper recirculating unit 800 at a predetermined value.

Figure 25:
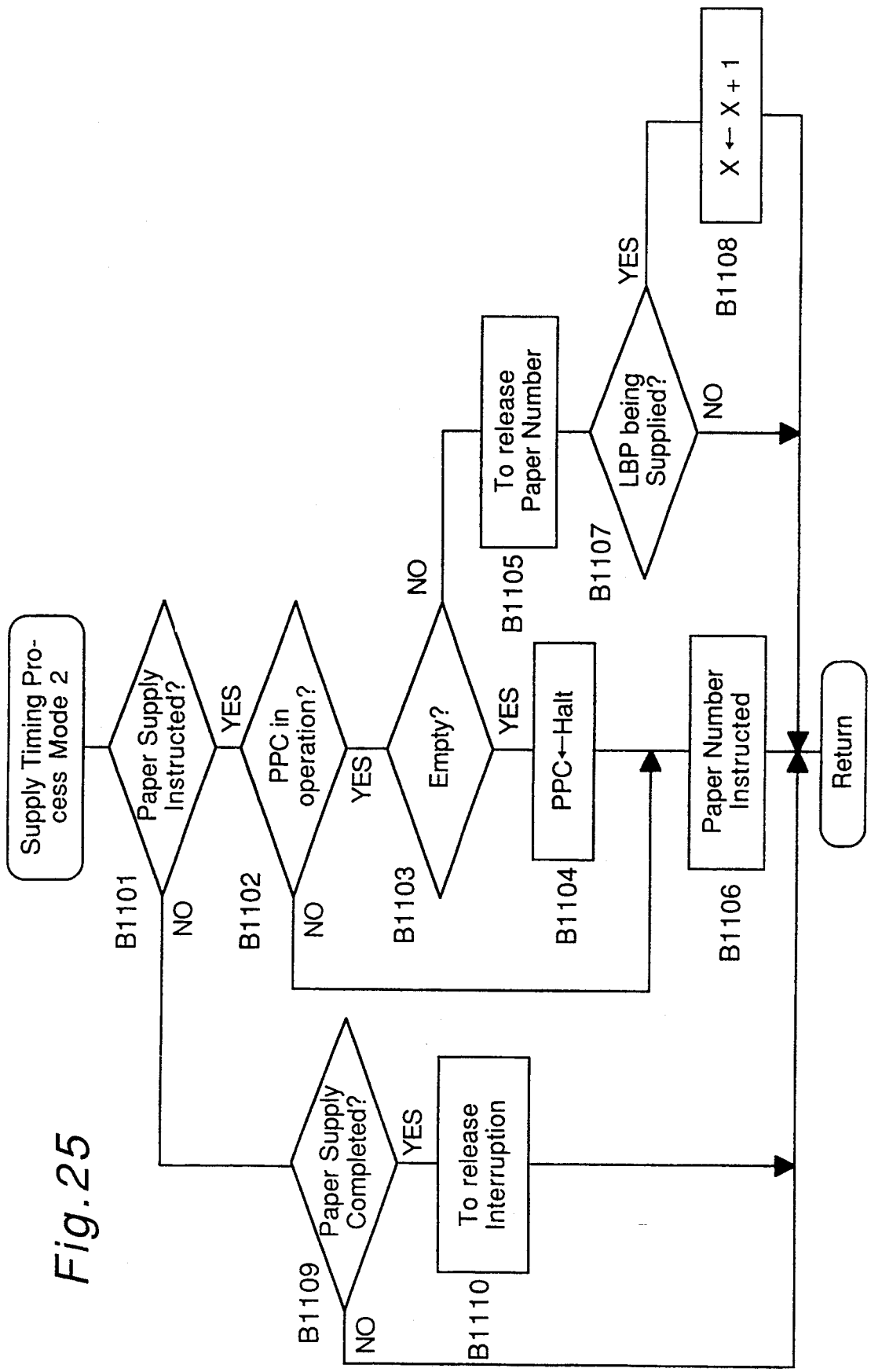
FIG. 25 is a flowchart showing the sequence of a mode 2 of the supply timing processing.

(a-11) Supply Timing Processing Mode 2 (FIG. 25)

This supply timing processing mode 2 is a mode in which, although a priority is given to the process of the copying machine 200, an interruption is made to allow the recording papers to be supplied from the paper feeder 300 to the paper recirculating unit 800 when prior to the termination of the process of the copying machine 200 the cassette becomes empty. This processing mode 2 starts with a detection at step B1101 of a supply instructing signal from the paper feeder 300 to the paper recirculating unit 800. If this supply instructing signal is detected, a decision is then made at step B1102 to determine if the copying machine 200 is being operated and, if the copying machine 200 is not operated, the number of the recording papers to be supplied is instructed at step B1106, followed by an execution of the paper supply. On the other hand, if the copying machine 200 is being operated, a decision is made at step B1103 to determine if the cassette in the paper recirculating unit 800 is empty. If the cassette is found empty, the copying machine 200 is temporarily brought to a halt at step B1104, the number of the recording papers to be supplied is instructed at step B1106, and the recording papers are supplied from the paper recirculating unit 800. However, if the cassette is not empty, the supply instruction is released at step B1105, followed by a decision at step B1107 to determine if the recording papers are supplied from the paper recirculating unit 800 to the printer 700. If the supply of the recording papers is executed, a value "1" is added at step B1005 to the number X of the recording papers to be supplied from the paper feeder 300 to the paper recirculating unit 800. In the event that a result of decision at step B1101 indicates that no supply instructing signal is detected, a decision is made at step B1109 to determine if the supply has completed and, if the supply has completed, the interruption process is released at step B1110, allowing the copying machine 200 to resume the process.

Figure 26:
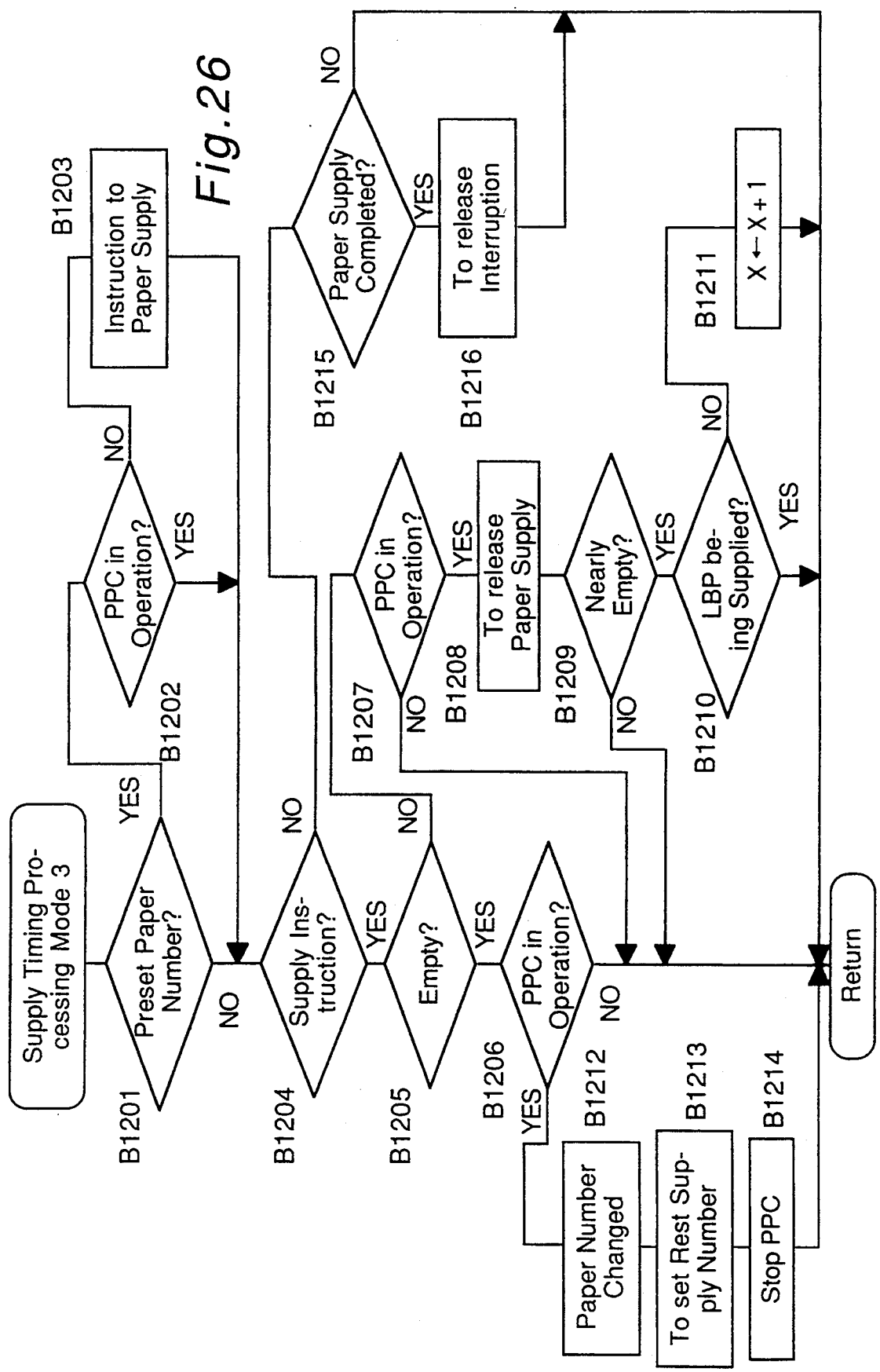
FIG. 26 is a flowchart showing the sequence of a mode 3 of the supply timing processing.

(a-12) Supply Timing Processing Mode 3 (FIG. 26)

This supply timing processing mode 3 is a mode in which, although an interruption is made to the process of the copying machine 200 as is the case with the supply timing processing mode 2, a limited number of recording papers are for the time being supplied to the paper recirculating unit 800 during the interruption process and the rest of recording papers are supplied thereto after the process of the copying machine 200 has been completed. It is to be noted that the term "rest supply number" used in the following description is intended to means the rest of the number of the recording papers to be supplied to the paper recirculating unit 800.

This processing mode 3 starts with a decision at step B1201 to determine if the rest supply number is set. If the rest supply number is set, another decision is made at step B1202 to determine if the copying machine 200 is being operated and, if it is not operated, the supply of recording papers in a number equal to the rest supply number is instructed at step B1203.

If the rest supply number is not set, a decision is made at step B1204 to determine if there is a supply instruction and, if there is the supply instruction, another decision is made at step B1205 to determine if the cassette in the paper recirculating unit 800 is empty. If the cassette in the paper recirculating unit 800 is empty, a further decision is made at step B1206 to determine if the copying machine 200 is being operated and, if it is not operated, the supply is executed. On the other hand, if the copying machine 200 is being operated, the number of recording papers to be supplied is changed at step B1212 to the number of recording papers to be supplied for the time being, the rest supply number is then set at step B1213, and the copying machine 200 is brought to a halt at step B1214. In this way, the process of supply from the paper feeder 300 to the paper recirculating unit 800 is executed according to the previously described process performed at step B1203.

On the other hand, if the cassette is not empty, a decision is made at step B1207 to determine if the copying machine 200 is being operated and, if it is not operated, a wait is made, but if it is operated, the supply instruction is released at step B1208. A decision is also made at step B1209 to determine if the cassette is nearly empty. If the cassette is nearly empty, a decision is then made at step B1210 to determine of recording papers are supplied from the paper recirculating unit 800 to the printer 700 and, if the paper supply is executed, a value "1" is added at step B1211 to the number X of recording papers required to be supplied from the paper feeder 300 to the paper recirculating unit 800.

Figure 27:
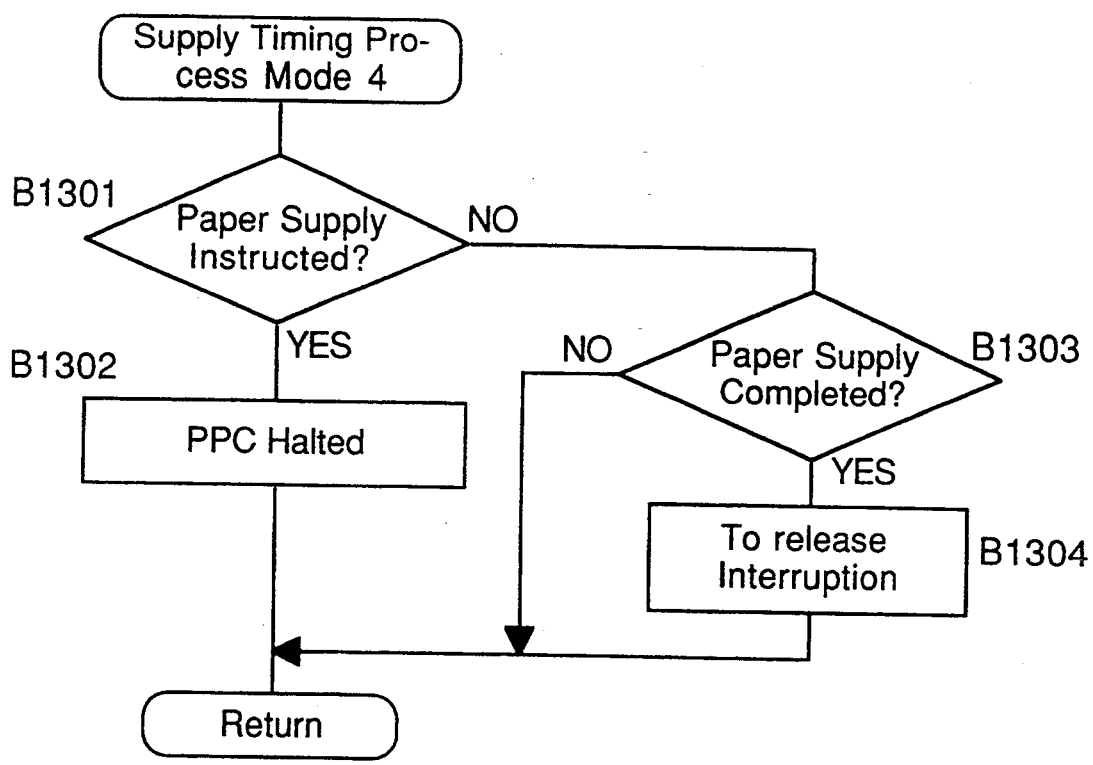
FIG. 27 is a flowchart showing the sequence of a mode 4 of the supply timing processing.

(a-13) Supply Timing Processing Mode 4 (FIG. 27)

The supply timing processing mode 4 is a mode in which an interruption is made to the process of the copying machine 20 to give a priority to the supply of recording papers to the paper recirculating unit 800. This processing mode 4 starts with a detection at step B1301 of a supply instructing signal for instructing a supply of recording papers from the paper feeder 300 to the paper recirculating unit 800. When the supply instructing signal is detected, an interruption is made to the copying machine 200 to brine the latter to a halt at step B1302. On the other hand, in the absence of the supply instruction, a decision is made at step B1303 to determine if the paper supply has been completed. If the paper supply has not yet been completed, the paper supply is continued and, when the paper supply is completed, the interruption is released at step B1304 to allow the copying machine 200 to resume the process.

Figure 28:
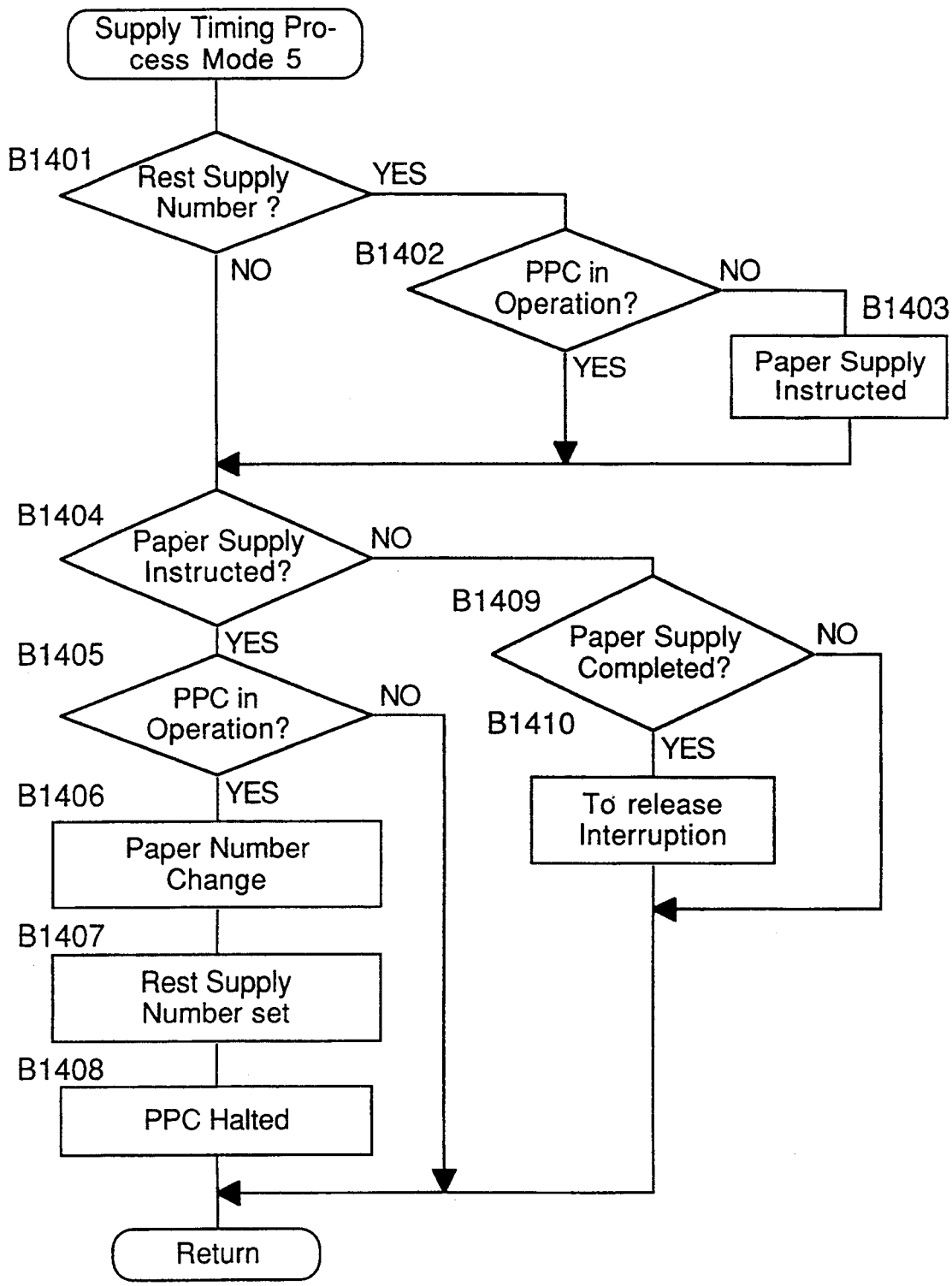
FIG. 28 is a flowchart showing the sequence of a mode 5 of the supply timing processing.

(a-14) Supply Timing Processing Mode 5 (FIG. 28)

The supply timing processing mode 5 is a mode in which, although the interruption is made to the copying machine 200 to give the priority to the supply of recording papers from the paper feeder 300 to the paper recirculating unit 800, the recording papers are supplied in a number for the time being and the rest of the recording papers (the rest supply number) is supplied after the termination of the process of the printer 700. This processing mode 5 starts with a decision at step B1401 to determine if the rest supply number is set. If the rest supply number is set, another decision is made at step B1402 to determine if the copying machine 200 is being operated. If the copying machine 200 is being operated, a wait is made, but if the operation of the copying machine 200 is terminated, the supply is instructed.

On the other hand, where no rest supply number is set, the supply instructing signal for instructing the supply of the recording papers from the paper feeder 300 to the paper recirculating unit 800 is detected at step B1404. When the supply instructing signal is detected, another decision is made at step B1405 to determine if the copying machine 200 is being operated. If the copying machine 200 is in a non-operating condition, the supply is executed, but if the copying machine 200 is in operation, the number of supply of the recording papers is changed at step B1406, the rest supply number is set at step B1407 and the copying machine 200 is brought to a halt at step B1408. Should it be determined at step B1409 that the supply has been completed, the interruption process is released at step B1410.

Figure 29:
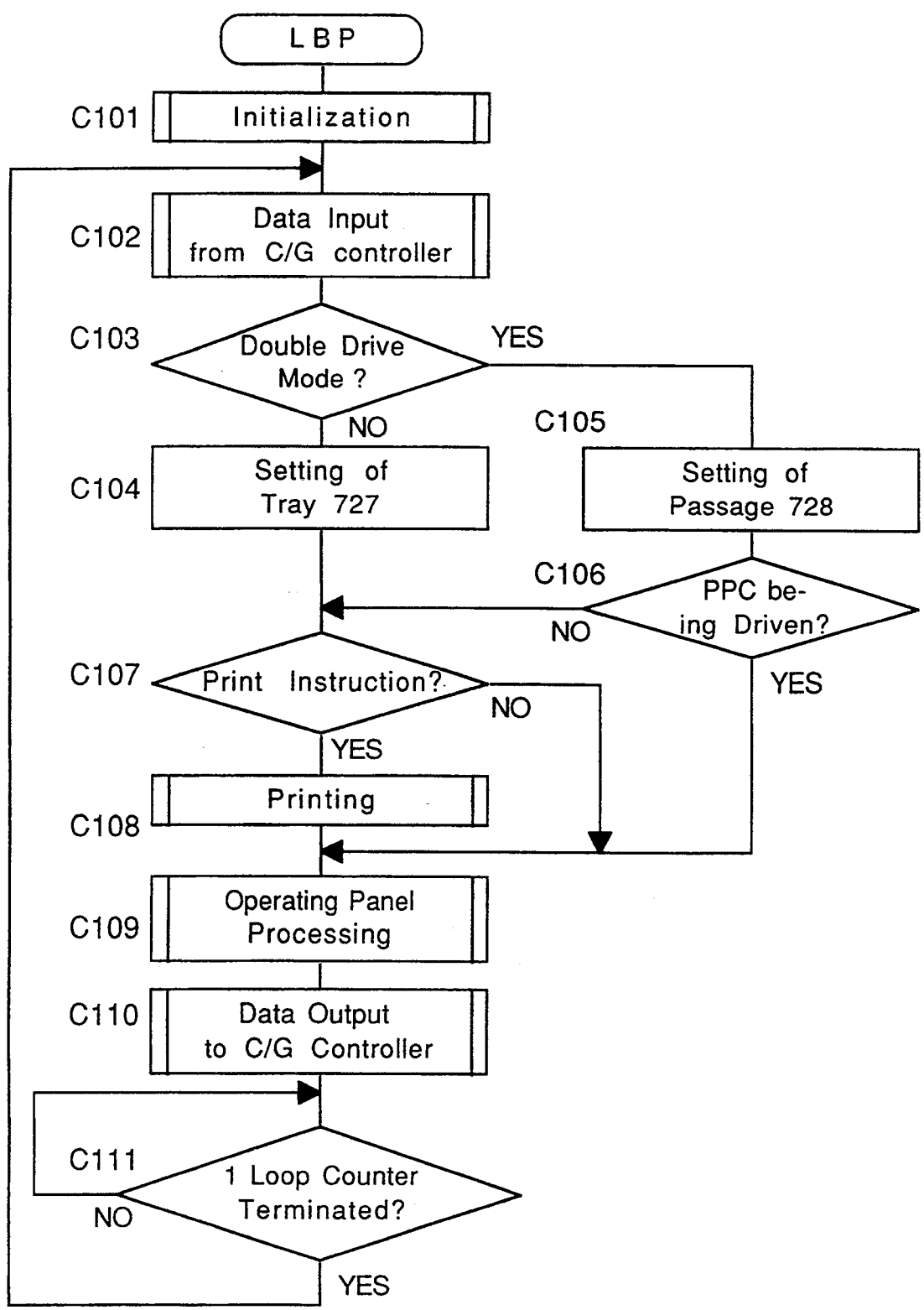
FIG. 29 is a flowchart showing the sequence of control of a laser printer employed in the image forming apparatus.

(b) Printer (FIG. 29)

In a control processor in the printer 700, an initialization takes place at step C101, followed by an inputting of data from the controller 10. The data so inputted includes settings of print modes. Then, a decision is made at step C103 to determine if the double drive mode is selected. If the double drive mode is not selected, the switching lever 726 disposed in the vicinity of a downstream portion with respect to the direction of transport of the recording paper towards the fixing unit 725 in the printer 700 is set in a position required to feed the recording paper, having passed through the fixing unit 725, towards the discharge tray 727. On the other hand, if the double drive mode is selected, the switching lever 726 is set in position required for the recording paper having passed through the fixing unit 725 to be transported into the passage 728.

In the event that the single drive mode is selected, after the direction of transport of the recording paper has been set to the discharge tray 727, a check of a print instruction is made at step C107. A signal to be checked is included in the data inputted from the controller 10 at step C102. If the print instruction is available, a printing process by the printer 700 is executed at step C108 and, thereafter, an operating panel processing as will be described later takes place at step C109.

In the event that the double drive mode is selected, after the direction of transport of the recording paper has been set to the document delivery unit 900, a check is made at step C106 to determine if the copying machine 200 is being driven. If the copying machine 200 is held still, a check as to the presence or absence of the print instruction is made to execute the printing process, but if the copying machine 200 is not driven, the operating panel processing takes place at step C109 without the printing process taking place.

After the operating panel processing has been terminated, a signal indicative of the status of the laser printer 700 is outputted at step C110 to the controller 10 and, then, a decision is made at step C111 to determine if a single loop counter has terminated. If the single loop counter has terminated, the process at step C102 is executed again.

Figure 30:
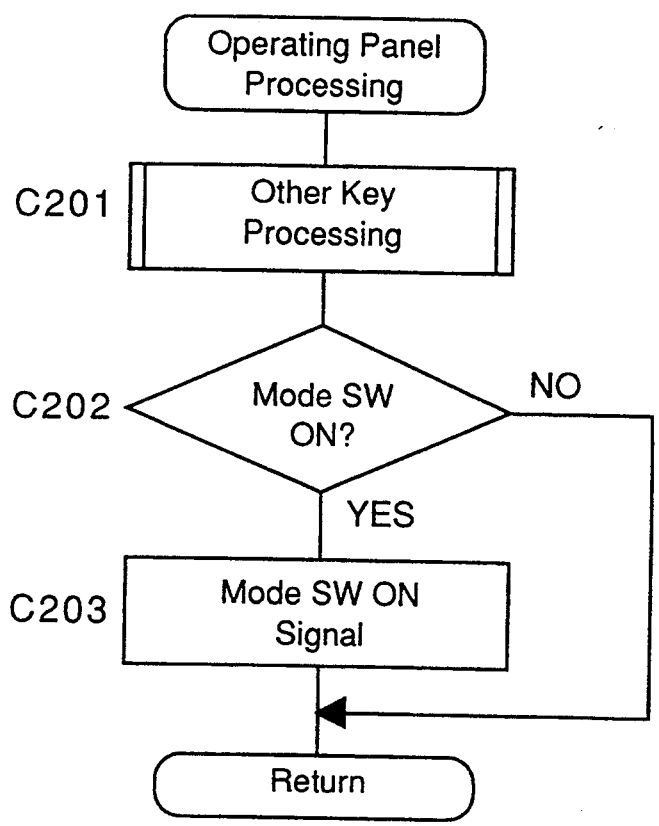
FIG. 30 is a flowchart showing an operating panel processing.

(c) Operating Panel Processing (FIG. 30)

During the execution of the operating panel processing at step C109 of the flow of FIG. 29, other key processes are executed at step C201, followed by a decision at step C202 to determine if the mode selecting key 268 is depressed. If the key 268 is depressed, a signal to that effect is set at step C203, but if it is not depressed, the program flow returns. It is to be noted that a signal indicating that the mode selecting key 268 has been depressed is outputted at step C110 to the controller 10 and the controller 10 determines one of the double drive mode and the single drive mode.

Figure 31:
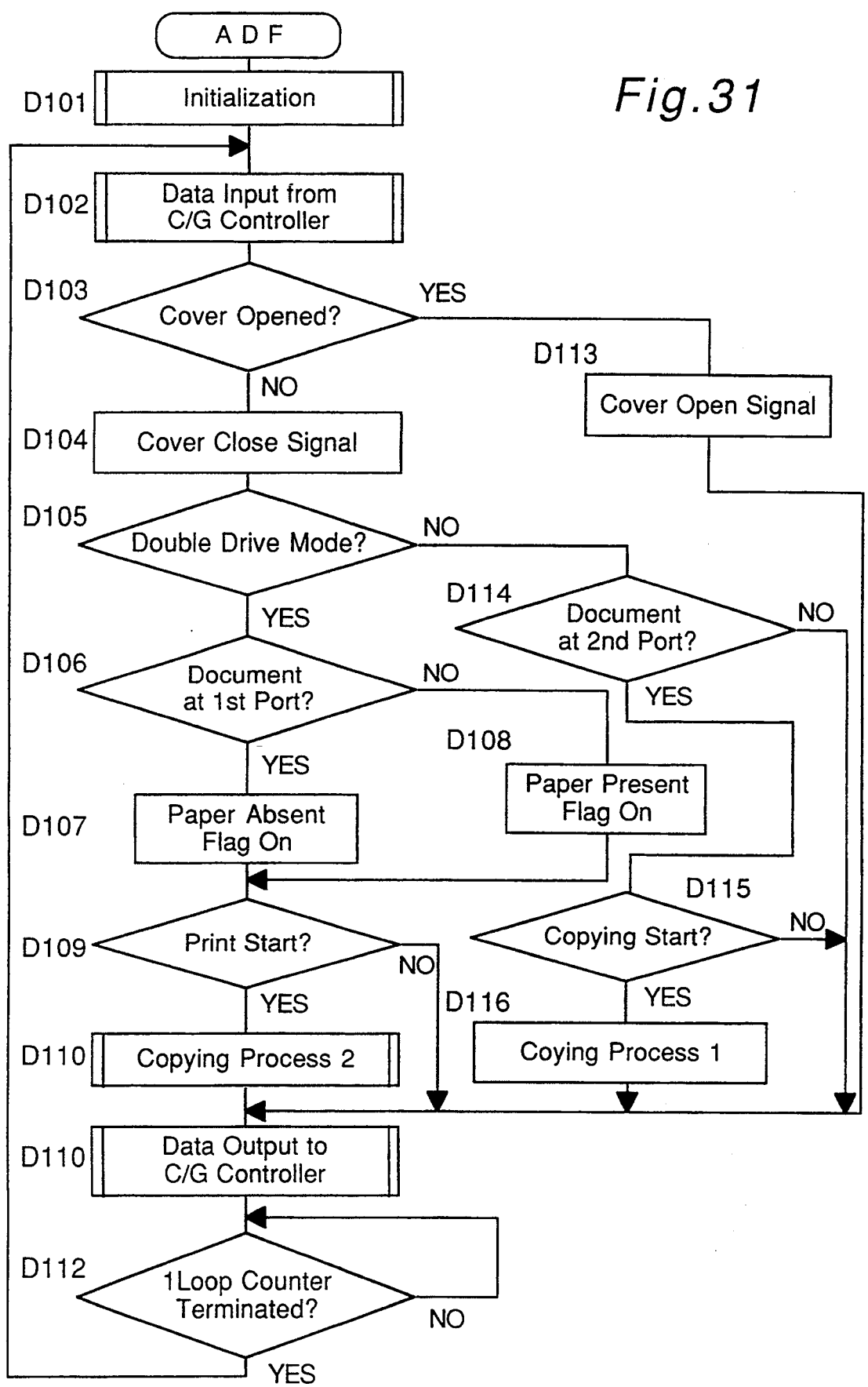
FIG. 31 is a flowchart showing the sequence of control of the automatic document transport device.

(d) Automatic Document Feeder (ADF) 400 (FIG. 31)

In a control processor of the automatic document feeder 400, subsequent to an initialization at step D101, data from the controller 10 are received at step D102. The data inputted from the controller 10 include those of the single and double drive modes, some set by the instruction from the host computer 100 and some set by the operating panel.

Then, a decision is made at step D103 to determine if automatic document feeder 400 is open to the copying machine 200. If the automatic document feeder 400 is open to the copying machine 200, a cover open signal necessary to interrupt the process of the automatic document feeder 400 regardless of the selected mode is synthesized at step D113 and is then outputted to the controller 10 at step D104. On the other hand, if the automatic document feeder 400 is closed to the copying machine 200, a cover close signal is synthesized at step D104, followed by a decision at step D105 to determine if the double drive mode is selected. Depending on a result of the decision at step D105, the flow ramifies.

In the event that the double drive mode is not selected, that is, the single drive mode is selected, a decision is made at step D114 to determine if the document is set at the document tray 420 (a second document port). This determination is carried out on the basis of a signal outputted from a paper detecting sensor (not shown). In the absence of the document, a data thereof is outputted to the controller 10 at step D111, but in the presence of the document, the presence or absence of a copy start signal is checked at step D115. If the copy start signal is inputted, a copying process 1 is executed at step D116. During this copying process 1, the document is transported in a designated mode and is turned upside down or the next succeeding document is transported, depending on which one of the double side copying mode and the composite copying mode is selected.

Where the double drive mode is selected, a decision is made at step D106 to determine if based on an output signal from the sensor 422 the document has been transported from the document delivery unit 900 to the automatic document feeder 400. If the transport of the document has been detected, a paper present flag is set at step D108, but if the document is absent, a paper absent flag is set at step D107. Then, the presence or absence of the copy start signal is checked at step D109 and, if the copy start signal exists, a copying process 2 is executed at step D110. During this copying process 2, the document is guided onto the document platen 221 in unison with the speed of paper transport of the printer 800.

After the foregoing processing, such data as the paper present flag and the paper absent flag are outputted to the controller 10 at step D111, a decision is made at step D112 to determine the termination of the single loop counter, and thereafter the process at step D102 is again executed. In other words, assuming that tile double drive mode is selected and the documents are successively outputted from the printer 700, signals of the paper present flag and the paper absent flag are set on the basis of the signal from the sensor 422 and are then outputted to the controller 10. Also, not only are the documents supplied to the automatic document feeder 400 transported successively onto the document platen 221, but also the next succeeding document outputted from the printer 700 is supplied by the document delivery unit 900 to the automatic document feeder 400.

Figure 32:
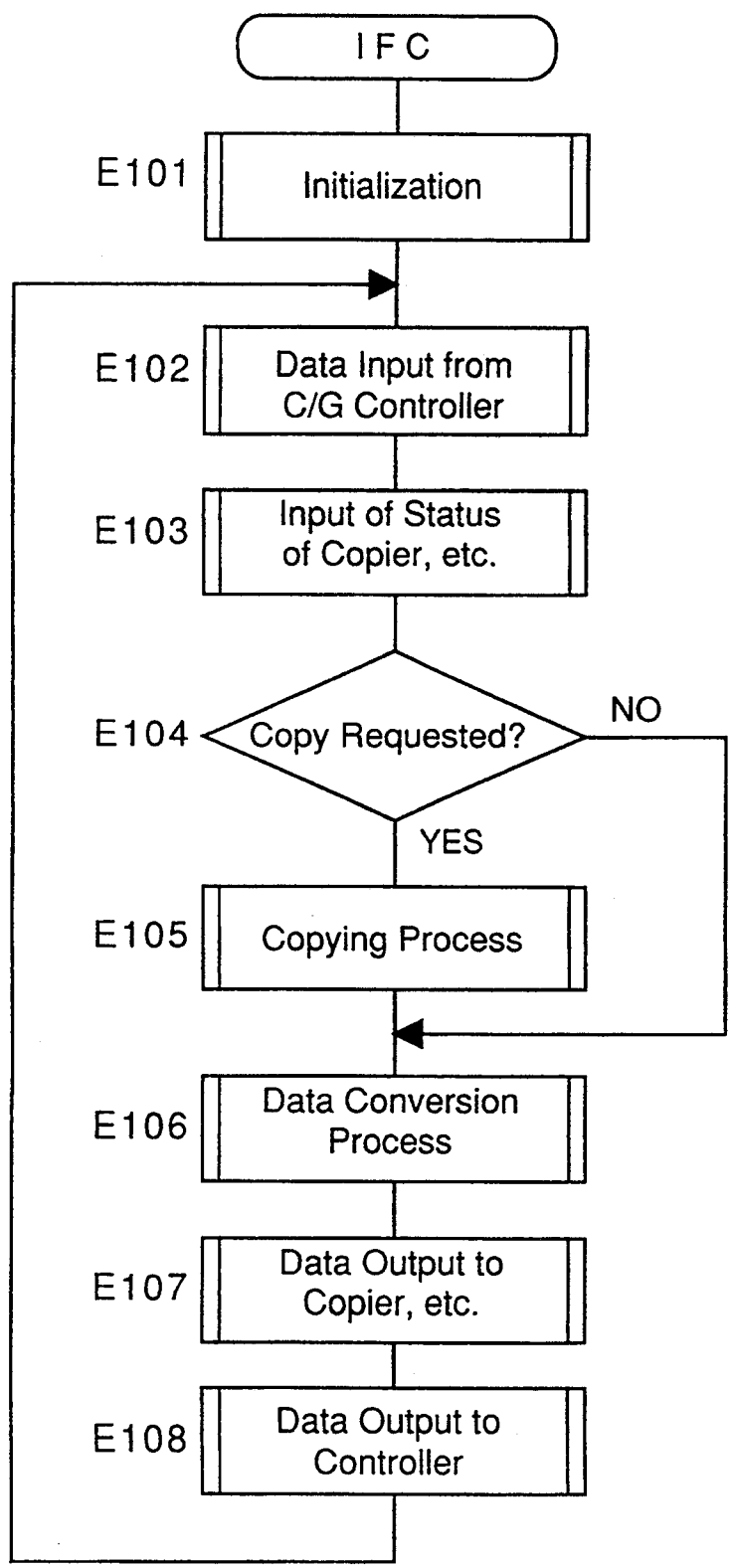
FIG. 32 is a flowchart showing the sequence of control of an interface controller.

(e) Interface Controller (IFC) (FIG. 32)

In a control processor of the interface controller (IFC) 20, after an initialization taking place at step E101, necessary data, particularly operating modes of the copying machine 200, are inputted from the controller 10 at step E102. Then, a signal indicative of the status of each of the copying machine 200, the paper feeder 300, the paper inverter 500 and the paper discharging device 600 are inputted at step E103. In other words, signals indicative of the absence of recording papers and of the opening of a front door are inputted. Subsequently, a decision is made at step E104 to determine the presence or absence of a query for copies. If the query for the copies is present, a copying process and a data conversion process are successively executed at steps E105 and E106. On the other hand, in the absence of the query for the copies, the data conversion process is executed at step E106 without the copying process being executed.

After the data conversion process has been terminated, input signals during the copying process and timing signals for the copying machine 200, the paper feeder 300 and the paper discharging device 600 are outputted to the corresponding options and the controller 10 at respective steps E107 and E108. In other words, the interface controller 20 sends the total information concerning the start and the timing of the various options of the copying machine 200 and the paper inverter 500 back to the controller 10.

Figure 33:
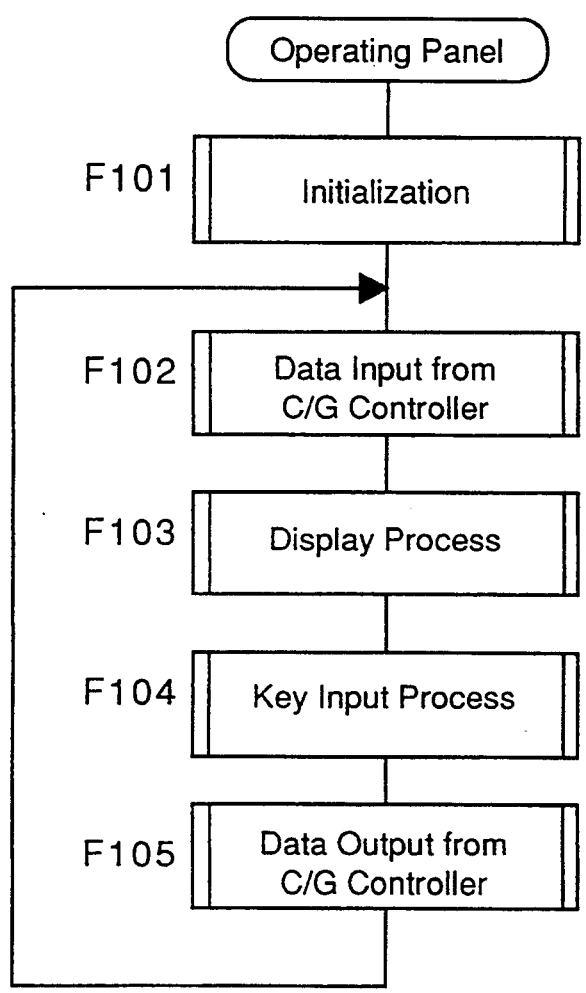
FIG. 33 is a flowchart showing the sequence of control of the operating panel.

(f-1) Copier Operating Panel (FIG. 33)

In a control processor of the copier operating panel 260, after an initialization at step F101, necessary data are inputted from the controller 10 at step F102, followed by a display of contents corresponding to these data at the operating panel 260 at step F103. The contents displayed at step F103 includes the copying modes such as, for example, the double side copying mode, the composite copying mode and the single side copying mode. Then, an input generated as a result of manipulation of keys on a control panel 1100 are accepted at step F104. This is subjected to a signal indicative of, for example, a change in mode from the double side copying mode to the composite copying mode. Then, the inputted contents are outputted to the controller 10 at step F105.

Figure 34:
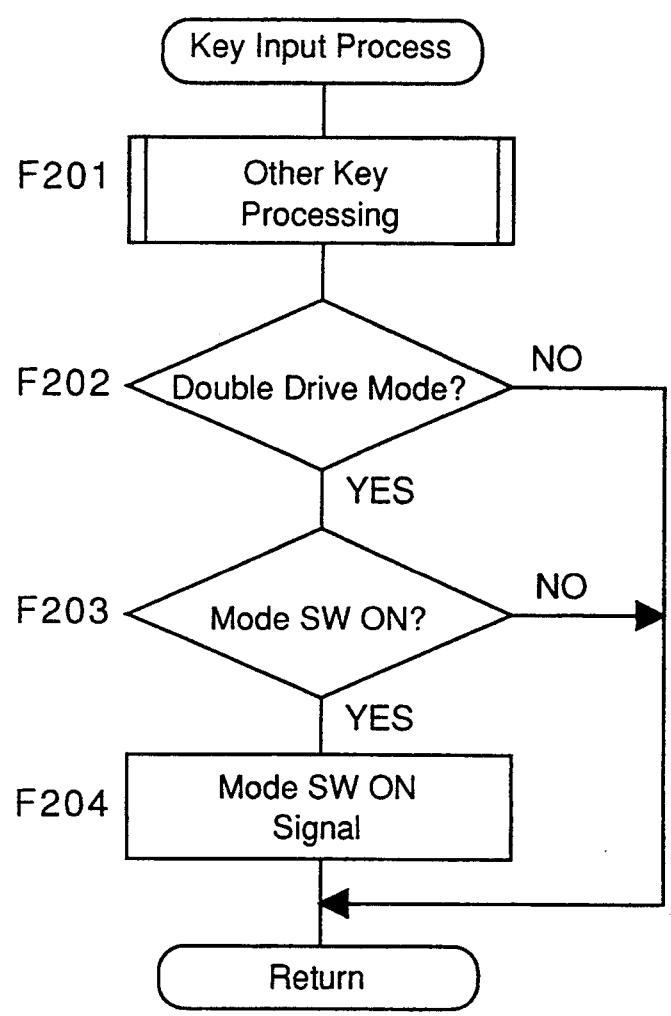
FIG. 34 is a flowchart showing a key input processing of the operating panel.

(f-2) Key Input Processing (FIG. 34)

During the execution of the key input processing at step F104 of the flow of FIG. 33, after other keying processes at step F201 have been executed, a decision is made at step F202 to determine if the double drive mode is selected and, if the double drive mode is not selected, the program flow returns. On the other hand, if the double drive mode is selected, a decision is made at step F203 to determine if the mode selecting key 268 is depressed and, if it is depressed, a switch-on signal of the mode selecting key 268 is synthesized at step F204. This switch-on signal is outputted to the controller 10 at step F105.

The reason for the determination of the ON signal of the mode selecting key 268 made only when the double drive mode is selected is because, since the image signal to be applied to the printer 700 is usually outputted from the host computer 100 and any image signal is never inputted from the copying machine 200, the selection of the double drive mode in the copying machine 200 is good for nothing. In other words, the mode selecting key 268 of the operating panel 260 of the copying machine 200 is so designed as to function effectively to release the double drive mode when the double drive mode has been selected.

Figure 35:
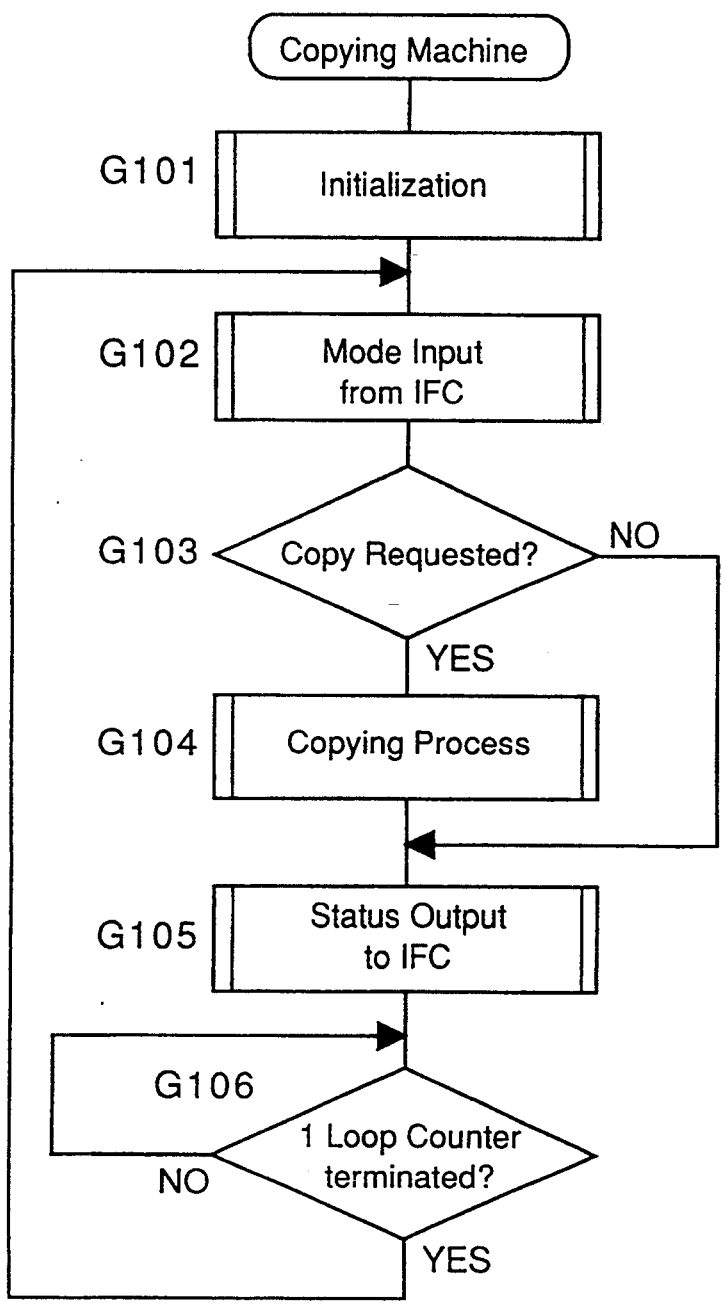
FIG. 35 is a flowchart showing the sequence of control of the copying machine.

(g) Copying Machine (FIG. 35)

A control processor in the copying machine 200 functions according to the mode instruction given by the interface controller 20. After an initialization at step G101, a copying mode is inputted at step G102 from the interface controller 20, followed by a decision at step G103 to determine if a copy query under such copying mode is made. If the copy query is made, the copying process is executed at step G104, but if no copy query is made, a status signal is outputted at step G105 to the interface controller 20 without the copying process being executed, and a decision is then made at step G106 to determine the termination of the single loop counter. If the counter is terminated, the program flow return to step G102.

Figure 36:
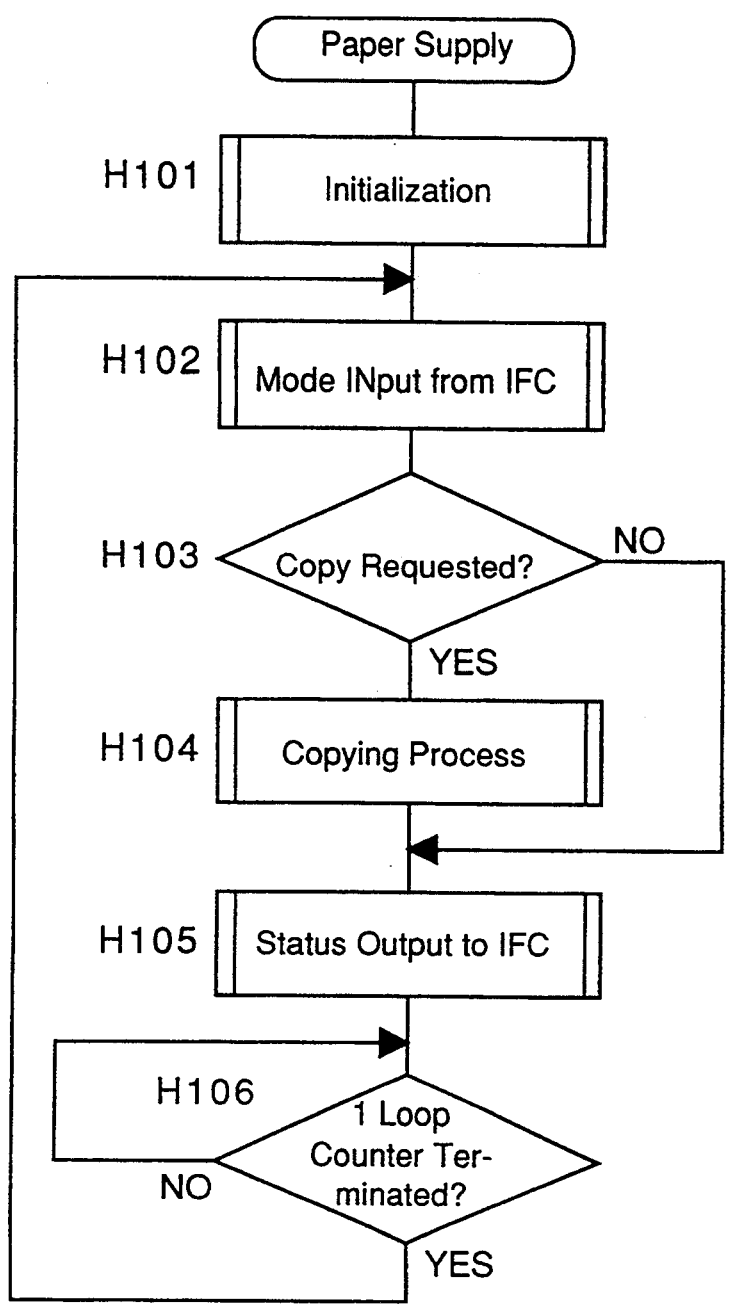
FIG. 36 is a flowchart showing the sequence of control of the paper feeder.

(h) Paper Feeder 300 (FIG. 36)

A control processor in the paper feeder 300 functions according to a mode instruction given by the interface controller 20. After an initialization at step H101, a copying mode is inputted at step H102 from the interface controller 20, followed by a decision at step H103 to determine if a copy query under such copying mode is made. If the copy query is made, the copying process is executed at step H104, followed by an outputting of a status signal to the interface controller 20. However, if no copy query is made, an outputting of the status signal to the interface controller 20 does not take place and a decision is then made at step H106 to determine the termination of the single loop counter. If the counter is terminated, the program flow return to step H102.

Figure 37:
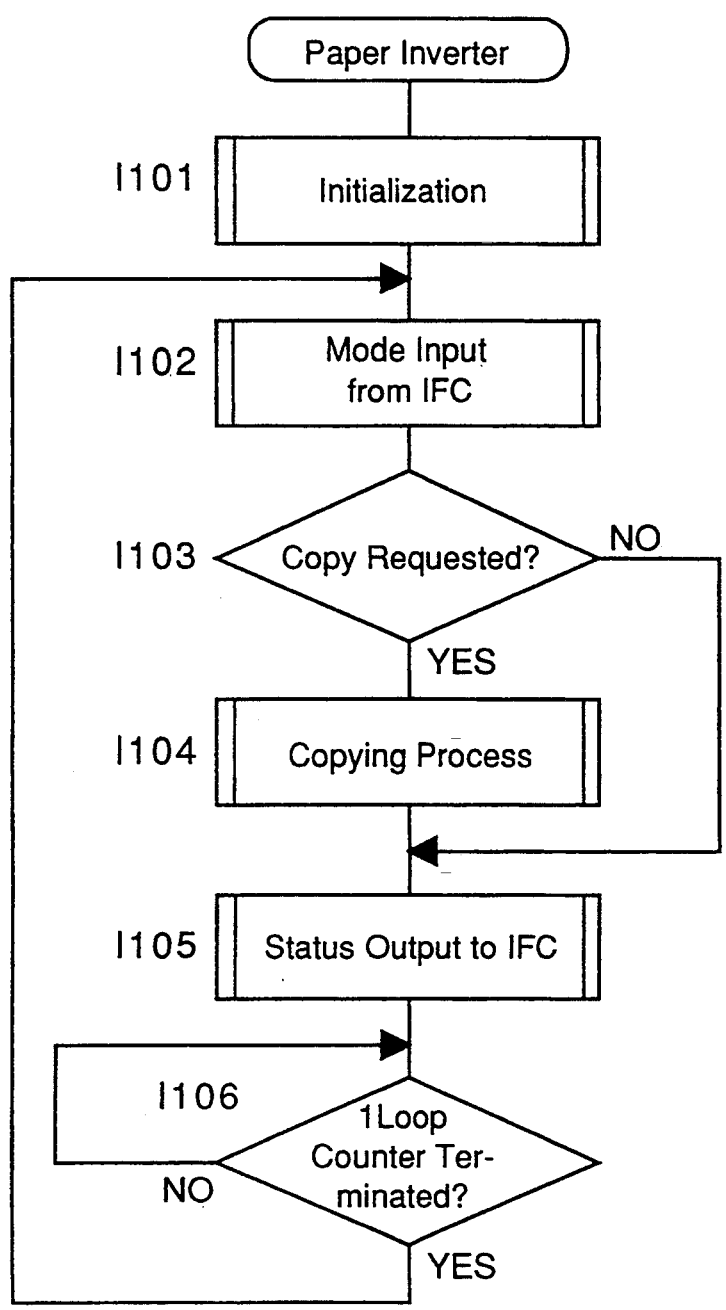
FIG. 37 is a flowchart showing the sequence of control of the paper inverter.

(i) Paper Inverter FIG. 37)

A control processor in the paper inverter 500 functions according to a mode instruction given by the interface controller 20. After an initialization I101, a copying mode is inputted at step I102 from the interface controller 20, followed by a decision at step I103 to determine if a copy query under such copying mode is made. If the copy query is made, the copying process is executed at step I104, but if no copy query is made, a status signal is outputted at step I105 to the interface controller 20 without the copying process being executed, and a decision is then made at step I106 to determine the termination of the single loop counter. If the counter is terminated, the program flow return to step I102.

Figure 38:
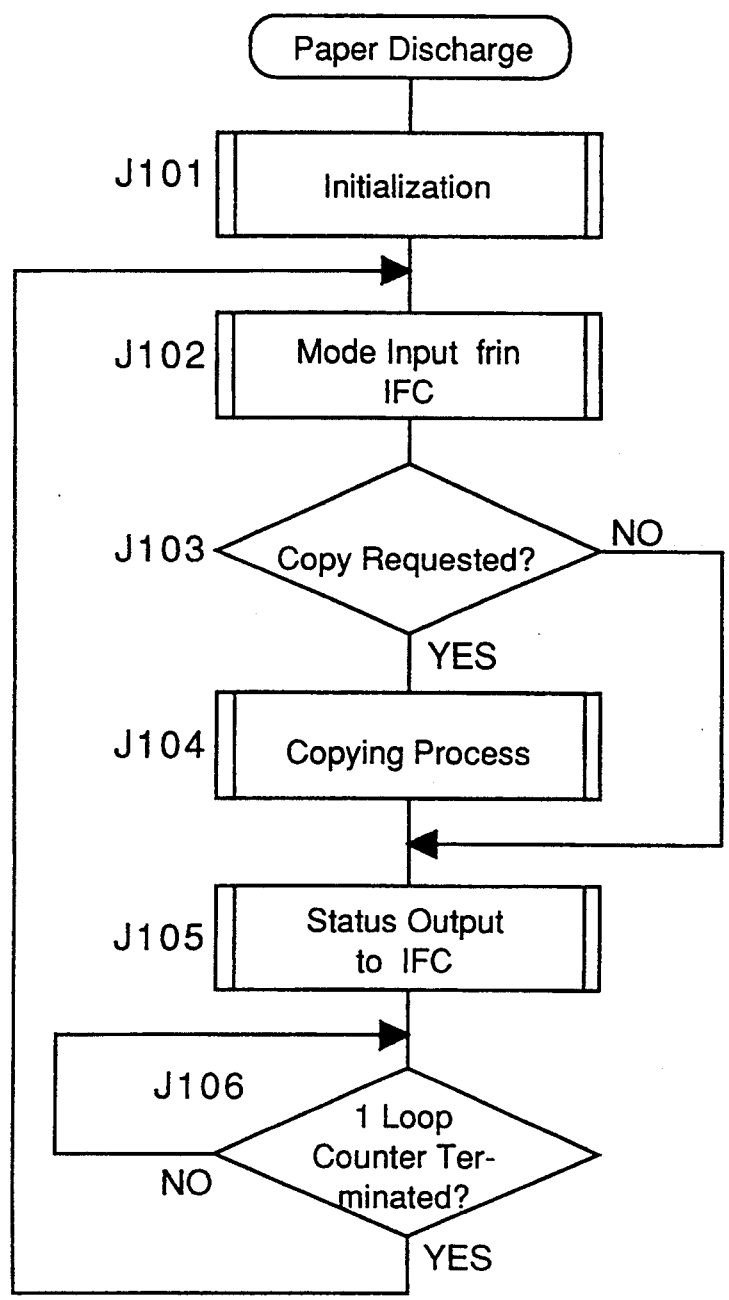
FIGS. 38 and 39 are flowcharts showing the sequence of control of the paper discharge unit.

(j) Paper Discharging Device (FIG. 38)

A control processor in the paper discharging device 600 functions according to a mode instruction given by the interface controller 20. After an initialization J101, a copying mode is inputted at step J102 from the interface controller 20, followed by a decision at step J103 to determine if a copy query under such copying mode is made. If the copy query is made, the copying process is executed at step J104, but if no copy query is made, a status signal is outputted at step J105 to the interface controller 20 without the copying process being executed, and a decision is then made at step J106 to determine the termination of the single loop counter. If the counter is terminated, the program flow return to step J102.

Figure 39:
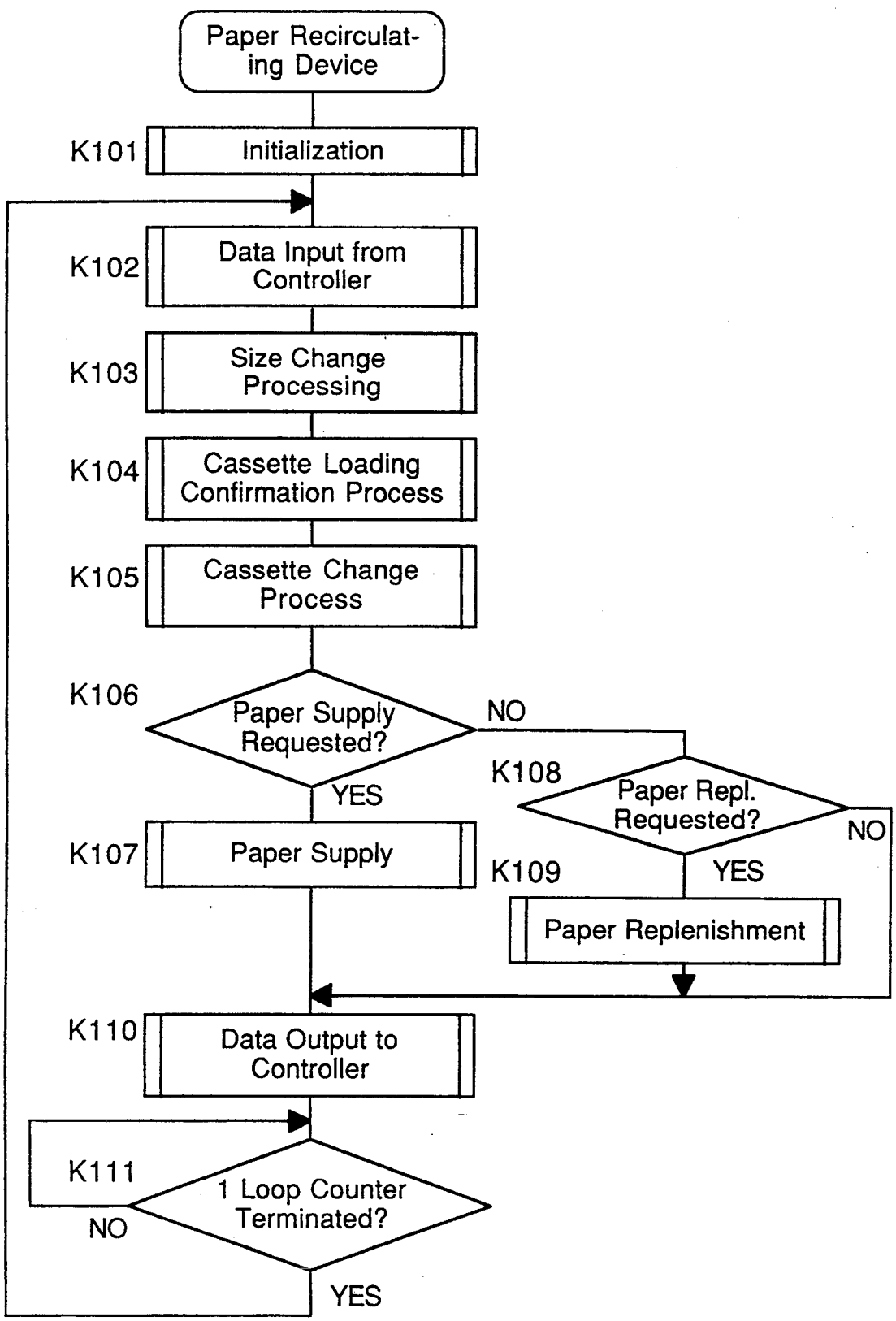

(k-1) Paper Recirculating Unit (FIG. 39)

In a control processor in the paper recirculating unit 800, after an initialization is executed at step K101, data from the controller 10 are inputted at step K102. Then, after a size change process at step K103, a cassette loading confirmation process at step K104 and a cassette change process at step K105 have been successively executed, a decision is made at step K106 to determine if there is an instruction given to the printer 700 to effect a paper supply. If there is the instruction to effect the paper supply, the paper supply process is executed at step K107, but if there is no instruction to effect the paper supply, another decision is made at step K108 to determine if a paper replenishment instruction necessary to effect a supply of recording papers from the paper feeder 300 to the paper recirculating unit 800 is made and, if such paper replenishment instruction is given, the paper supply from the paper feeder 300 to the paper recirculating unit 800 is performed at step K109. Thereafter, data are outputted at step K110 to the controller 10 and, after the termination of the loop counter has been confirmed at step K111, the program flow return to step K102 at which data from the controller 10 are again inputted.

Figure 40:
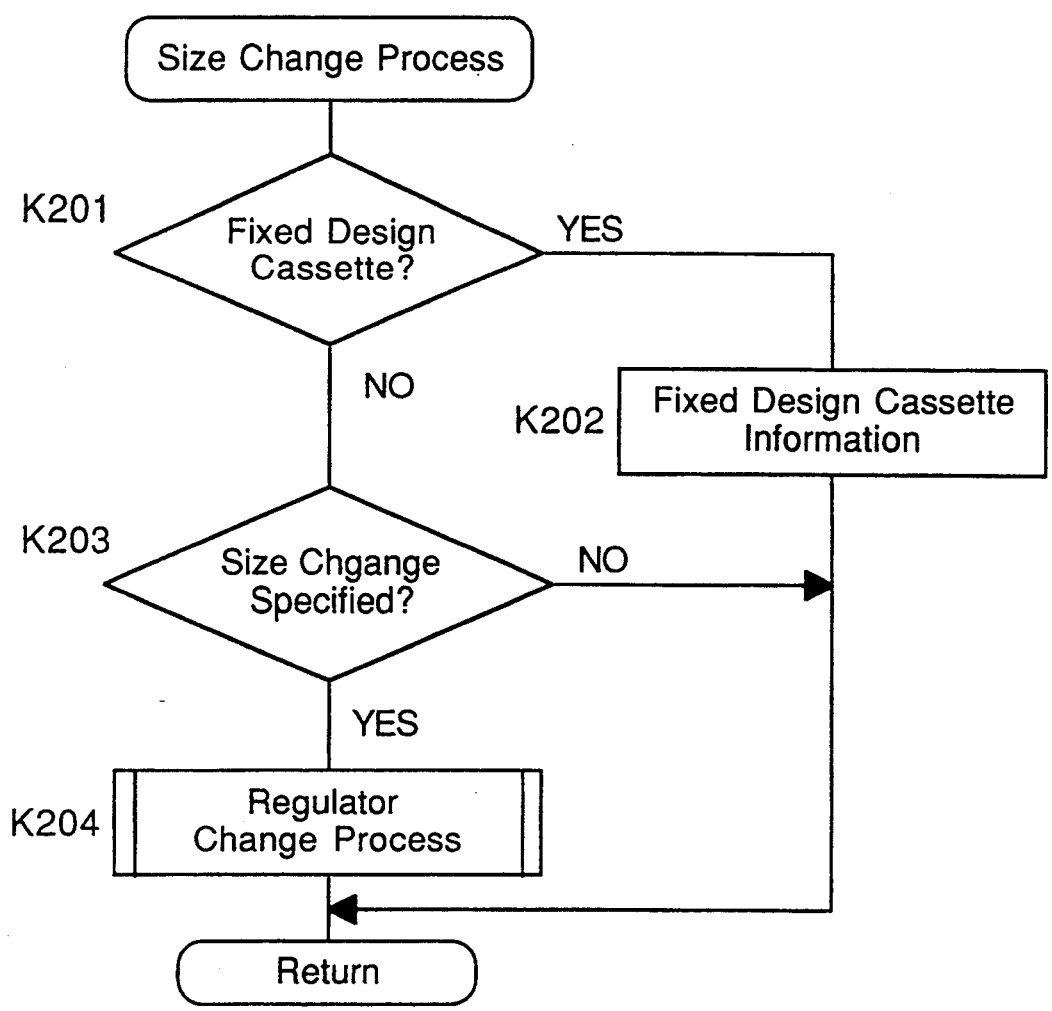
FIG. 40 is a flowchart showing a size change process.

(k-2) Size Change Process (FIG. 40)

The size change process performed at step K103 of the flow of FIG. 39 is associated with a process of changing the cassette size by moving the regulator plates 844 and 845 of the variable design cassette 840 and starts with a decision at K201 to determine which one of the fixed design cassette 830 and the variable design cassette 840 is loaded on the paper recirculating unit 800. Should a result of the decision at step K201 indicate that the fixed design cassette 830 is loaded in the paper recirculating unit 800, cassette information of this fixed design cassette 830, for example, the cassette size thereof, is outputted at step K202. On the other hand, if the result of decision at step K201 indicate that the variable design cassette 840 is loaded in the paper recirculating unit 800, a decision is made at step K203 to determine if the size change is specified. If the size change is specified, a regulator change process is executed at step K204 to move the rear regulator plate 844 and the side regulator plates 845 to bring the cassette side in conformity with the specified paper size.

Figure 41:
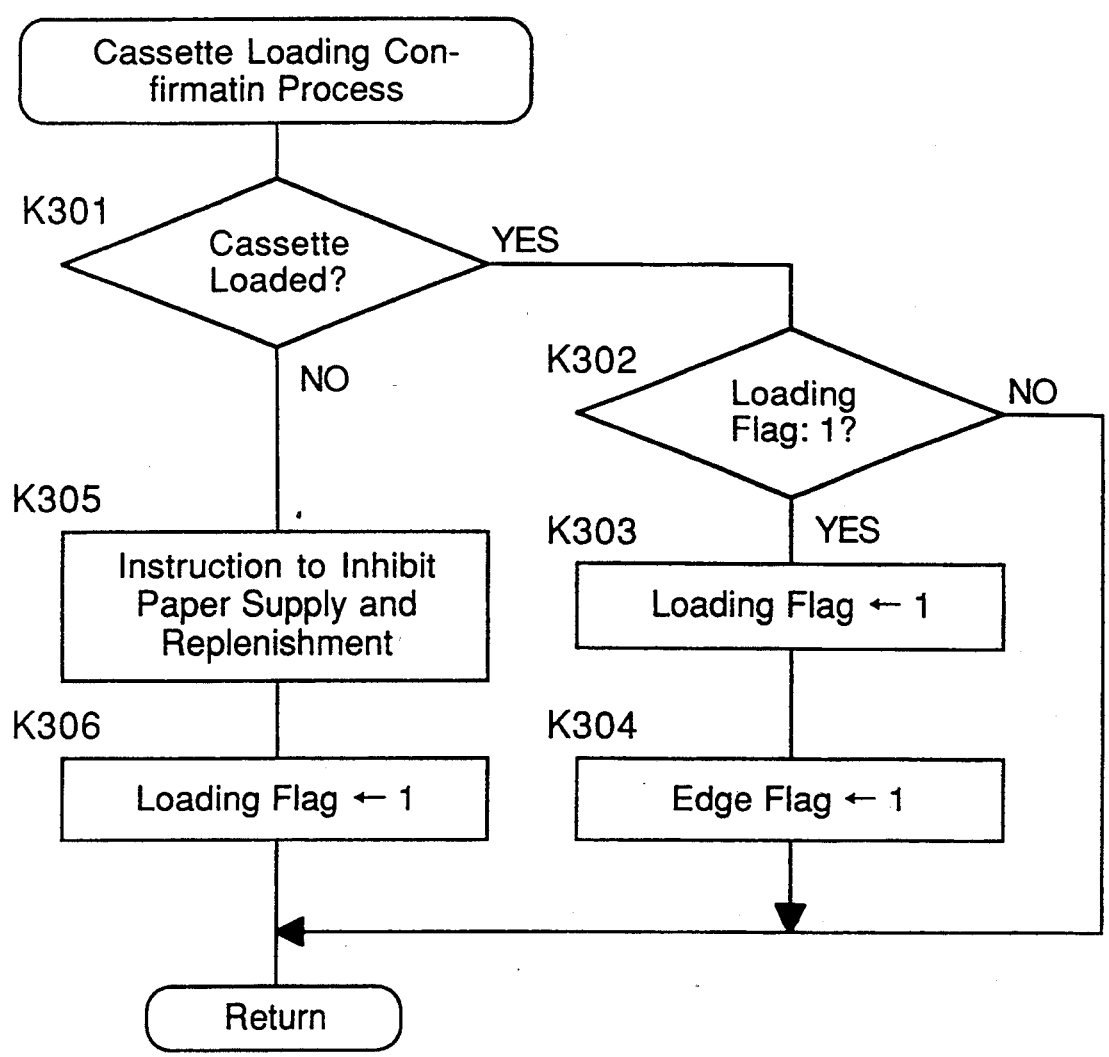
FIG. 41 is a flowchart showing a cassette loading confirmation process.

(k-3) Cassette Loading Confirmation Process (FIG. 41)

The cassette loading confirmation process executed at step K104 of the flow of FIG. 41 is a process during which a determination is made as to whether or not the cassette has Just been loaded in the paper recirculating unit 800. This process starts with a decision at step K301 to determine if the cassette is loaded. If no cassette is loaded, instructions necessary to inhibit the paper supply to the printer 700 and the paper replenishment from the paper feeder 300 are outputted at step K305, followed by a setting of a load flag to "1" at step K306. If the cassette is loaded in the paper recirculating unit 800, a decision is made at step K302 to determine if the load flag is "1". In other words, a decision is made to determine whether the cassette has Just been loaded in the paper recirculating unit 800 or whether the cassette has previously been loaded in the paper recirculating unit 800. Therefore, when the load flag is "1" and the cassette has Just been loaded in the paper recirculating unit 800, the load flag is reset to "0" at step K303, followed by a setting of an edge flag to "1" at step K304.

Figure 42:
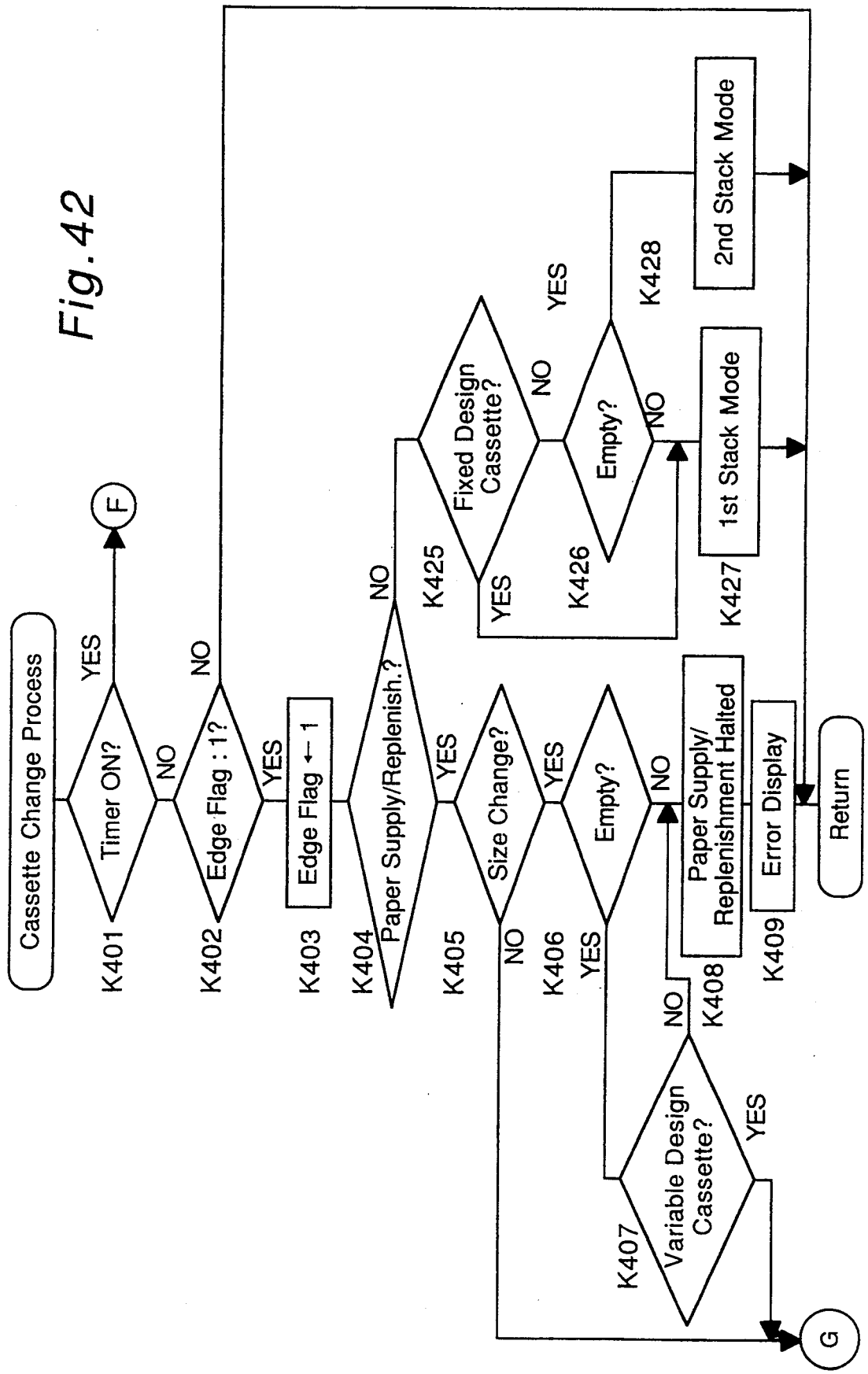
FIGS. 42 and 43 are flowcharts showing a cassette change process.
Figure 43:
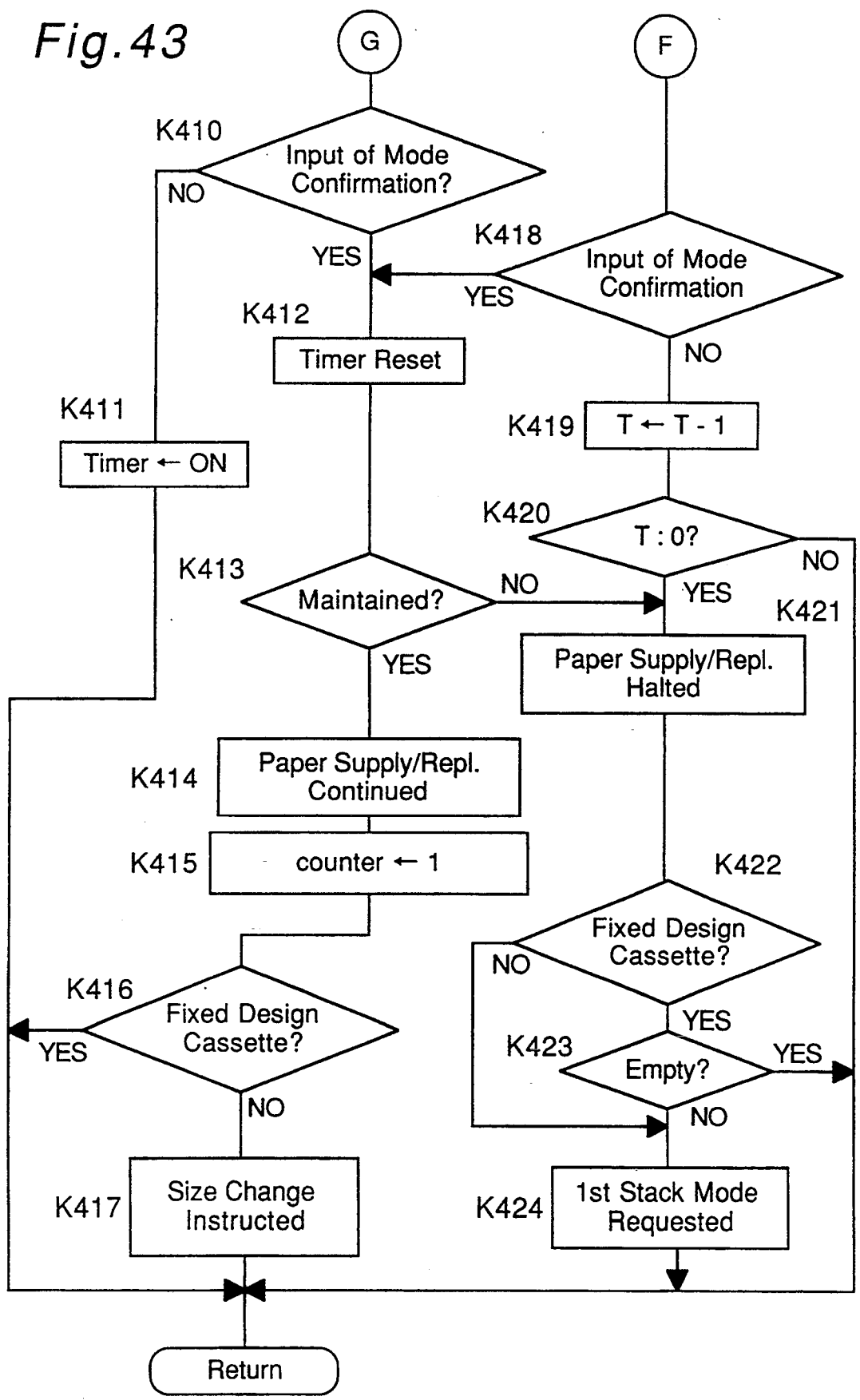

(k-4) Cassette Change Process (FIGS. 42 and 43)

The cassette change process executed at step K105 of the flow of FIG. 39 is a process during which, in the event that the cassette is loaded in or removed from the paper recirculating unit 800, the status thereof is detected to continue or interrupt the paper replenishment or the paper supply. This process starts with a decision at step K401 to determine if a timer is switched on. This timer is of a type which is set, when no mode confirmation is made by depressing the mode confirmation key 752 on the printer operating panel 750 while the cassette is removed and then loaded in the paper recirculating unit 800 during the course of the paper supply or the paper replenishment, so that the paper supply or the paper replenishment can be inhibited during a preset time of the timer.

In the event that the timer is not set, a decision is made at step K402 to determine if the edge flag is set to "1", that is, if the cassette has Just been loaded. If the edge flag is not set to "1", a wait is made, but if the edge flag is set to "1", this edge flag is reset to "0" at step K403. Thereafter, another decision is made at step K404 to determine if, at the time the cassette is removed, the paper supply or the paper replenishment is in progress. In the event that the paper supply or paper replenishment is in progress, a decision is made at step K405 to determine if any change in cassette has occurred consequent on the removal of the cassette and, if no change has occurred in the cassette size, a mode confirmation input is checked at step K410. On the other hand, in the event that the change in cassette size has occurred, a decision is made at step K406 to determine if the cassette is empty. If the cassette is not empty and contains the recording papers, the paper supply or the paper replenishment is interrupted at step K408, but if the cassette is empty, a decision is made at step K407 to determine if the cassette is the variable design cassette 840. When the variable design cassette 840 is loaded, the mode confirmation input is checked at step K410, but when the cassette is not the variable design cassette 840, the paper supply or the paper replenishment is interrupted at step K408. Once the paper supply or the paper replenishment is interrupted, an instruction to display an error indication is outputted at step K409.

In the event that a result of decision at step K404 indicates that, at the time the cassette is removed, the paper supply or the paper replenishment is not in progress, a decision is made at step K425 to determine if the fixed design cassette 830 is loaded in the paper recirculating unit 800 and, when the fixed design cassette 830 id loaded, the first stack mode is requested at step K427. On the other hand, when the fixed design cassette 830 is not loaded, that is, the variable design cassette 840 is loaded in the paper recirculating unit 800, a decision is made at step K426 to determine if the cassette is empty. If the cassette is empty, the second stack mode is requested at step K428, but if it is not empty, the first stack mode is requested at step K427.

During an execution of a process at step K410 for checking the mode confirmation input, a decision is made to determine if the mode confirmation key 752 in the printer operating panel 750 has been depressed and, if the mode confirmation input is not made, the timer is switched on to start a counting at step K411. If the mode confirmation key 752 has been depressed and the mode confirmation input is made, the timer is reset at step K412, followed by a decision at step K413 to determine if there is any instruction to change the mode of use of the current cassette. If there is no instruction to change the mode of use of the cassette and the current cassette should be maintained, the paper supply or the paper replenishment is continued at step K414, but if there is the instruction, the paper supply or the paper replenishment is interrupted at step K421.

In the event that a result of decision at step K413 indicates that the same mode of use of the cassette should be maintained, the paper supply or the paper replenishment is continued at step K414, a paper number counter is reset to "0" at step K415, and a decision is then made at step K416 to determine if the fixed design cassette 830 is loaded. If the variable design cassette 840, not the fixed design cassette 830, is loaded, the instruction to change the size is outputted at step K417.

In the event that a result of decision at step K411 indicates that the timer is switched on, that is, the mode confirmation key 752 is not depressed while the cassette is loaded, a decision is made at step K418 to determine if an inputting of the mode confirmation is made by the mode confirmation key 752. Should the inputting of the mode confirmation be made as a result of the depression of the mode confirmation key 752, the timer is reset at step K412, but should no inputting of the mode confirmation be made, a value "1" is subtracted from the count T of the timer at step K419, followed by a decision at step K420 to determine if the count T of the timer becomes "0".

If the count T of the timer is not "0", the timer continues its counting operation. Upon termination of the timer, the paper supply or the paper replenishment is interrupted at step K421, followed by a decision at step K422 to determine if the fixed design cassette 830 is loaded. If the fixed design cassette 830 is loaded, a decision is made at step K423 to determine if it is empty, but if it is not empty, the first stack mode is requested at step K424. On the other hand, if the variable design cassette 840, not the fixed design cassette 830, is loaded, is the first stack mode is similarly requested at step K424.

Figure 44:
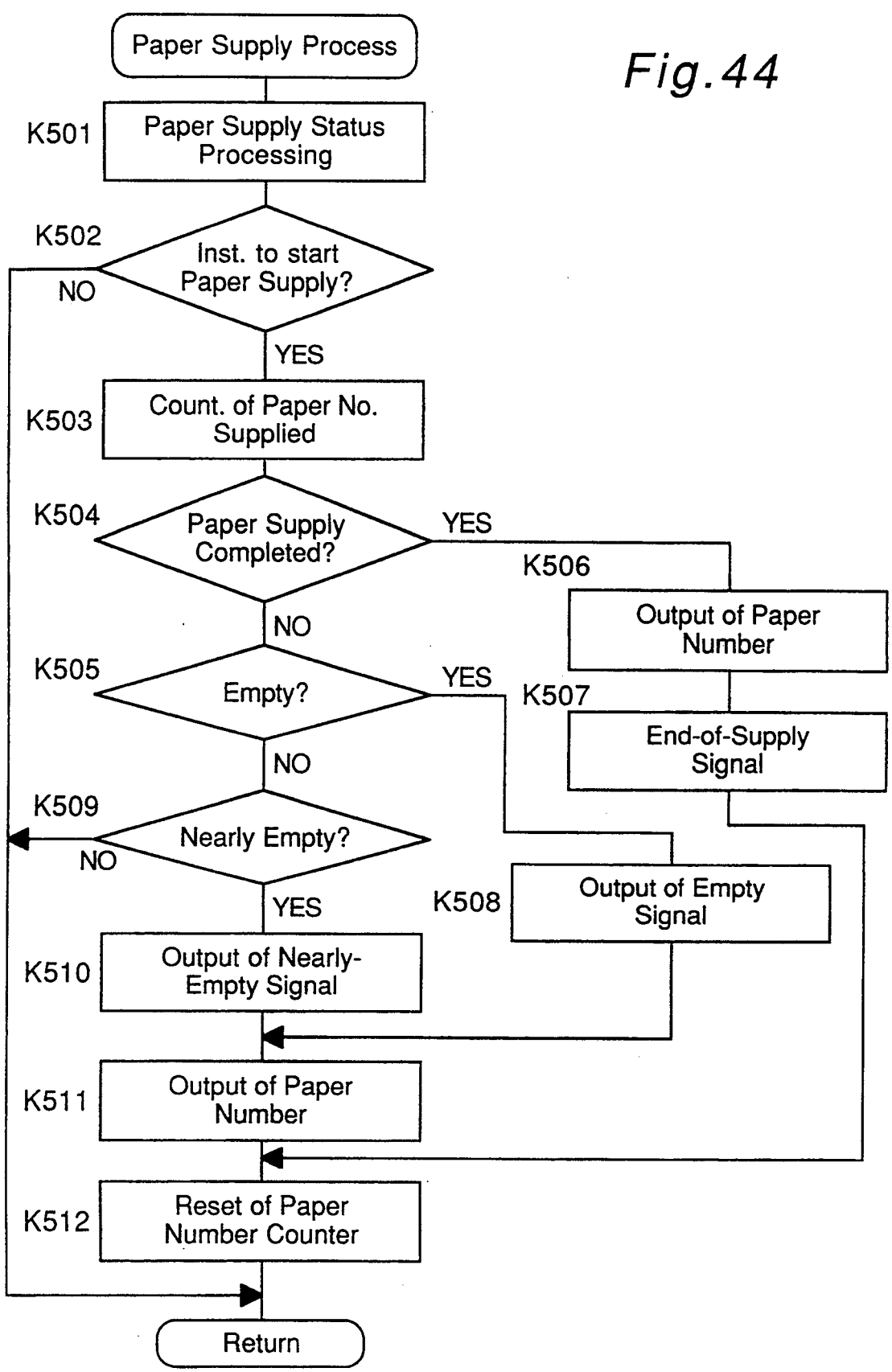
FIG. 44 is a flowchart showing a paper supply process.

(k-5) Paper Supply Process (FIG. 44)

The paper supply process executed at step K107 of the flow of FIG. 39 is associated with a supply of recording papers from the paper recirculating unit 800 to the printer 700 and starts with a processing at step K501 of a status of paper supply, followed by a decision at step K502 to determine if there is an instruction to start the paper supply. If there is the instruction to start the paper supply, the number of the recording papers to be supplied is counted at step K503, followed by a decision at step K504 to determine if the recording papers have been supplied in a predetermined number. If the supply of the recording papers in the predetermined number has not yet been completed, a decision is made at step K505 to determine if the cassette is empty and, if it is not empty, a decision is made at step K509 to determine if the cassette is nearly empty. If the cassette is nearly empty, a nearly-empty signal is outputted at step K510, followed by an outputting of the number of the recording papers to be supplied at step K511. On the other hand, if the cassette is empty, an empty signal is outputted at step K508, followed by an outputting of the number of the recording papers to be supplied at step K511. Once the foregoing process completes, a paper number counter is reset at K512. When a result of decision at step K504 indicates that the paper supply has been completed, the number of the recording papers to be supplied is outputted at step K506, and the paper supply is terminated at step K507 by outputting an end-of-paper-supply signal, followed by a resetting of the paper number counter at step K512.

Figure 45:
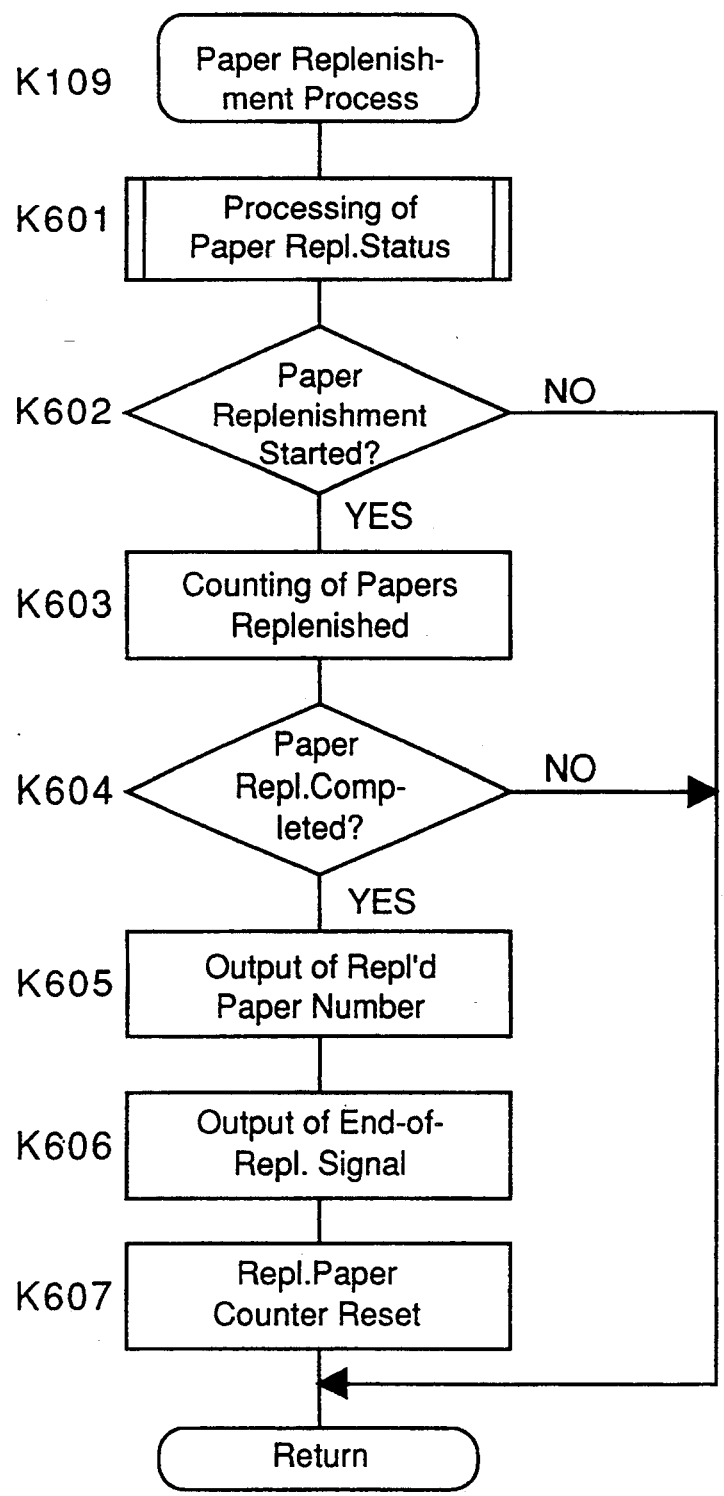
FIG. 45 is a flowchart showing a replenishment process.

(k-6) Paper Replenishment Process (FIG. 45)

The paper replenishment process is associated with the paper supply from the paper feeder 300 to the paper recirculating unit 800 and starts with a processing at step K601 of a status of paper replenishment, followed by a decision at step K602 to determine the start of the paper replenishment. If the paper replenishment is started, the number of recording papers to be replenished is counted at step K603 and a decision is then made at step K604 to determine the end of the paper replenishment. If the paper replenishment has not yet been terminated, the paper replenishment is continued, but if the paper replenishment has been completed, the number of the recording papers to be replenished is outputted at step K605, an end-of-paper-replenishment signal is outputted at step K606, followed by a resetting of a replenished paper number counter at step K607.

(1) Recognizing Modes of Various Options

In the respective processes executed by the respective control processors of the various options of the copying machine and others, the same data are inputted from the controller at steps G102, H102, I102, J102 and K102. In contrast thereto, in these options, only necessary data are selectively recognized to determine operating modes and status signals peculiar to them are outputted to the interface controller 20 at respective steps G105, H105, I105, J105 and K110.

More specifically, in the copying machine, the copy size, the developing unit to be used, the size of recording papers accommodated in the paper feed unit, and the magnification at which a copy is made are recognized and respective signals indicative of the presence or absence of the developing unit, the presence and absence of the recording paper, an error in peripherals of the photoreceptor drum, the selective opening and closure of the door, a Jamming and a discharge of the recording papers are outputted. On the other hand, in the paper feeder 300, the size of recording papers accommodated in the paper feed unit is recognized and respective signals indicative of an error occurring in a drive system, the presence or absence of recording papers and the jamming are outputted. In the paper inverter 500, the copying mode and the size of the recording papers are recognized and respective signals indicative of an error occurring in a drive system, the selective opening and closure of the door and a discharge of the recording papers from the paper recirculating unit 800 are outputted. In the paper discharging device 600, the bin to which the recording papers are discharged and the size of the recording papers are recognized and respective signals indicative of an error occurring in a drive system, the selective opening and closure of the door, the jamming and the paper discharge are outputted.

From the foregoing description, in the practice of the present invention, the image forming apparatus comprising the copying machine and the paper feeder capable of accommodating a plurality of different sizes of recording papers is provided with the paper recirculating unit capable of stacking recording papers supplied from the paper feeder and supplying the recording papers to the printer when the necessity arises. Accordingly, images can be formed on recording papers different from those accommodated in the paper feeder in the printer and, moreover, since a predetermined amount of recording papers can be stacked, the paper supply from the paper feeder to the copying machine and the paper supply from the paper recirculating unit to the printer can be performed at the same time. In other words, the convenience and the function of the printer can be enhanced without sacrificing the function of the copying machine.

Also, where the variable design cassette is employed in the paper storage unit of the paper recirculating unit, the function of the printer can further be enhanced since the variable design cassette has a capability of accommodating different sizes of recording papers.

Moreover, since the type of one of the cassettes loaded in the paper recirculating unit is visually indicated by a display means, there is no necessity to confirm the type of cassette by removing from and loading again in the paper recirculating unit.

Although the present invention has fully been described in connection with the various embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. An image forming apparatus which comprises: a first image forming means for forming an image on a recording sheet;
   a first accommodating means for accommodating recording sheets adapted to be supplied to the first image forming means;
   a first supply means for supplying the recording sheets one at a time from the first accommodating means to the first image forming means;
   a second image forming means for forming an image on a recording sheet;
   a second accommodating means for accommodating recording sheets adapted to be supplied to the second image forming means;
   a second supply means for supplying the recording sheets one at a time from the second accommodating means towards the second image forming means; and a third supply means for supplying the recording sheets from the first accommodating means to the second accommodating means without passing through any of the first and second image forming means.

2. The image forming apparatus as claimed in claim 1, wherein said second accommodating means is detachable relative to the apparatus.

3. The image forming apparatus as claimed in claim 1, wherein said first accommodating means accommodates a plurality of sizes of recording sheets and wherein said second accommodating means has a sheet regulating means adjustable according to the size of recording sheets supplied from the third supply means.

4. The image forming apparatus as claimed in claim 1, further comprising a control means for controlling an operation of the second image forming means, said control means having a capability of inhibiting a supply of recording sheets by said third supply means.

5. An image forming apparatus which comprises:
a first image forming means for forming an image on a recording sheet;
a first accommodating means for accommodating recording sheets adapted to be supplied to the first image forming means;
a first supply means for supplying the recording sheets one at a time from the first accommodating means to the first image forming means;
a second image forming means for forming an image on a recording sheet;
a second accommodating means for accommodating recording sheets adapted to be supplied to the second image forming means;
a second supply means for supplying the recording sheets one at a time from the second accommodating means towards the second image forming means;
a third supply means for supplying the recording sheets from the first accommodating means towards the second accommodating means; and
a control means for controlling the third supply means thereby to keep at a constant value the number of recording sheets accommodated in the second accommodating means.

6. The image forming apparatus as claimed in claim 5, wherein said second accommodating means is detachable relative to the apparatus.

7. The image forming apparatus as claimed in claim 5, wherein said first accommodating means accommodates a plurality of sizes of recording sheets and wherein said second accommodating means has a sheet regulating means adjustable according to the size of recording sheets supplied from the third supply means.

8. The image forming apparatus as claimed in claim 5, further comprising a control means for controlling an operation of the second image forming means, said control means having a capability of inhibiting a supply of recording sheets by said third supply means.

9. An image forming apparatus which comprises:
a first image forming means for forming an image on a recording sheet;
a first accommodating means for accommodating recording sheets adapted to be supplied to the first image forming means;
a first supply means for supplying the recording sheets one at a time from the first accommodating means towards the first image forming means;
a second image forming means for forming an image on a recording sheet;
a second accommodating means for accommodating recording sheets adapted to be supplied to the second image forming means;
a second supply means for supplying the recording sheets one at a time from the second accommodating means towards the second image forming means;
a third supply means for supplying the recording sheets from the first accommodating means towards the second accommodating means;
an instructing means for instructing an operation of the third supply means; and
a control means for controlling the third supply means thereby to cause the second accommodating means to accommodate a predetermined number of recording sheets when instructed by said instructing means.

10. The image forming apparatus as claimed in claim 9, wherein said second accommodating means is detachable relative to the apparatus.

11. The image forming apparatus as claimed in claim 9, wherein said first accommodating means accommodates a plurality of sizes of recording sheets and wherein said second accommodating means has a sheet regulating means adjustable according to the size of recording sheets supplied from the third supply means.

12. The image forming apparatus as claimed in claim 9, further comprising a control means for controlling an operation of the second image forming means, said control means having a capability of inhibiting a supply of recording sheets by said third supply means.

13. An image forming apparatus which comprises:
a first image forming means for forming an image on a recording sheet;
a first accommodating means for accommodating recording sheets adapted to be supplied to the first image forming means;
a first supply means for supplying the recording sheets one at a time from the first accommodating means towards the first image forming means;
a second image forming means for forming an image on a recording sheet;
a second accommodating means for accommodating recording sheets adapted to be supplied to the second image forming means;
a second supply means for supplying the recording sheets one at a time from the second accommodating means towards the second image forming means;
a third supply means for supplying the recording sheets from the first accommodating means towards the second accommodating means;
a detecting means for detecting whether or not the second accommodating means has the recording sheets accommodated therein; and
a control means for initiating an operation of the third supply means in the event that the detecting means detects the absence of any recording sheet in the second accommodating means.

14. The image forming apparatus as claimed in claim 13, wherein said second accommodating means is detachable relative to the apparatus.

15. The image forming apparatus as claimed in claim 13, wherein said first accommodating means accommodates a plurality of sizes of recording sheets and wherein said second accommodating means has a sheet regulating means adjustable according to the size of recording sheets supplied from the third supply means.

16. The image forming apparatus as claimed in claim 13, further comprising a control means for controlling an operation of the second image forming means, said control means having a capability of inhibiting a supply of recording sheets by said third supply means.

17. An image forming apparatus which comprises:
   a first image forming means for forming an image on a recording sheet;
   a first accommodating means for accommodating recording sheets adapted to be supplied to the first image forming means;
   a first supply means for supplying the recording sheets one at a time from the first accommodating means towards the first image forming means;
   a second image forming means for forming an image on a recording sheet;
   a second accommodating means for accommodating recording sheets adapted to be supplied to the second image forming means;
   a second supply means for supplying the recording sheets one at a time from the second accommodating means towards the second image forming means;
   a third supply means for supplying the recording sheets from the first accommodating means towards the second accommodating means;
   an instructing means for instructing an operation of the third supply means; and
   a control means for causing the third supply means to wait in the event that the first supply means is being operated when instructed by the instructing means.

18. The image forming apparatus as claimed in claim 17, wherein said second accommodating means is detachable relative to the apparatus.

19. The image forming apparatus as claimed in claim 17, wherein said first accommodating means accommodates a plurality of sizes of recording sheets and wherein said second accommodating means has a sheet regulating means adjustable according to the size of recording sheets supplied from the third supply means.

20. The image forming apparatus as claimed in claim 17, further comprising a control means for controlling an operation of the second image forming means, said control means having a capability of inhibiting a supply of recording sheets by said third supply means.

21. An image forming apparatus which comprises:
   a first image forming means for forming an image on a recording sheet;
   a first accommodating means for accommodating recording sheets adapted to be supplied to the first image forming means;
   a first supply means for supplying the recording sheets one at a time from the first accommodating means towards the first image forming means;
   a second image forming means for forming an image on a recording sheet;
   a second accommodating means for accommodating recording sheets adapted to be supplied to the second image forming means;
   a second supply means for supplying the recording sheets one at a time from the second accommodating means towards the second image forming means;
   a third supply means for supplying the recording sheets from the first accommodating means towards the second accommodating means;
   an instructing means for instructing an operation of the third supply means; and
   a control means for interrupting an operation of the first supply means if the first supply means is being operated when instructed by the instructing means and also for initiating an operation of the third supply means.

22. The image forming apparatus as claimed in claim 21, wherein said second accommodating means is detachable relative to the apparatus.

23. The image forming apparatus as claimed in claim 21, wherein said first accommodating means accommodates a plurality of sizes of recording sheets and wherein said second accommodating means has a sheet regulating means adjustable according to the size of recording sheets supplied from the third supply means.

24. The image forming apparatus as claimed in claim 21, further comprising a control means for controlling an operation of the second image forming means, said control means having a capability of inhibiting a supply of recording sheets by said third supply means.

* * * * *